United States Patent
Saori

(10) Patent No.: US 9,798,122 B2
(45) Date of Patent: Oct. 24, 2017

(54) ZOOM LENS SYSTEM

(71) Applicant: RICOH IMAGING COMPANY, LTD., Tokyo (JP)

(72) Inventor: Masakazu Saori, Saitama (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 211 days.

(21) Appl. No.: 14/875,926

(22) Filed: Oct. 6, 2015

(65) Prior Publication Data

US 2016/0103303 A1  Apr. 14, 2016

(30) Foreign Application Priority Data

Oct. 9, 2014 (JP) ................................. 2014-208076
Oct. 9, 2014 (JP) ................................. 2014-208077

(51) Int. Cl.
*G02B 15/14* (2006.01)
*G02B 15/167* (2006.01)
*G02B 15/16* (2006.01)

(52) U.S. Cl.
CPC ......... *G02B 15/167* (2013.01); *G02B 15/161* (2013.01)

(58) Field of Classification Search
CPC ....... G02B 15/167; G02B 15/161; G02B 9/60
See application file for complete search history.

(56) References Cited

U.S. PATENT DOCUMENTS

| 5,477,297 | A | 12/1995 | Suzuki |
| 5,654,826 | A | 8/1997 | Suzuki |
| 6,985,303 | B2 * | 1/2006 | Takatsuki ............. G02B 15/173 359/684 |
| 2008/0212200 | A1 | 9/2008 | Li et al. |
| 2009/0296231 | A1 | 12/2009 | Shirasuna |
| 2012/0062993 | A1 | 3/2012 | Li |
| 2012/0063003 | A1 | 3/2012 | Li |

FOREIGN PATENT DOCUMENTS

| JP | 6-51202 | 2/1994 |
| JP | 7-13079 | 1/1995 |
| JP | 7-92431 | 4/1995 |

(Continued)

*Primary Examiner* — Joseph P Martinez
(74) *Attorney, Agent, or Firm* — Greenblum & Bernstein, P.L.C.

(57) ABSTRACT

A zoom lens system includes a positive first lens group, a negative second lens group, in that order from the object side, and a positive $n^{th}$ lens group provided closest to the image side. During zooming from the short to long focal length extremities, the first lens group and the $n^{th}$ lens group remain stationary and the second lens group moves. A positive $m^{th}$ lens group is provided between the second and $n^{th}$ lens groups. The following conditions (1) and (2) are satisfied:

$$1.23 < f1/fn < 1.50 \quad (1), \text{ and}$$

$$1.20 < fn/fm < 1.60 \quad (2),$$

wherein f1, fn and fm designate the focal lengths of the first, $n^{th}$ and $m^{th}$ lens groups, respectively, wherein n is a positive integer of 4 or greater, and m is a positive integer of 3 or greater.

18 Claims, 47 Drawing Sheets

(56) References Cited

FOREIGN PATENT DOCUMENTS

| | | |
|---|---|---|
| JP | 7-325272 | 12/1995 |
| JP | 8-278445 | 10/1996 |
| JP | 9-243916 | 9/1997 |
| JP | 11-174323 | 7/1999 |
| JP | 2006-201524 | 8/2006 |
| JP | 2008-216480 | 9/2008 |
| JP | 2009-288619 | 12/2009 |
| JP | 2010-160240 | 7/2010 |
| JP | 2011-99964 | 5/2011 |
| JP | 2011-158599 | 8/2011 |
| JP | 2012-58619 | 3/2012 |
| JP | 2012-58620 | 3/2012 |
| JP | 2012-118097 | 6/2012 |
| JP | 2013-174758 | 9/2013 |

\* cited by examiner

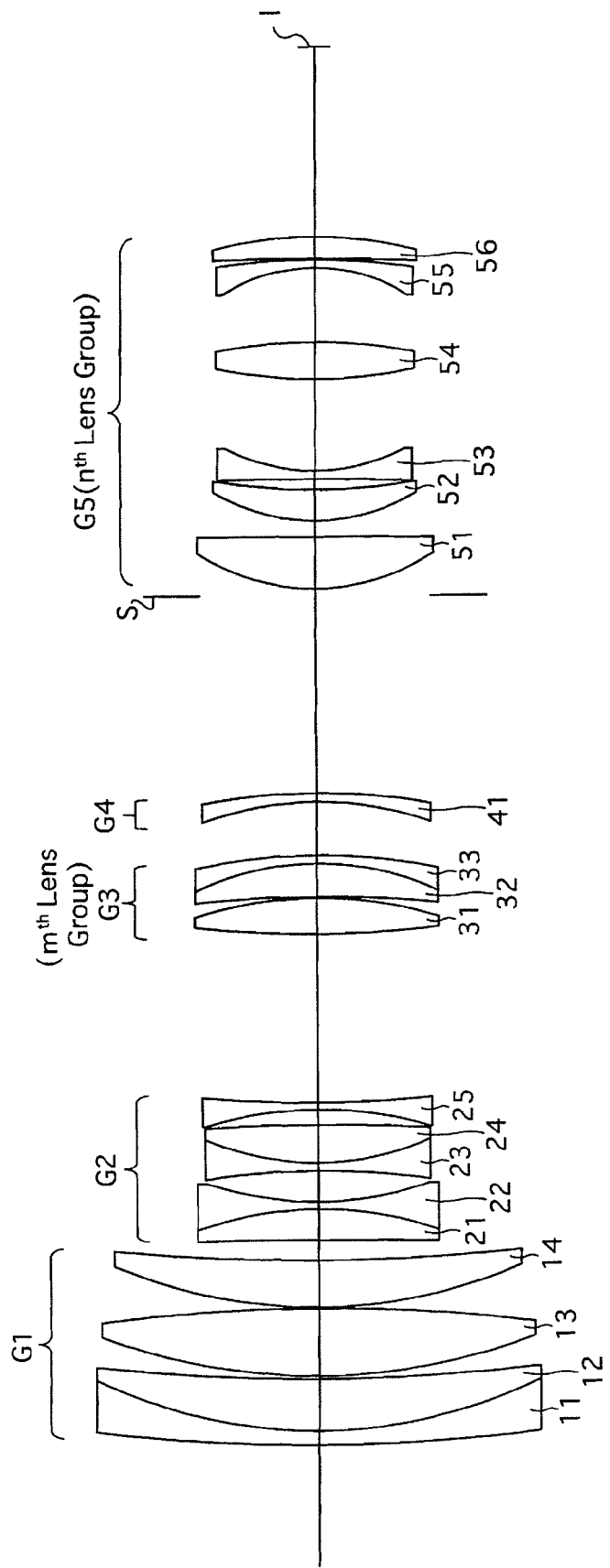

FNO.=1:2.9
— d Line
······ g Line
---- C Line
-0.2  0.2
SPHERICAL
ABERRATION
CHROMATIC
ABERRATION

Y=21.6
-0.05  0.05
LATERAL
CHROMATIC
ABERRATION

Y=21.6
— S
-- M
-0.2  0.2
ASTIGMATISM

Y=21.6
-5.0  5.0 %
DISTORTION

Y= 0.00   +0.10
          -0.10

Y= 12.00   +0.10
           -0.10

Y= 18.00   +0.10
           -0.10

Y= 21.64   +0.10
           -0.10
— d Line
······ g Line
---- C Line

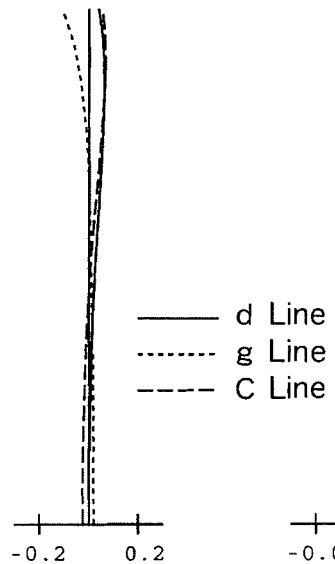
Fig. 5A
FNO.=1:2.9
——— d Line
·········· g Line
---- C Line
-0.2  0.2
SPHERICAL
ABERRATION
CHROMATIC
ABERRATION
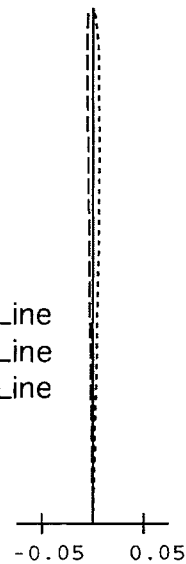
Fig. 5B
Y=21.6
-0.05  0.05
LATERAL
CHROMATIC
ABERRATION
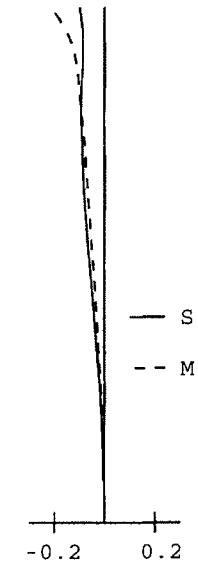
Fig. 5C
Y=21.6
——— S
- - M
-0.2  0.2
ASTIGMATISM
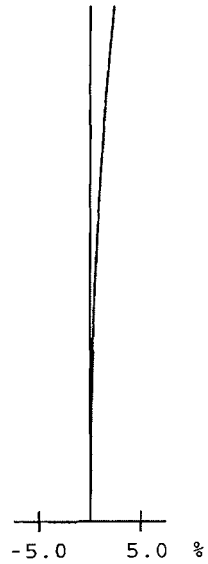
Fig. 5D
Y=21.6
-5.0  5.0 %
DISTORTION
Fig. 6A
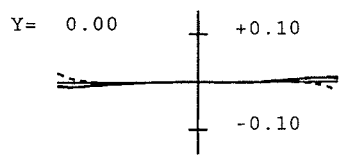
Y= 0.00   +0.10 / -0.10
Fig. 6B
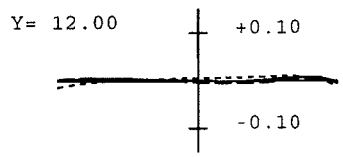
Y= 12.00   +0.10 / -0.10
Fig. 6C
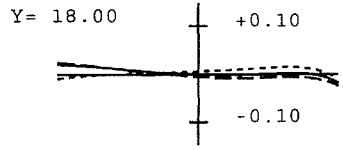
Y= 18.00   +0.10 / -0.10
Fig. 6D
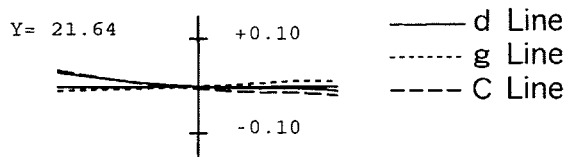
Y= 21.64   +0.10 / -0.10
——— d Line
·········· g Line
---- C Line

FNO.=1:2.9

—— d Line
······ g Line
---- C Line

-0.2  0.2
SPHERICAL
ABERRATION
CHROMATIC
ABERRATION

Y=21.6

-0.05  0.05
LATERAL
CHROMATIC
ABERRATION

Y=21.6

—— S
-- M

-0.2  0.2
ASTIGMATISM

Y=21.6

-5.0  5.0 %
DISTORTION

Y= 0.00    +0.10
           -0.10

Y= 12.00   +0.10
           -0.10

Y= 18.00   +0.10
           -0.10

Y= 21.64   +0.10

—— d Line
······ g Line
---- C Line

-0.10

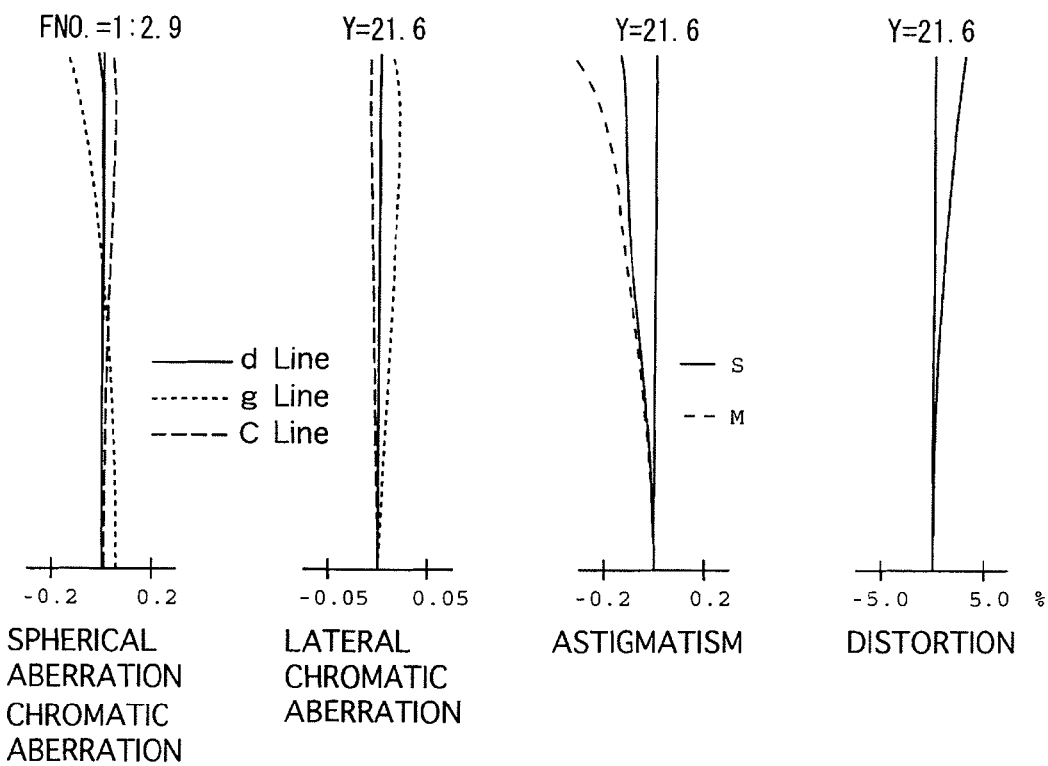

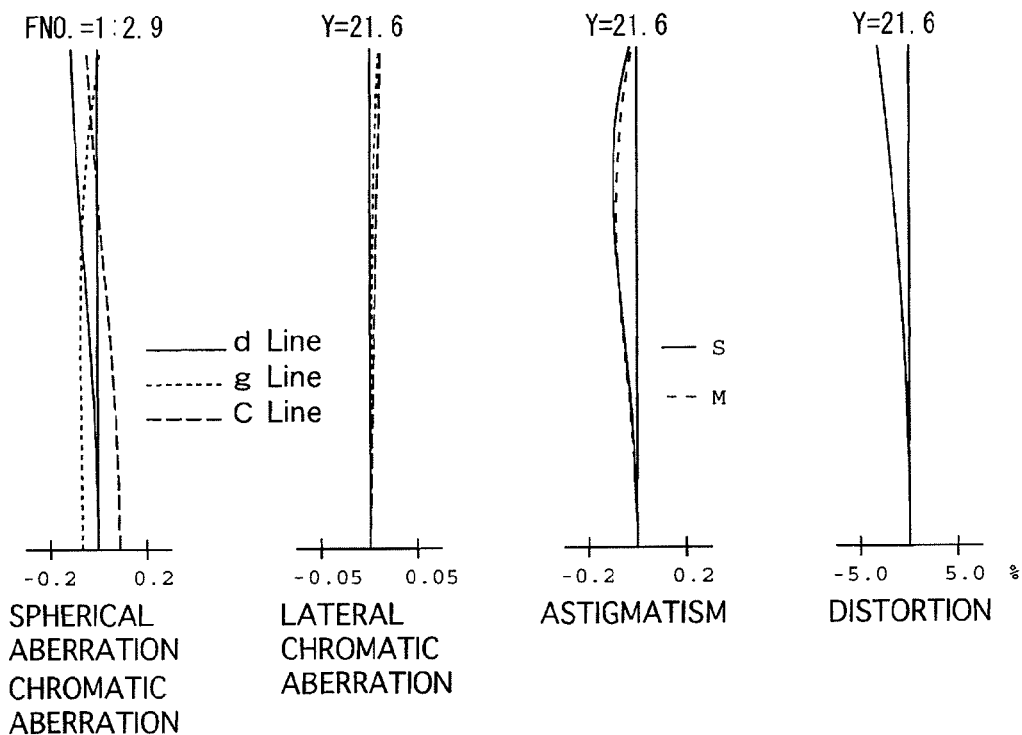
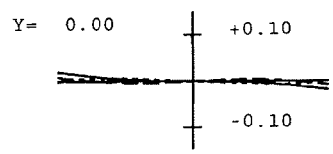
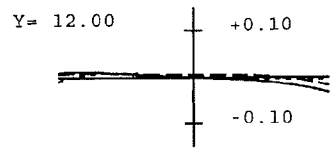
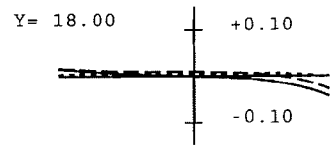
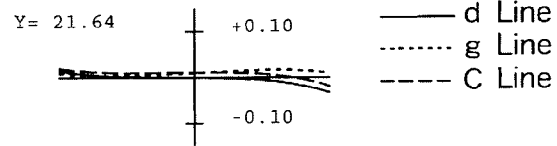

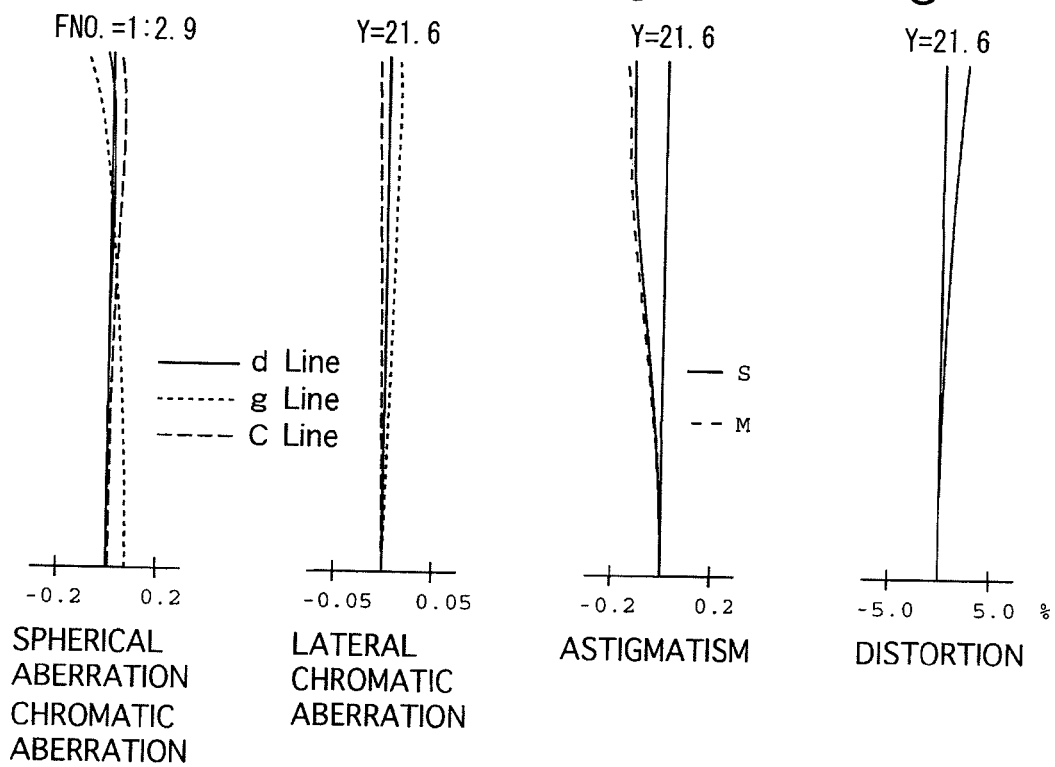

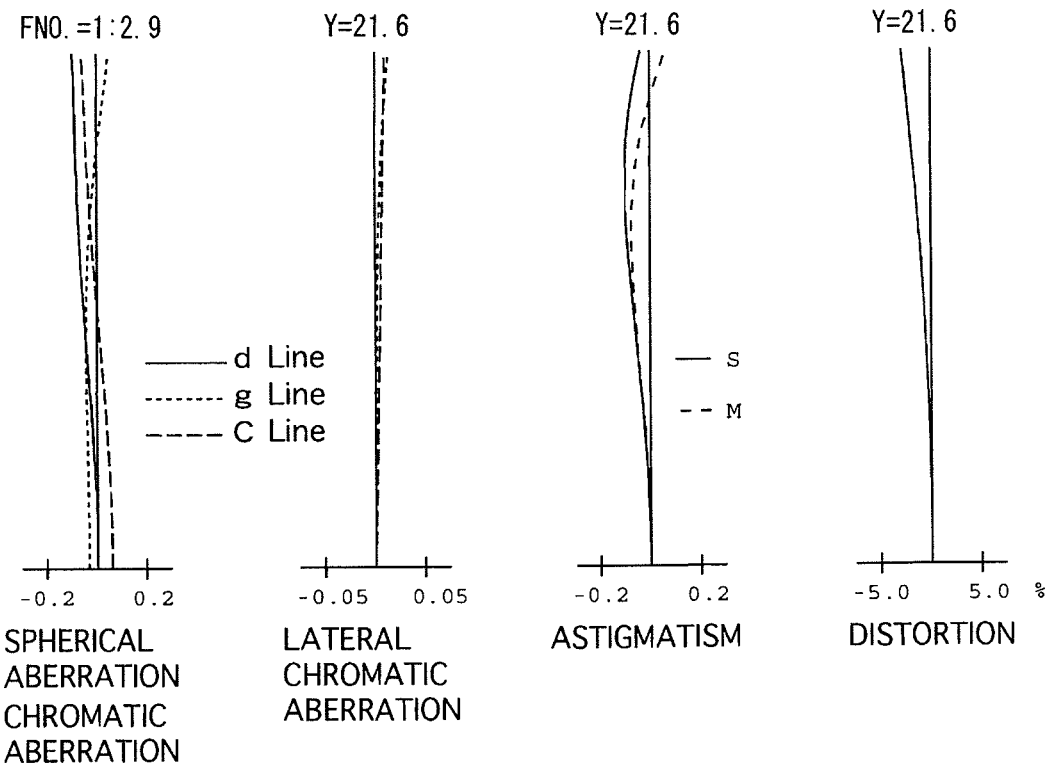
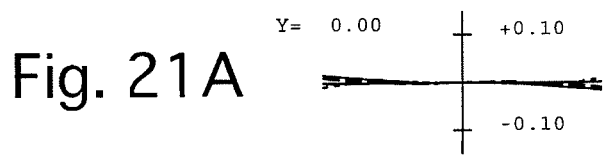
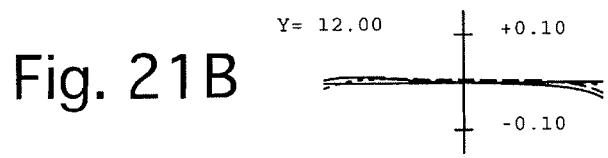
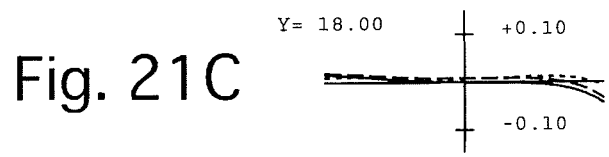
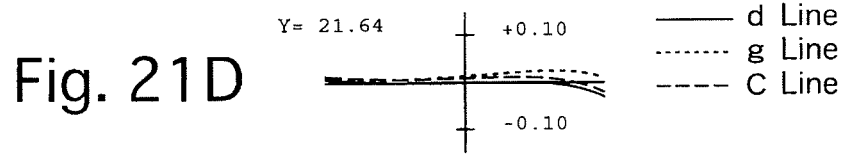

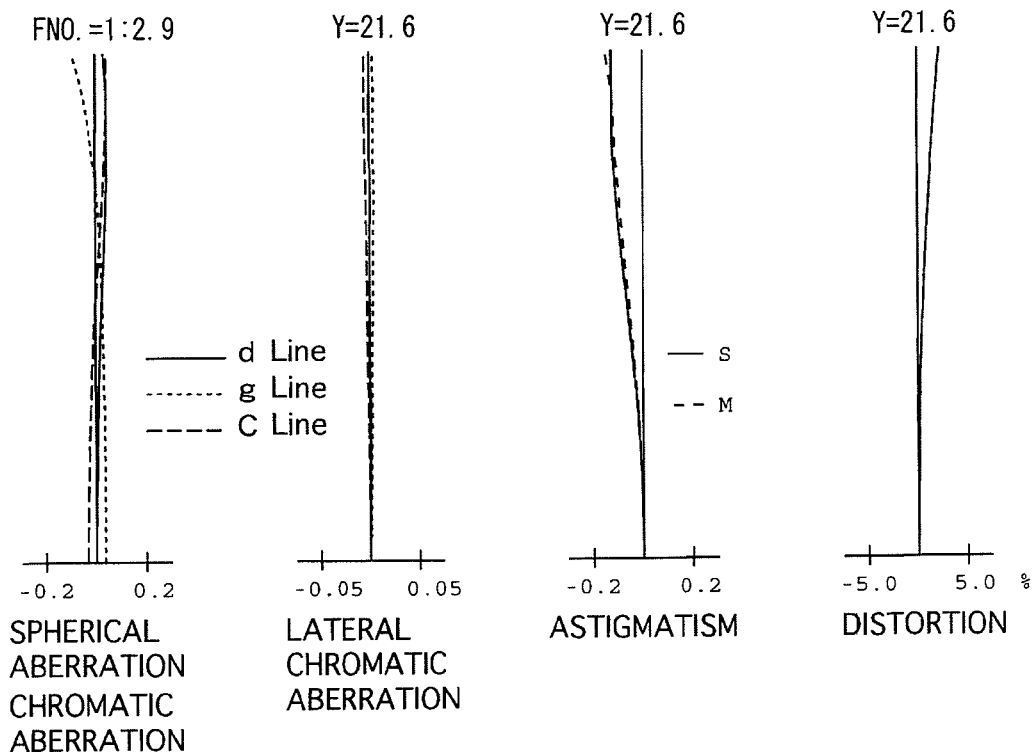
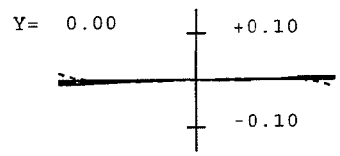
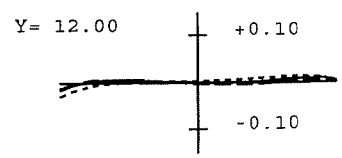
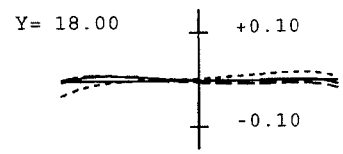
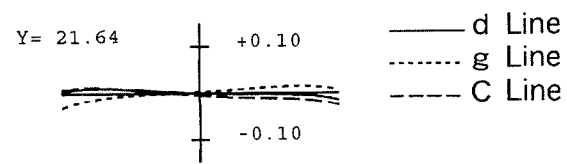

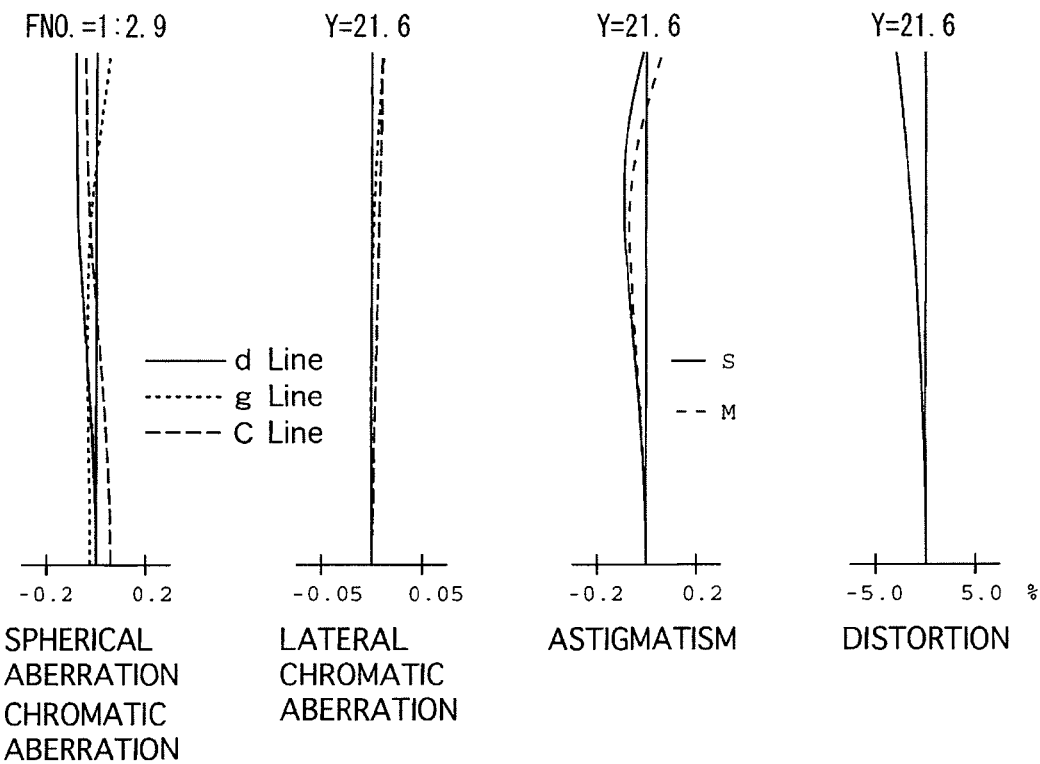
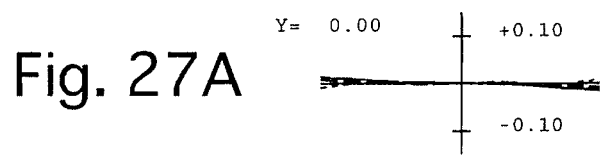
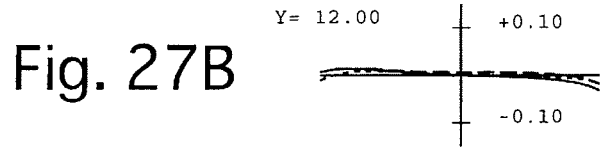
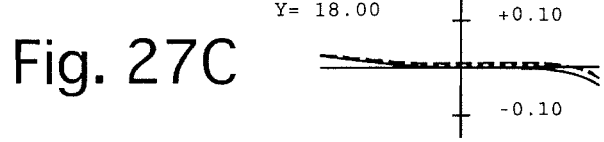
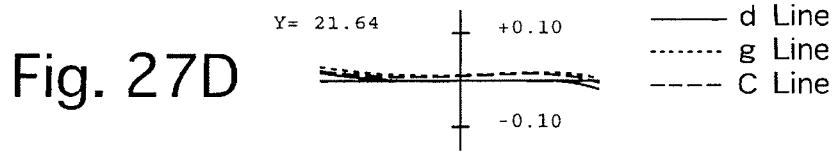

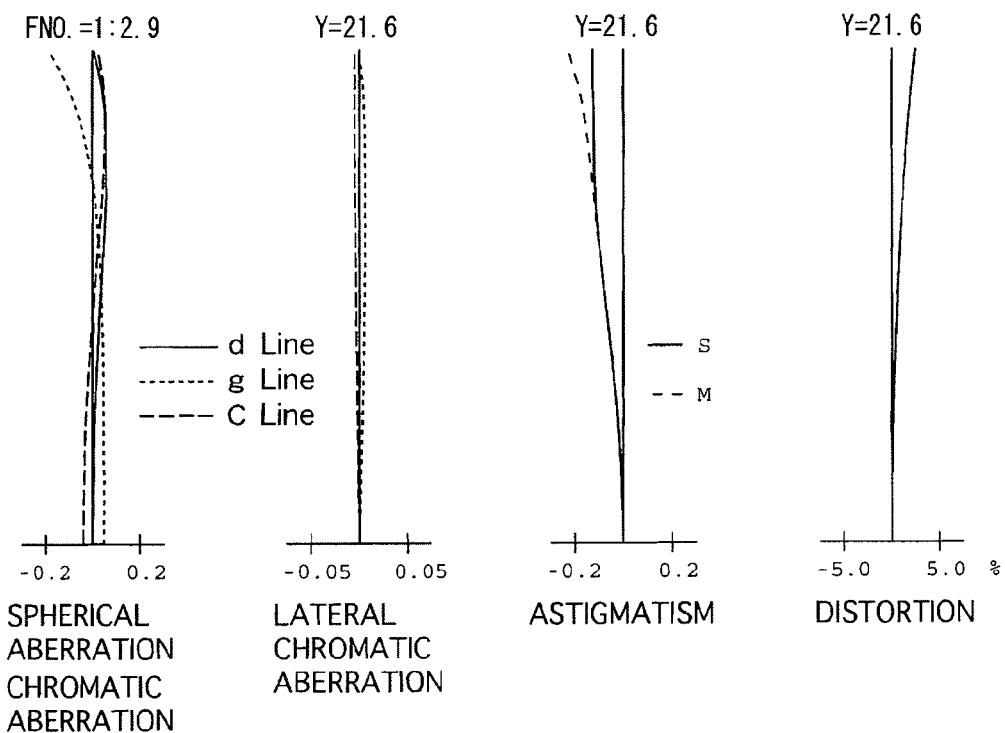
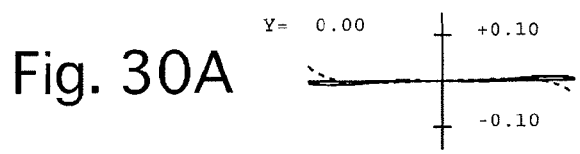
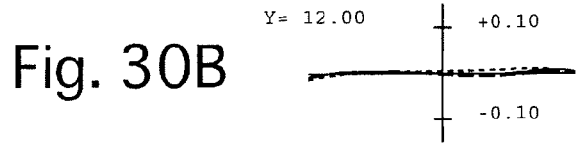
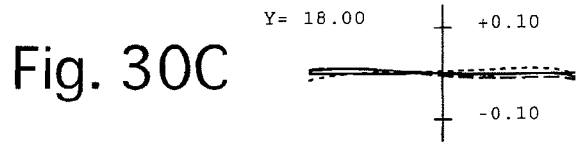
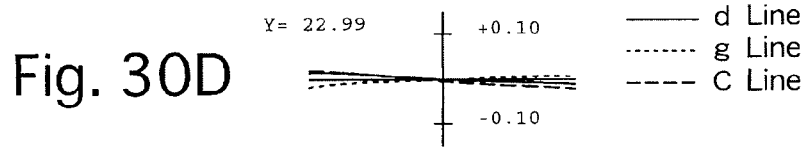

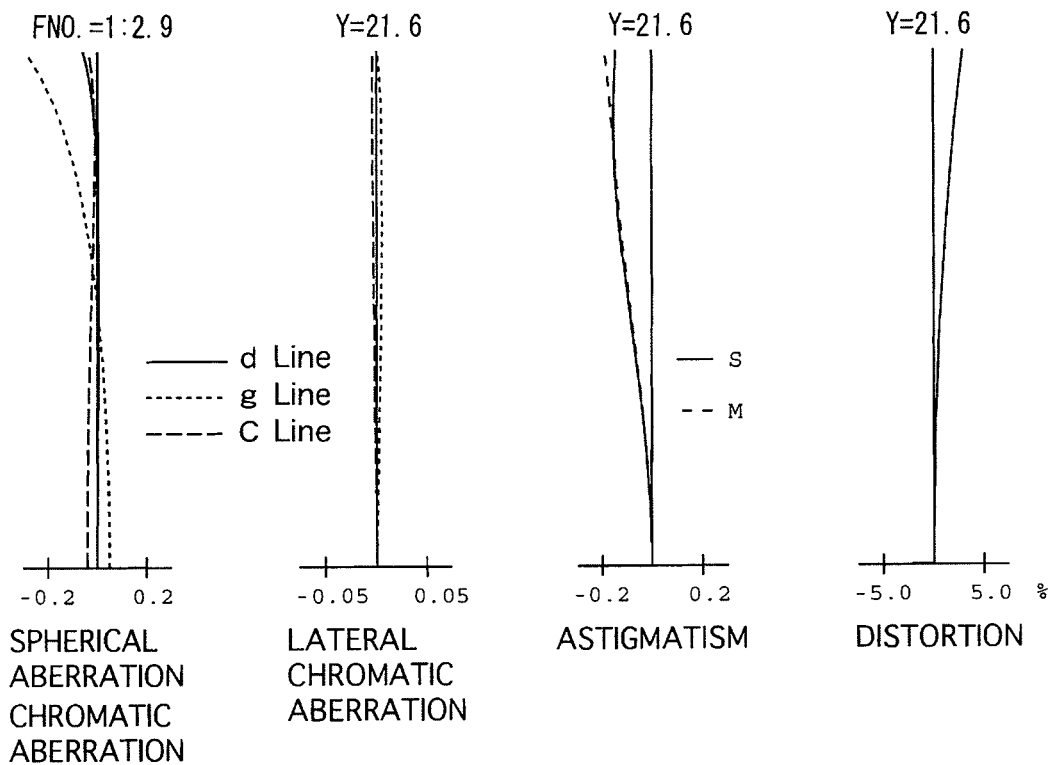

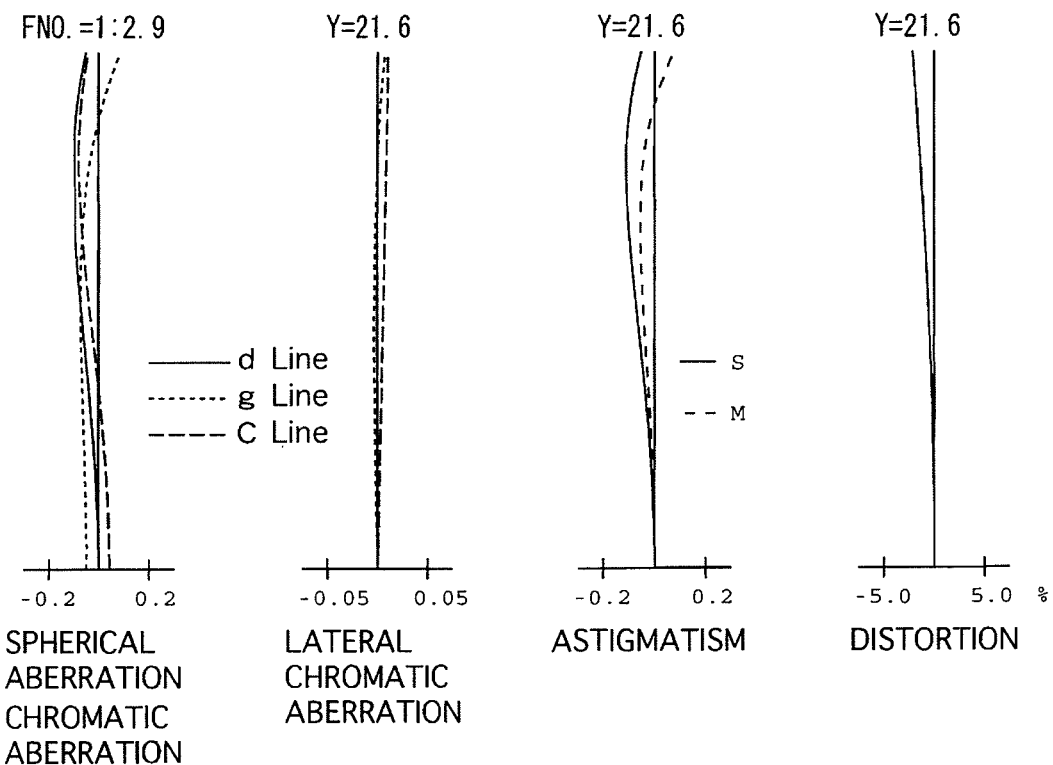

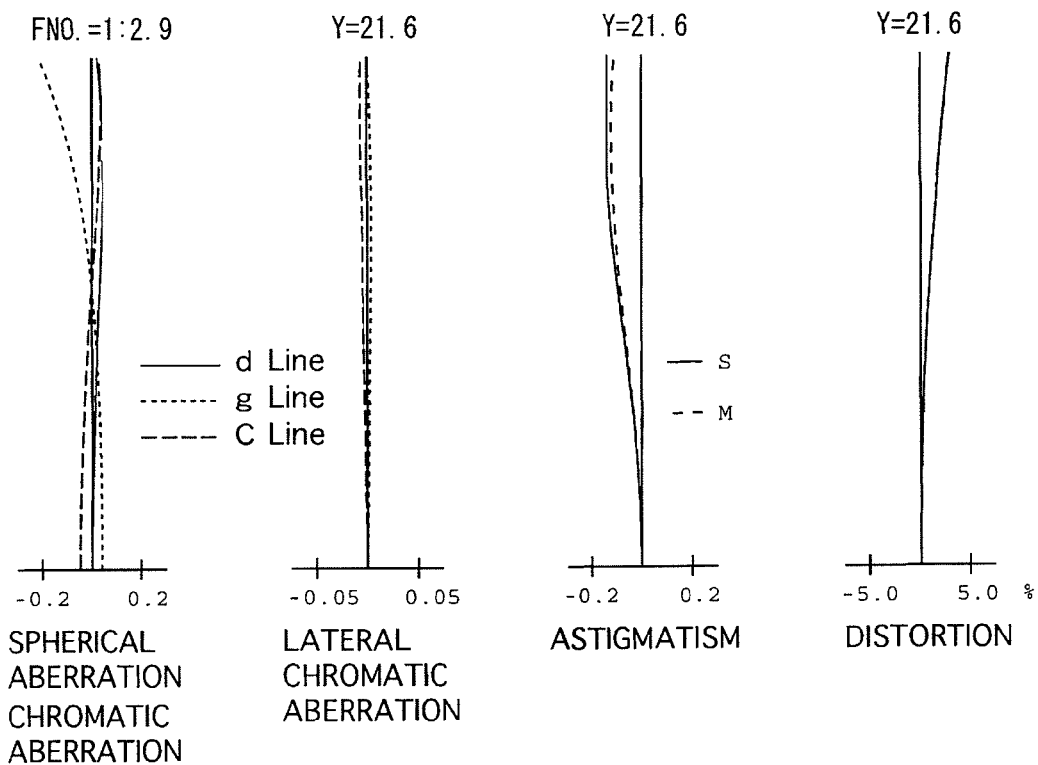

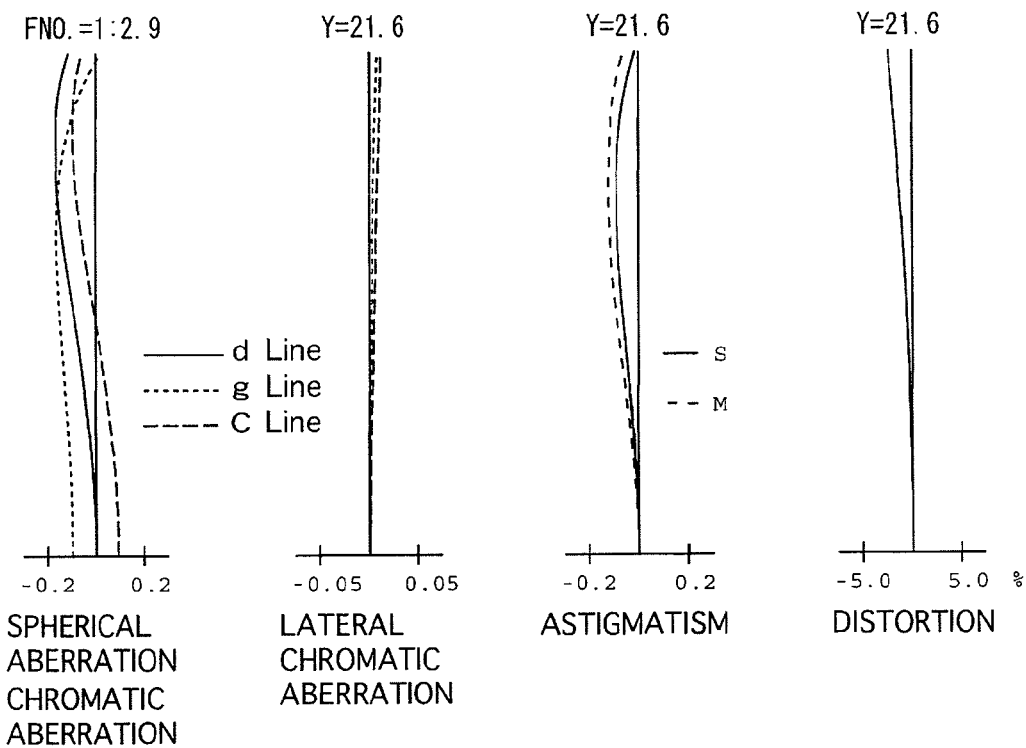
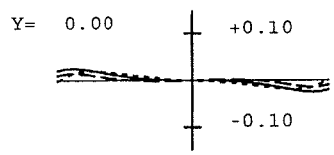
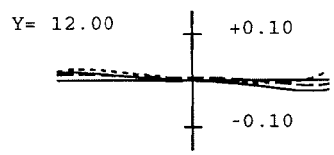
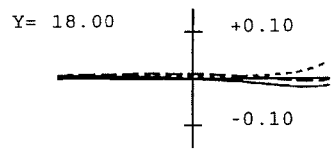
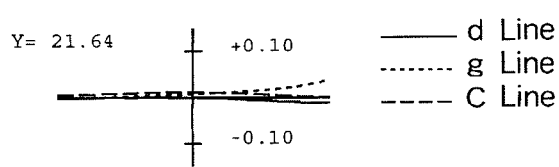

SPHERICAL ABERRATION CHROMATIC ABERRATION / LATERAL CHROMATIC ABERRATION / ASTIGMATISM / DISTORTION

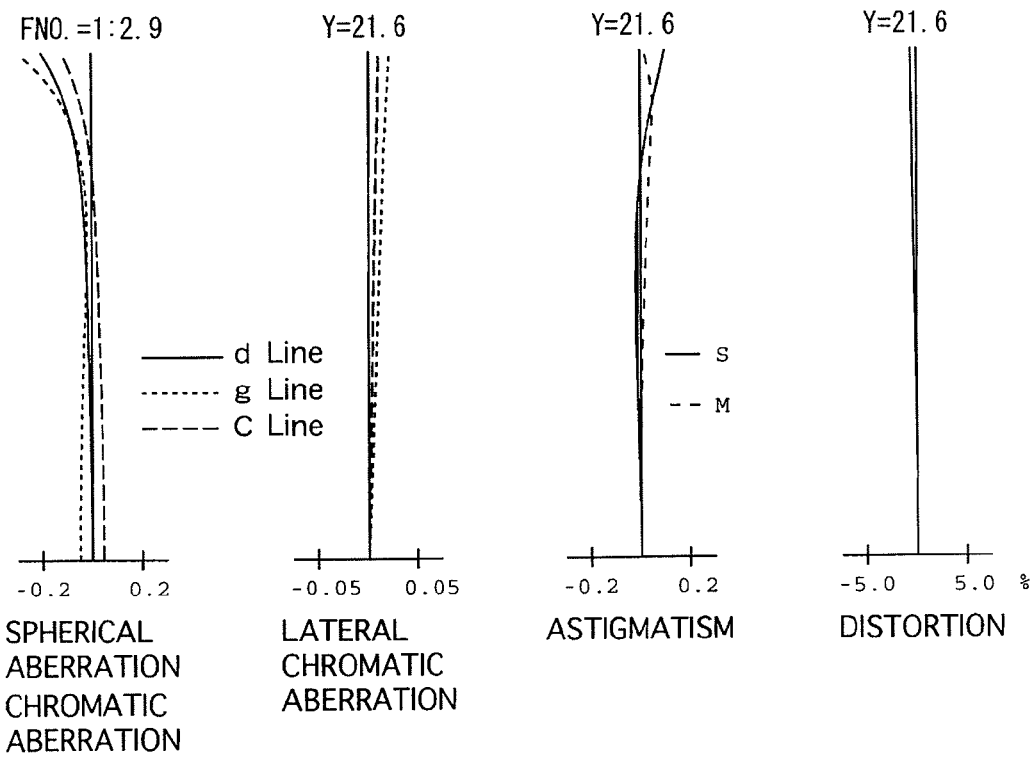

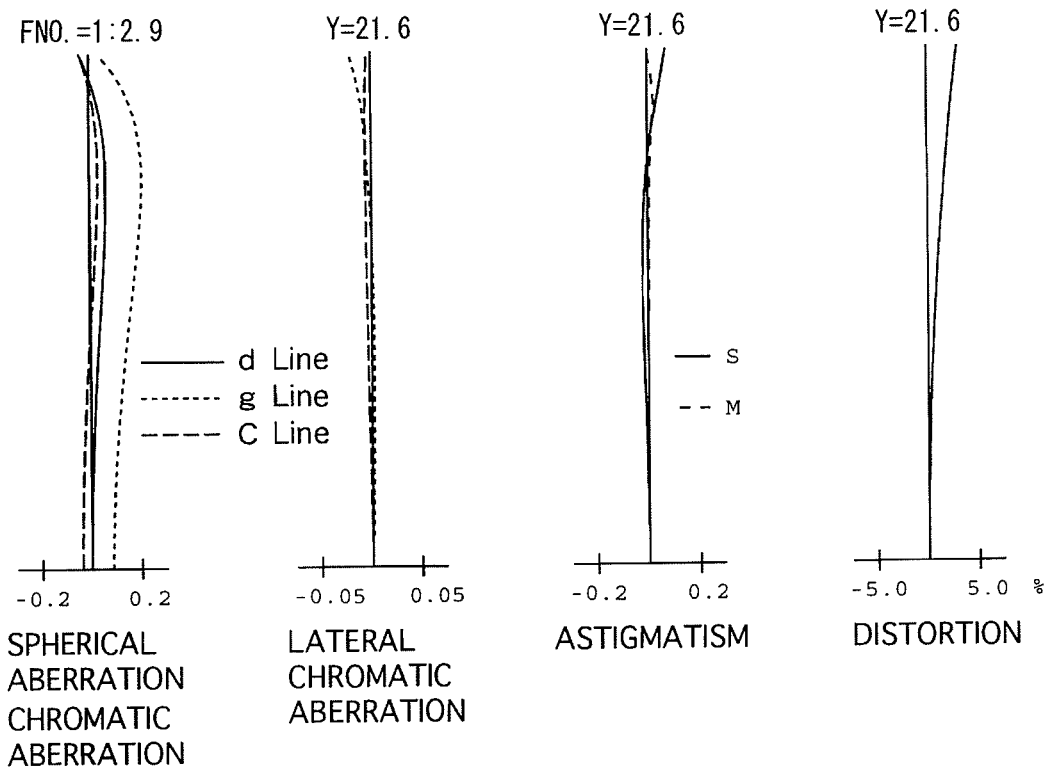

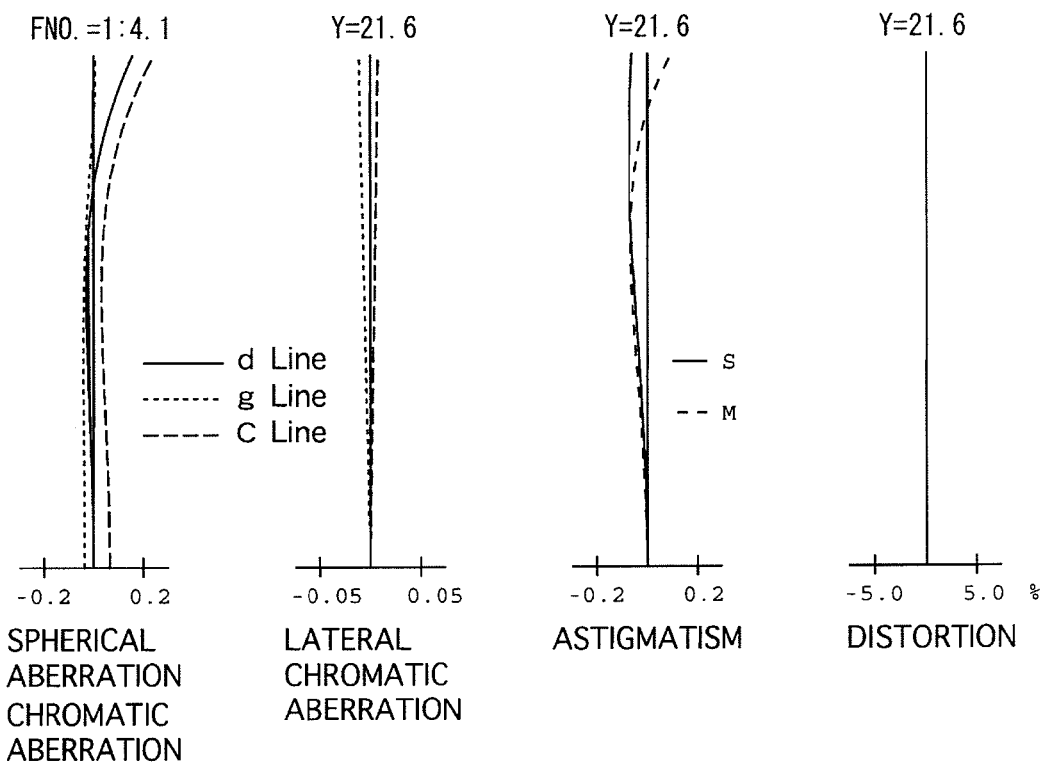

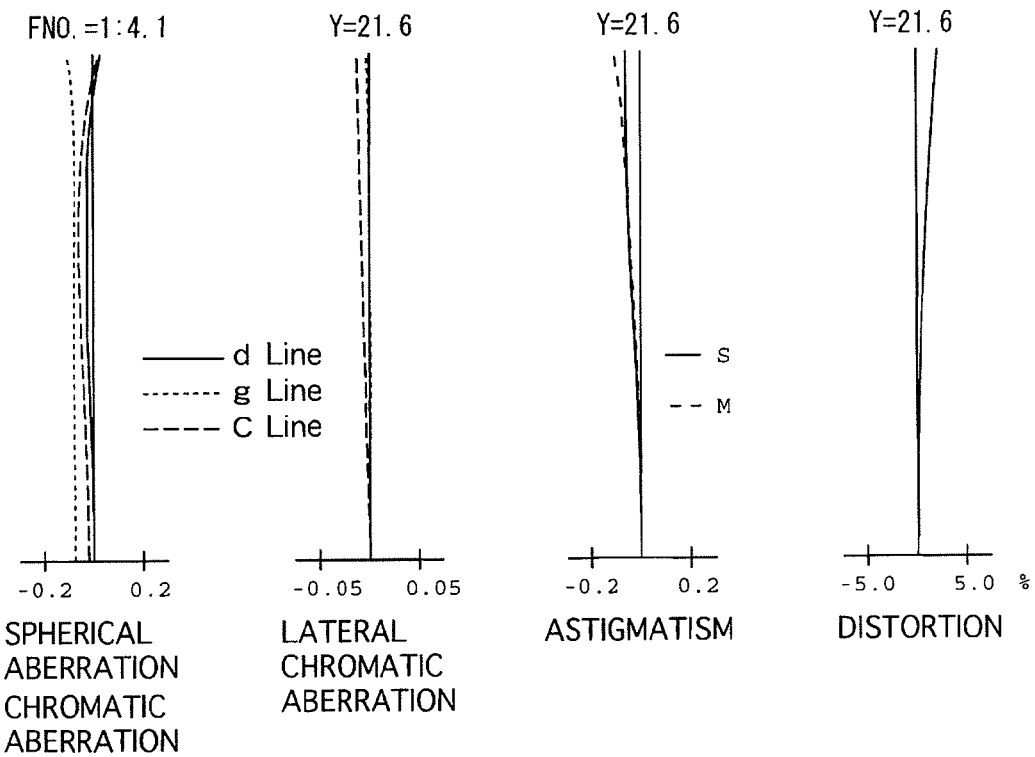
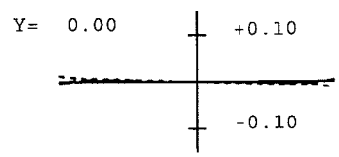
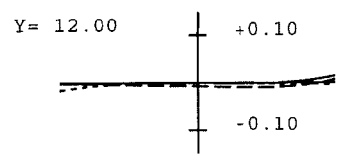
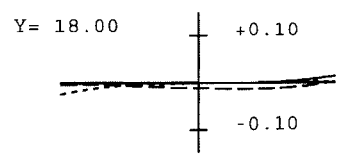
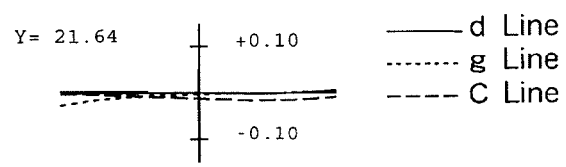

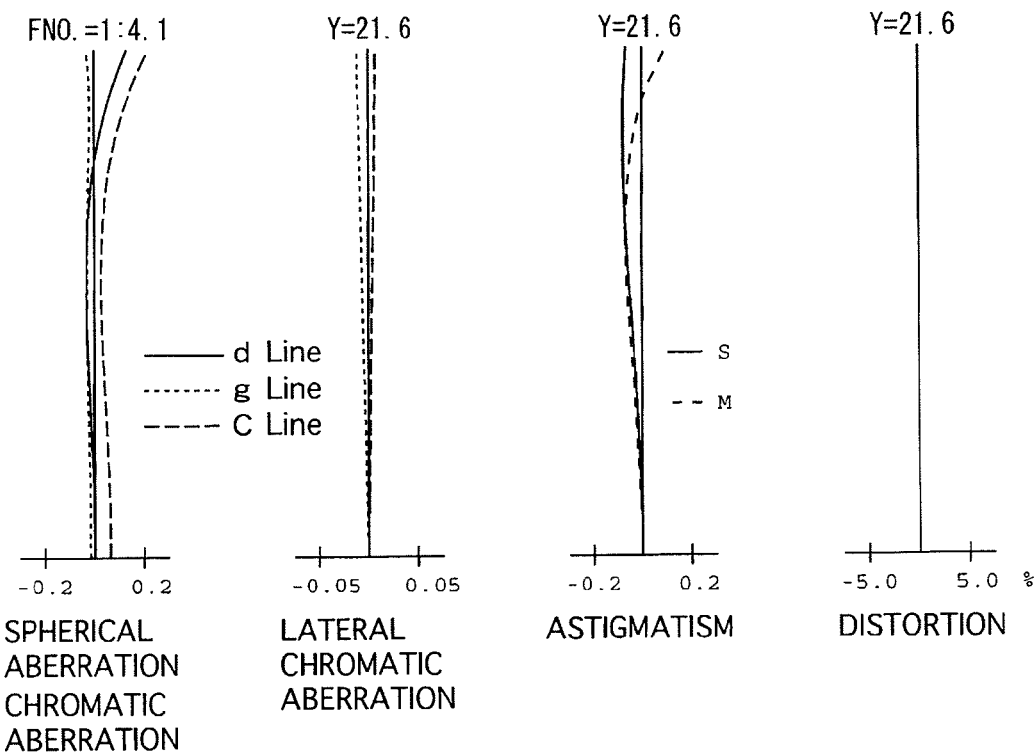
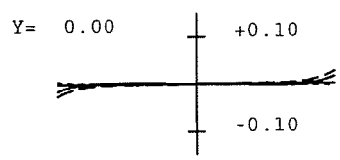
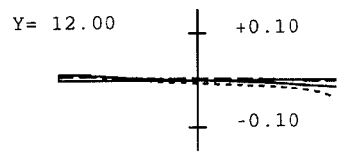
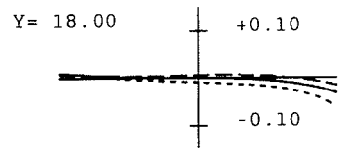
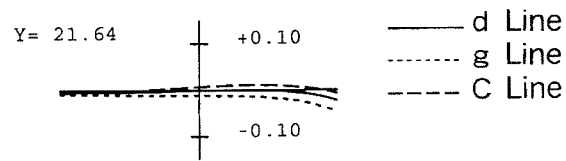

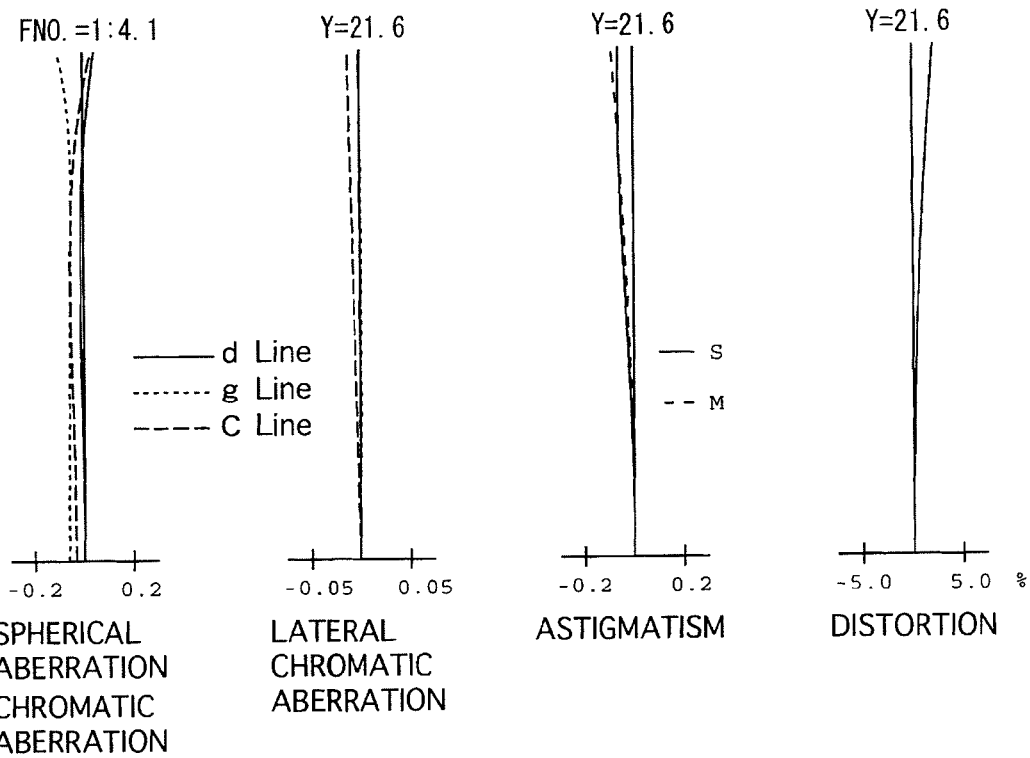
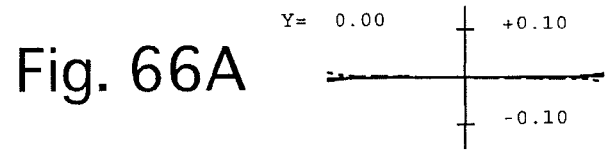
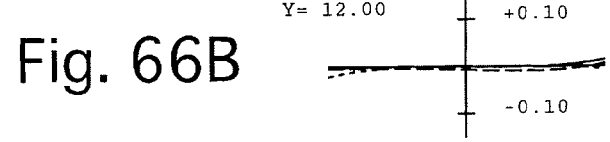
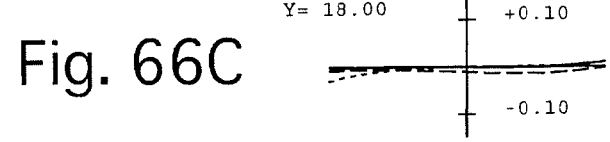
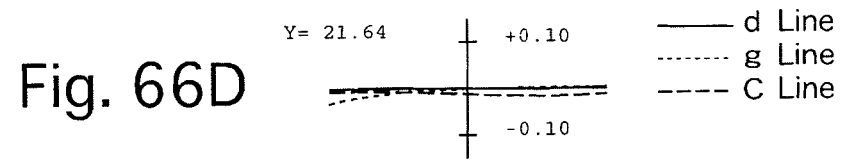

ZOOM LENS SYSTEM

BACKGROUND OF THE INVENTION

1. Field of the Invention

The present invention relates to a zoom lens system, and in particular, relates to a large-aperture telephoto zoom lens system that is favorable for use in an imaging apparatus such as a digital camera, etc.

2. Description of Related Art

In recent years, optical systems used in imaging apparatuses such as digital cameras, etc., high-speed focusing has been in demand in addition to high optical quality, and hence, various optical systems have been proposed in which the focusing lens group provided therein has been miniaturized and reduced in weight. However, in optical systems of the related art, the balance between achieving a favorable optical quality and a favorable miniaturization/reduction in weight of the focusing lens group is at an unsatisfactory level.

In Patent Literature Nos. 1 through 4, in the case where the lens groups are defined (divided from each other) at each air-space between adjacent lens elements that varies in distance therebetween during zooming, a configuration of four lens groups (Patent Literature Nos. 1, 2 and 4) and a configuration of five lens group (Patent Literature No. 3) are disclosed. However, since the balance in refractive power between the lens groups in each zoom lens system in Patent Literature Nos. 1 through 4 is inappropriate, correction of various aberrations such as spherical aberration, coma and distortion, etc., is insufficient. Furthermore, in the zoom lens systems of Patent Literature Nos. 1 and 2, focusing is carried out using a rear half of the first lens group, which has the largest diameter and is heavy, so that the driving load for performing an autofocusing operation is large, and a large change in optical quality (deterioration in optical quality) occurs during focusing. In the zoom lens systems of Patent Literature Nos. 3 and 4, since focusing is carried out using the third lens group, which has a relatively small diameter, the driving load for performing an autofocusing operation is small compared to that in the zoom lens systems in Patent Literature Nos. 1 and 2, which is advantageous; however, a large change in optical quality (deterioration in optical quality) still occurs during focusing.

On the other hand, a zoom lens system configured of five lens groups, i.e., a positive lens group, a negative lens group, a positive lens group, a negative lens group and a positive lens group, is disclosed in each of Patent Literature Nos. 3 and 5. However, since the balance of refractive power of the lens groups of these zoom lens systems is inappropriate, correction of various aberrations such as distortion and field curvature is insufficient.

PATENT LITERATURE

[Patent Literature 1] Japanese Unexamined Patent Publication No. 2008-216480
[Patent Literature 2] Japanese Unexamined Patent Publication No. 2009-288619
[Patent Literature 3] Japanese Unexamined Patent Publication No. 2010-160240
[Patent Literature 4] Japanese Unexamined Patent Publication No. 2011-158599
[Patent Literature 5] Japanese Unexamined Patent Publication No. 2013-174758

SUMMARY OF THE INVENTION

A first objective of the present invention is to provide a zoom lens system in which various aberrations such as spherical aberration, coma and distortion are favorably corrected, while suppressing fluctuation in optical quality (deterioration in optical quality) during focusing using a focusing lens group that is a small burden on the driving load thereof.

A second objective of the present invention is to provide a zoom lens system in which various aberrations such as distortion and field curvature can be favorably corrected.

First Configuration for Achieving First Objective

A zoom lens system according to the first aspect of the present invention is provided with a positive first lens group and a negative second lens group, in that order from the object side, and a positive $n^{th}$ lens group provided closest to the image side. During zooming from the short focal length extremity to the long focal length extremity, the first lens group and the $n^{th}$ lens group remain stationary relative to the imaging plane, and the second lens group moves in a direction of an optical axis of the zoom lens system. A positive $m^{th}$ lens group is provided between the second lens group and the $n^{th}$ lens group. The following conditions (1) and (2) are satisfied:

$$1.23 < f1/fn < 1.50 \quad (1), \text{ and}$$

$$1.20 < fn/fm < 1.60 \quad (2),$$

wherein f1 designates the focal length of the first lens group, fn designates the focal length of the $n^{th}$ lens group, wherein n is a positive integer of 4 or greater, and fm designates the focal length of the $m^{th}$ lens group, wherein m is a positive integer of 3 or greater.

In lens systems, in general, there are various ways to define a "lens group" (to define how the lens groups are divided from each other).

A "lens group" in "three lens groups configured of four lens elements" can be defined at each air-space between adjacent lens elements. For example, a single lens element itself would be considered as a "lens group", and a plurality of lens elements that are cemented to each other constitute a single "lens group" (since there is no "air-space" between these plurality of lens elements). Accordingly, "three lens groups configured of four lens elements" would refer to one cemented lens configured of two lens elements, and two single lens elements.

In regard to "a zoom lens system having five lens groups", the lens groups thereof are typically defined (unless otherwise specified) at each air-space between adjacent lens elements that varies in distance therebetween during zooming. Furthermore, it is common for "lens groups" in a fixed focal-length lens system to be defined in some manner (distribution rule), e.g., to be defined at each air-space between adjacent lens elements that varies in distance therebetween during focusing, to be defined at either side of a diaphragm, or to be defined at a maximum air-space between adjacent lens elements.

Accordingly, in the present specification, a "lens group" is defined at each a space between adjacent lens elements that varies in distance therebetween during zooming, or at a space between adjacent lens elements that varies in distance therebetween during focusing. Hence, as disclosed in the first embodiment of Patent Literature 1, since a lens group is defined at either side of an air-space distance d3 between adjacent lens elements, in which the distance d3 does not vary during zooming but varies during focusing, the distance d3 would define a lens group at either side thereof (between adjacent lens elements) in the illustrated embodiments (present specification); accordingly, the lens system of the first embodiment of Patent Literature 1 is herein defined as having five lens groups rather than four lens groups.

It is desirable for at least two lens groups, including the $m^{th}$ lens group, to be provided between the second lens group and the $n^{th}$ lens group.

It is desirable for a negative lens group other than the $m^{th}$ lens group to be provided between the second lens group and the $n^{th}$ lens group.

It is desirable for the first lens group to include a negative lens element having a concave surface on the image side, a positive lens element having a convex surface on the object side, a positive lens element having a convex surface on the object side, and a positive lens element having a convex surface on the object side, in that order from the object side, and wherein the following condition (3) is satisfied:

$$\nu dp2 \geq \nu dp1 > \nu dp3 \qquad (3),$$

wherein vdp1 designates the Abbe number at the d-line of the positive lens element that is positioned closest to the object side of the positive lens elements that are provided within the first lens group, vdp2 designates the Abbe number at the d-line of the positive lens element that is positioned second closest to the object side of the positive lens elements that are provided within the first lens group, and vdp3 designates the Abbe number at the d-line of the positive lens element that is positioned third closest to the object side of the positive lens elements that are provided within the first lens group.

It is desirable for the $n^{th}$ lens group to include at least two positive lens elements, and wherein the following conditions (4) and (5) are satisfied:

$$Np1-Np2>0 \qquad (4), \text{ and}$$

$$\nu ave > 68 \qquad (5),$$

wherein Np1 designates the refractive index at the d-line of the positive lens element that is provided closest to the object side out of the positive lens elements within the $n^{th}$ lens group, Np2 designates the refractive index at the d-line of the positive lens element that is provided second closest to the object side out of the positive lens elements within the $n^{th}$ lens group, and vave designates the average of the Abbe numbers at the d-line of the positive lens element positioned closest to the object side, within the $n^{th}$ lens group, and the positive lens element positioned second closest to the object side within the $n^{th}$ lens group.

It is desirable for the zoom lens system to satisfy the following condition (5') within the scope of condition (5):

$$\nu ave > 72 \qquad (5').$$

It is desirable for an intermediate positive lens element which satisfies the following conditions (6), (7) and (8) to be provided between the lens element that is provided closest to the object side within the $n^{th}$ lens group and the lens element that is provided closest to the image side within the $n^{th}$ lens group:

$$0.5 < DnP/LDn < 0.75 \qquad (6),$$

$$0.9 < fn/fnP < 1.4 \qquad (7), \text{ and}$$

$$60 < \nu nP < 75 \qquad (8),$$

wherein DnP designates the distance from the surface on the object side of the lens element provided closest to the object side, within the $n^{th}$ lens group, to the surface on the object side of the intermediate lens element, LDn designates the thickness of the $n^{th}$ lens group (the distance from the surface on the object side of the $n^{th}$ lens group to the surface on the image side of the $n^{th}$ lens group), fn designates the focal length of the $n^{th}$ lens group, fnP designates the focal length of the intermediate lens element which is provided within the $n^{th}$ lens group, and vnP designates the Abbe number at the d-line of the intermediate lens element which is provided within the $n^{th}$ lens group.

It is desirable for the zoom lens system to satisfy the following condition (6') within the scope of condition (6):

$$0.55 < DnP/LDn < 0.75 \qquad (6').$$

It is desirable for the following condition (9) to be satisfied:

$$-8.0 < fN/fm < -1.5 \qquad (9),$$

wherein fN designates the focal length of the negative lens group that is provided between the second lens group and the $n^{th}$ lens group, and fm designates the focal length of the $m^{th}$ lens group. It is desirable for the zoom lens system to satisfy the following condition (9') within the scope of condition (9):

$$-4.0 < fN/fm < -1.5 \qquad (9').$$

It is desirable for the negative lens group that is provided between second lens group and the $n^{th}$ lens group to include a negative single lens element having a convex surface on the image side, and wherein the following conditions (10) and (11) are satisfied:

$$1.55 < NdN < 1.73 \qquad (10), \text{ and}$$

$$30 < \nu dN < 60 \qquad (11),$$

wherein NdN designates the refractive index at the d-line of a negative single lens element which constitutes the negative lens group which is provided between the second lens group and the $n^{th}$ lens group, and vdN designates the Abbe number at the d-line of a negative single lens element which constitutes the negative lens group which is provided between the second lens group and the $n^{th}$ lens group.

Second Configuration for Achieving Second Objective

In another configuration, a zoom lens system is provided, including a positive first lens group, a negative second lens group, a positive third lens group, a negative fourth lens group, and a positive fifth lens group, in that order from the object side. During zooming from the short focal length extremity to the long focal length extremity, the first lens group and the fifth lens group remain stationary relative to the imaging plane, and the second through fourth lens groups move in a direction of an optical axis of the zoom lens system. The following condition (12) is satisfied:

$$-1.76 < f4/f1 < -1.49 \qquad (12),$$

wherein f1 designates the focal length of the first lens group, and f4 designates the focal length of the fourth lens group.

It is desirable for the following condition (13) to be satisfied:

$$5.0 < f4/f2 < 8.5 \qquad (13),$$

wherein f2 designates the focal length of the second lens group, and f4 designates the focal length of the fourth lens group.

It is desirable for the zoom lens system to satisfy the following condition (13') within the scope of condition (13):

$$5.0 < f4/f2 < 7.0 \qquad (13').$$

It is desirable for the following condition (14) to be satisfied:

$$-4.0 < f4/f5 < -1.5 \quad (14),$$

wherein f4 designates the focal length of the fourth lens group, and f5 designates the focal length of the fifth lens group.

It is desirable for the zoom lens system to satisfy the following condition (14') within the scope of condition (14):

$$-3.0 < f4/f5 < -1.8 \quad (14').$$

It is desirable for the following condition (15) to be satisfied:

$$-5.0 < f5/f2 < -1.0 \quad (15),$$

wherein f2 designates the focal length of the second lens group, and f5 designates the focal length of the fifth lens group.

It is desirable for the zoom lens system to satisfy the following condition (15') within the scope of condition (15):

$$-3.2 < f5/f2 < -2.0 \quad (15').$$

It is desirable for the following condition (16) to be satisfied:

$$-0.4 < f3/f4 < -0.2 \quad (16),$$

wherein f3 designates the focal length of the third lens group, and f4 designates the focal length of the fourth lens group.

It is desirable for the fourth lens group to include a negative single lens element having a convex surface on the image side.

It is desirable for the following conditions (17) and (18) to be satisfied:

$$1.55 < Nd4 < 1.75 \quad (17), \text{ and}$$

$$30 < vd4 < 70 \quad (18),$$

wherein Nd4 designates the refractive index at the d-line of the negative single lens element that constitutes the fourth lens group, and vd4 designates the Abbe number at the d-line of the negative single lens element that constitutes the fourth lens group.

It is desirable for the zoom lens system to satisfy the following condition (17') within the scope of condition (17):

$$1.55 < Nd4 < 1.73 \quad (17').$$

It is desirable for the zoom lens system to satisfy the following condition (18') within the scope of condition (18):

$$40 < vd4 < 55 \quad (18').$$

It is desirable for the first lens group to include a negative lens element having a concave surface on the image side, a positive lens element having a convex surface on the object side, a positive lens element having a convex surface on the object side, and a positive lens element having a convex surface on the object side, in that order from the object side, wherein the following condition (19) is satisfied:

$$vdp2 \geq vdp1 > vdp3 \quad (19),$$

wherein vdp1 designates the Abbe number at the d-line of the positive lens element that is positioned closest to the object side of the positive lens elements that are provided within the first lens group, vdp2 designates the Abbe number at the d-line of the positive lens element that is positioned second closest to the object side of the positive lens elements that are provided within the first lens group, and vdp3 designates the Abbe number at the d-line of the positive lens element that is positioned third closest to the object side of the positive lens elements that are provided within the first lens group.

It is desirable for the fifth lens group to include at least two positive lens elements, and wherein the following conditions (20) and (21) are satisfied:

$$N5p1 - N5p2 > 0.03 \quad (20), \text{ and}$$

$$v5ave > 68 \quad (21),$$

wherein N5p1 designates the refractive index at the d-line of the positive lens element that is provided closest to the object side out of the positive lens elements within the fifth lens group, N5p2 designates the refractive index at the d-line of the positive lens element that is provided second closest to the object side out of the positive lens elements within the fifth lens group, and v5ave designates the average of the Abbe numbers at the d-line of the positive lens element positioned closest to the object side, within the fifth lens group, and the positive lens element positioned second closest to the object side within the fifth lens group.

It is desirable for the zoom lens system to satisfy the following condition (20') within the scope of condition (20):

$$N5p1 - N5p2 > 0.08 \quad (20').$$

It is desirable for the zoom lens system to satisfy the following condition (21') within the scope of condition (21):

$$v5ave > 72 \quad (21').$$

It is desirable for an intermediate positive lens element which satisfies the following conditions (22), (23) and (24) to be provided between the lens element provided closest to the object side within the fifth lens group and the lens element provided closest to the image side within the fifth lens group:

$$0.45 < D5P/LD5 < 0.8 \quad (22),$$

$$0.9 < f5/f5P < 1.7 \quad (23), \text{ and}$$

$$55 < v5P < 75 \quad (24),$$

wherein D5P designates the distance from the surface on the object side of the lens element provided closest to the object side, within the fifth lens group, to the surface on the object side of the intermediate lens element, LD5 designates the thickness of the fifth lens group (the distance from the surface on the object side of the fifth lens group to the surface on the image side of the fifth lens group), f5 designates the focal length of the fifth lens group, f5P designates the focal length of the intermediate lens element which is provided within the fifth lens group, and v5P designates the Abbe number at the d-line of the intermediate lens element which is provided within the fifth lens group.

It is desirable for the zoom lens system to satisfy the following condition (22') within the scope of condition (22):

$$0.55 < D5P/LD5 < 0.8 \quad (22').$$

It is desirable for the zoom lens system to satisfy the following condition (23') within the scope of condition (23):

$$0.9 < f5/f5P < 1.5 \quad (23').$$

It is desirable for the zoom lens system to satisfy the following condition (24') within the scope of condition (24):

$$63 < v5P < 75 \quad (24').$$

According to the first aspect of the present invention, a zoom lens system is achieved in which various aberrations such as spherical aberration, coma and distortion are favorably corrected, while suppressing change in optical quality (deterioration in optical quality) during focusing using a focusing lens group that is a small burden on the driving load thereof.

According to the second aspect of the present invention, a zoom lens system is achieved in which various aberrations such as distortion and field curvature can be favorably corrected.

The present disclosure relates to subject matter contained in Japanese Patent Application Nos. 2014-208076 and 2014-208077 (both filed on Oct. 9, 2014) which are expressly incorporated herein in their entireties.

BRIEF DESCRIPTION OF THE DRAWINGS

The present invention will be discussed below in detail with reference to the accompanying drawings, in which:

FIG. 1 shows a lens arrangement of a first numerical embodiment of a zoom lens system, according to the present invention, at the short focal length extremity when focused on an object at infinity;

FIGS. 5A, 5B, 5C and 5D show various aberrations that occurred in the lens arrangement shown in FIG. 4;

FIGS. 6A, 6B, 6C and 6D show lateral aberrations that occurred in the lens arrangement shown in FIG. 1;

FIGS. 11A, 11B, 11C and 11D show various aberrations that occurred in the lens arrangement shown in FIG. 10;

FIGS. 12A, 12B, 12C and 12D show lateral aberrations that occurred in the lens arrangement shown in FIG. 10;

FIGS. 14A, 14B, 14C and 14D show various aberrations that occurred in the lens arrangement shown in FIG. 13;

FIGS. 15A, 15B, 15C and 15D show lateral aberrations that occurred in the lens arrangement shown in FIG. 13;

FIGS. 17A, 17B, 17C and 17D show various aberrations that occurred in the lens arrangement shown in FIG. 16;

FIGS. 18A, 18B, 18C and 18D show lateral aberrations that occurred in the lens arrangement shown in FIG. 16;

FIGS. 20A, 20B, 20C and 20D show various aberrations that occurred in the lens arrangement shown in FIG. 19;

FIGS. 21A, 21B, 21C and 21D show lateral aberrations that occurred in the lens arrangement shown in FIG. 19;

FIGS. 23A, 23B, 23C and 23D show various aberrations that occurred in the lens arrangement shown in FIG. 22;

FIGS. 24A, 24B, 24C and 24D show lateral aberrations that occurred in the lens arrangement shown in FIG. 22;

FIGS. 26A, 26B, 26C and 26D show various aberrations that occurred in the lens arrangement shown in FIG. 25;

FIGS. 27A, 27B, 27C and 27D show lateral aberrations that occurred in the lens arrangement shown in FIG. 25;

FIGS. 29A, 29B, 29C and 29D show various aberrations that occurred in the lens arrangement shown in FIG. 28;

FIGS. 30A, 30B, 30C and 30D show lateral aberrations that occurred in the lens arrangement shown in FIG. 28;

FIGS. 35A, 35B, 35C and 35D show various aberrations that occurred in the lens arrangement shown in FIG. 34;

FIGS. 36A, 36B, 36C and 36D show lateral aberrations that occurred in the lens arrangement shown in FIG. 34;

FIGS. 38A, 38B, 38C and 38D show various aberrations that occurred in the lens arrangement shown in FIG. 37;

FIGS. 39A, 39B, 39C and 39D show lateral aberrations that occurred in the lens arrangement shown in FIG. 37;

FIGS. 41A, 41B, 41C and 41D show various aberrations that occurred in the lens arrangement shown in FIG. 40;

FIGS. 42A, 42B, 42C and 42D show lateral aberrations that occurred in the lens arrangement shown in FIG. 40;

FIGS. 44A, 44B, 44C and 44D show various aberrations that occurred in the lens arrangement shown in FIG. 43;

FIGS. 45A, 45B, 45C and 45D show lateral aberrations that occurred in the lens arrangement shown in FIG. 43;

FIGS. 50A, 50B, 50C and 50D show various aberrations that occurred in the lens arrangement shown in FIG. 49;

FIGS. 51A, 51B, 51C and 51D show lateral aberrations that occurred in the lens arrangement shown in FIG. 49;

FIGS. 53A, 53B, 53C and 53D show various aberrations that occurred in the lens arrangement shown in FIG. 52;

FIGS. 54A, 54B, 54C and 54D show lateral aberrations that occurred in the lens arrangement shown in FIG. 52;

FIGS. 56A, 56B, 56C and 56D show various aberrations that occurred in the lens arrangement shown in FIG. 55;

FIGS. 57A, 57B, 57C and 57D show lateral aberrations that occurred in the lens arrangement shown in FIG. 55;

FIGS. 59A, 59B, 59C and 59D show various aberrations that occurred in the lens arrangement shown in FIG. 58;

FIGS. 60A, 60B, 60C and 60D show lateral aberrations that occurred in the lens arrangement shown in FIG. 58;

FIGS. 62A, 62B, 62C and 62D show various aberrations that occurred in the lens arrangement shown in FIG. 61;

FIGS. 63A, 63B, 63C and 63D show lateral aberrations that occurred in the lens arrangement shown in FIG. 61;

FIGS. 65A, 65B, 65C and 65D show various aberrations that occurred in the lens arrangement shown in FIG. 64;

FIGS. 66A, 66B, 66C and 66D show lateral aberrations that occurred in the lens arrangement shown in FIG. 64;

DESCRIPTION OF THE EMBODIMENTS

Figure 67:
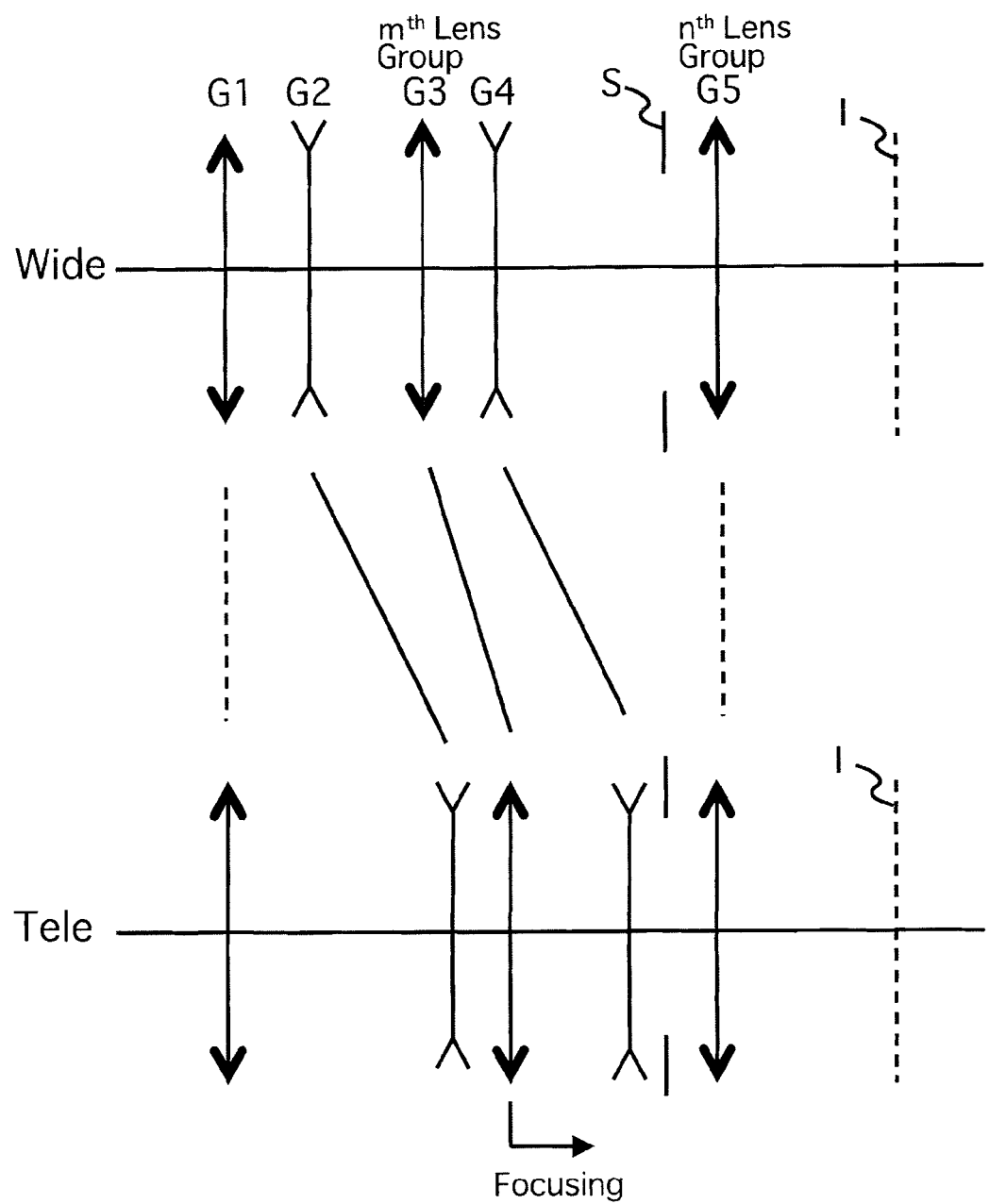
FIG. 67 shows a first zoom path of the zoom lens system according to the present invention.

As shown in the zoom path diagrams in FIG. 67, the zoom lens system of the first through seventh numerical embodiments is configured of a positive first lens group G1, a negative second lens group G2, a positive third lens group ($m^{th}$ lens group) G3, a negative fourth lens group G4 and a positive fifth lens group ($n^{th}$ lens group) G5, in that order from the object side. A diaphragm S is positioned between the fourth lens group G4 and the fifth lens group G5 (immediately in front of the fifth lens group G5). "I" designates the image plane.

As shown in the zoom path diagram in FIG. 67, in the zoom lens system of the first through seventh numerical embodiments, when zooming from the short focal length extremity (Wide) to the long focal length extremity (Tele), the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases.

More specifically, when zooming from the short focal length extremity to the long focal length extremity, the first lens group G1 remains stationary relative to the imaging plane I (does not move in the optical axis direction), the second through fourth lens groups G2 through G4 move monotonically toward the image side, and the fifth lens group G5 remains stationary together with the diaphragm S (the fifth lens group G5 does not move in the optical axis direction). It is possible, in an alternative embodiment, for the third lens group G3, when zooming from the short focal length extremity to the long focal length extremity, to first move toward the object side (or image side) and thereafter return (U-turn) toward the image side (or object side).

Figure 68:
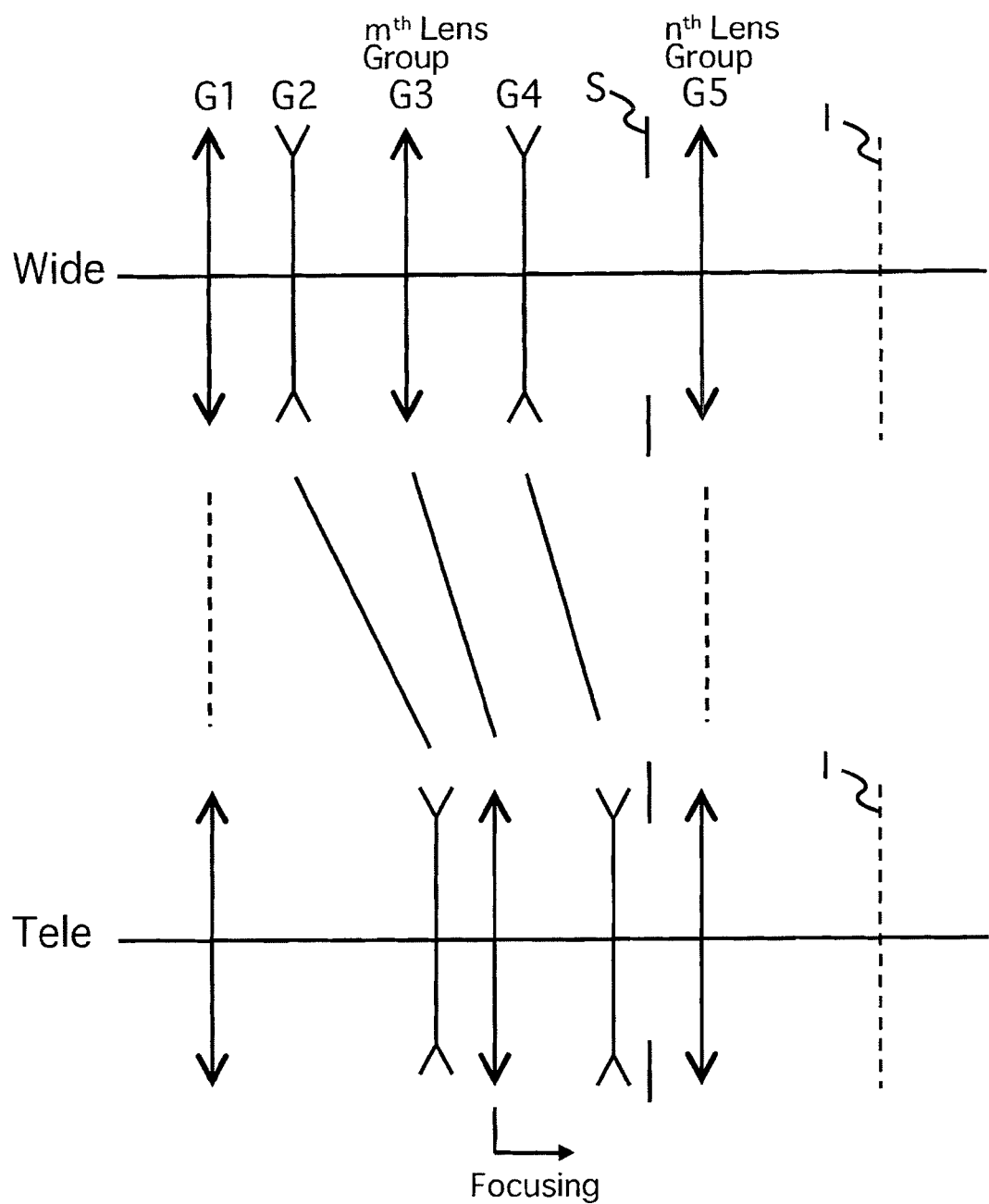
FIG. 68 shows a second zoom path of the zoom lens system according to the present invention.

As shown in the zoom path diagram in FIG. 68, in the zoom lens system of the eighth numerical embodiment, when zooming from the short focal length extremity (Wide) to the long focal length extremity (Tele), the distance between the first lens group G1 and the second lens group G2 increases, the distance between the second lens group G2 and the third lens group G3 decreases, the distance between the third lens group G3 and the fourth lens group G4 does not change (remains constant), and the distance between the fourth lens group G4 and the fifth lens group G5 decreases.

More specifically, when zooming from the short focal length extremity to the long focal length extremity, the first lens group G1 remains stationary relative to the imaging plane I (does not move in the optical axis direction), the second through fourth lens groups G2 through G4 move monotonically toward the image side, and the fifth lens group G5 remains stationary together with the diaphragm S (the fifth lens group G5 does not move in the optical axis direction). It is possible, in an alternative embodiment, for the third lens group G3 and the fourth lens group G4, when zooming from the short focal length extremity to the long focal length extremity, to first move toward the object side (or image side) and thereafter return (U-turn) toward the image side (or object side). In the case where the fourth lens group G4 U-turns when zooming from the short focal length extremity to the long focal length extremity, the distance between the fourth lens group G4 and the fifth lens group G5 can increase near the long focal length extremity.

As shown in the zoom path diagrams in FIG. 67, in the zoom lens system of the first through seventh numerical embodiments, focusing is carried out by moving the third lens group ($m^{th}$ lens group) G3 toward the image side. As shown in the zoom path diagram in FIG. 68, in the zoom lens system of the eighth numerical embodiment, focusing is carried out by moving the third lens group ($m^{th}$ lens group) G3 toward the image side. Therefore, in the eighth numerical embodiment, although the distance between the third lens group G3 and the fourth lens group G4 remains constant during zooming, since this distance between the third lens group G3 and the fourth lens group G4 changes during focusing, the third lens group G3 and the fourth lens group G4 are hence regarded as separate "lens groups" in this disclosure.

In the first through eight numerical embodiments, the first lens group G1 is configured of a negative lens element (a negative lens element having a concave surface on the image side) 11(110), a positive lens element (a positive lens element having a convex surface on the object side) 12(120), a positive lens element (a positive lens element having a convex surface on the object side) 13(130), and a positive lens element (a positive lens element having a convex surface on the object side) 14(140), in that order from the object side. The negative lens element 11(110) and the positive lens element 12(120) are not cemented to each other in the fourth through seventh numerical embodiments, and are cemented to each other in the first through third and eighth numerical embodiments.

In the first through eighth numerical embodiments, the second lens group G2 is configured of a positive lens element 21(210), a negative lens element 22(220), a negative lens element 23(230), a positive lens element 24(240), and a negative lens element 25(250), in that order from the object side. The positive lens element 21(210) and the negative lens element 22(220) are cemented to each other, and the negative lens element 23(230) and the positive lens element 24(240) are cemented to each other.

In the first through eighth numerical embodiments, the third lens group G3 is configured of a positive lens element 31(310'), a positive lens element 32(320'), and a negative lens element 33(330'), in that order from the object side. The positive lens element 32(320') and the negative lens element 33(330') are cemented to each other.

In the first through eighth numerical embodiments, the fourth lens group G4 is configured of a negative single lens element (a negative single lens element having a convex surface on the image side) 41(410).

In the first through eighth numerical embodiments, the fifth lens group G5 is configured of a diaphragm S, a positive lens element 51(510'), a positive lens element 52(520'), a negative lens element 53(530'), a positive lens element (intermediate positive lens element) 54(540'), a negative lens element 55(550') and a positive lens element 56(560'), in that order from the object side.

Figure 69:
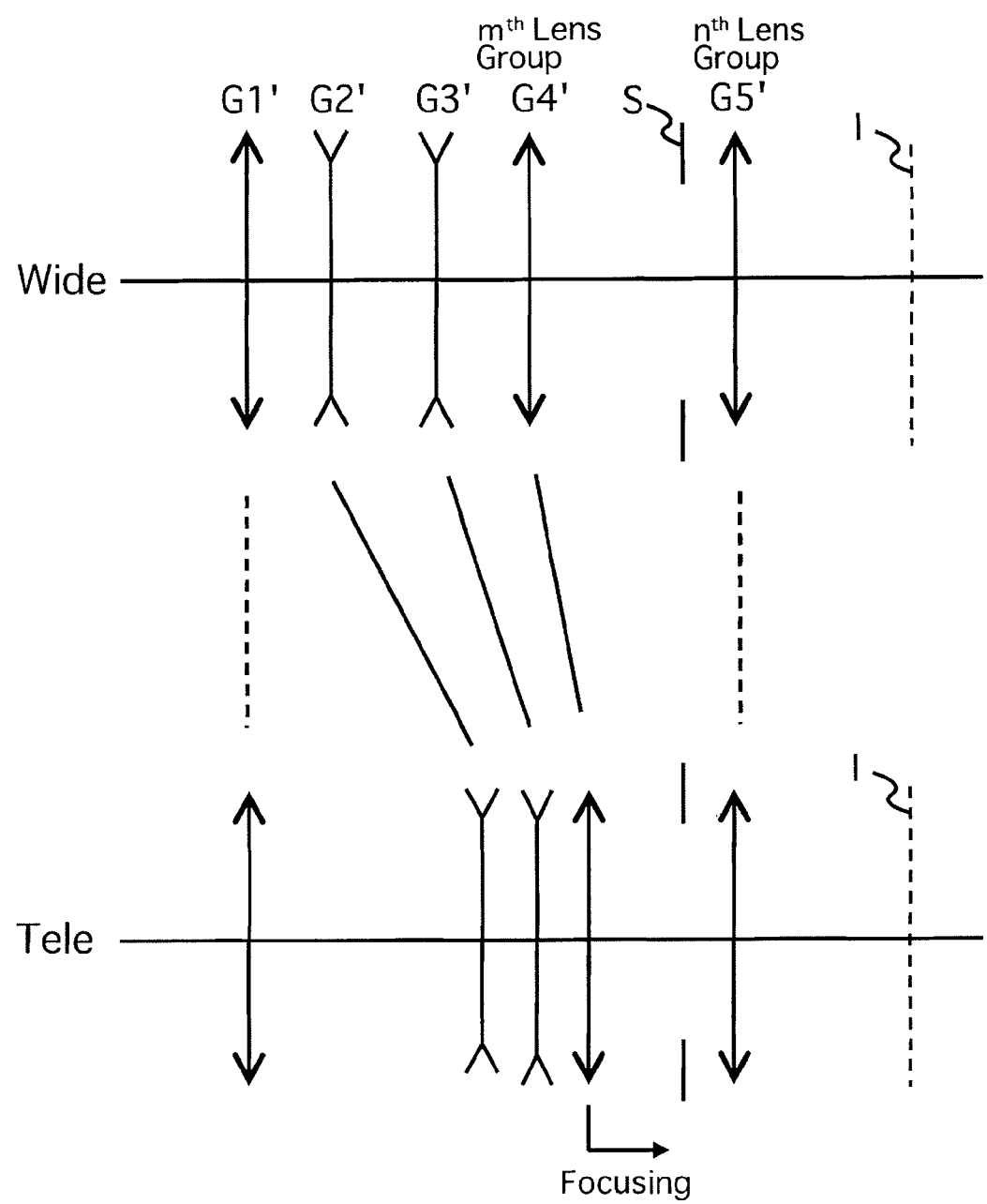
FIG. 69 shows a third zoom path of the zoom lens system according to the present invention.

As shown in the zoom path diagram in FIG. 69, the zoom lens system of the ninth numerical embodiment is configured of a positive first lens group G1', a negative second lens group G2', a negative third lens group G3', a positive fourth lens group ($m^{th}$ lens group) G4' and a positive fifth lens group ($n^{th}$ lens group) G5, in that order from the object side. A diaphragm S is positioned between the fourth lens group G4' and the fifth lens group G5' (immediately in front of the fifth lens group G5'). The diaphragm S remains stationary with the fifth lens group G5' relative to the imaging plane I during zooming from the short focal length extremity to the long focal length extremity (the diaphragm S does not move in the optical axis direction).

As shown in the zoom path diagram in FIG. 69, in the zoom lens system of the ninth numerical embodiment, when zooming from the short focal length extremity (Wide) to the long focal length extremity (Tele), the distance between the first lens group G1' and the second lens group G2' increases, the distance between the second lens group G2' and the third lens group G3' decreases, the distance between the third lens group G3' and the fourth lens group G4' decreases, and the distance between the fourth lens group G4' and the fifth lens group G5' decreases.

More specifically, when zooming from the short focal length extremity to the long focal length extremity, the first lens group G1' remains stationary relative to the imaging plane I (does not move in the optical axis direction), the second through fourth lens groups G2' through G4' move monotonically toward the image side, and the fifth lens group G5' remains stationary together with the diaphragm S (the fifth lens group G5' does not move in the optical axis direction).

As shown in the zoom path diagram in FIG. 69, in the zoom lens system of the ninth numerical embodiment, the fourth lens group ($m^{th}$ lens group) G4' serves as a focusing lens group that is moved toward the image side to carry out focusing.

The first lens group G1' is configured of a negative lens element (a negative lens element having a concave surface on the image side) 11', a positive lens element (a positive lens element having a convex surface on the object side) 12', a positive lens element (a positive lens element having a convex surface on the object side) 13', and a positive lens element (a positive lens element having a convex surface on the object side) 14', in that order from the object side. The negative lens element 11' and the positive lens element 12' are cemented to each other.

The second lens group G2' is configured of a positive lens element 21' and a negative lens element 22', in that order from the object side. The positive lens element 21' and the negative lens element 22' are cemented to each other.

The third lens group G3' is configured of a negative lens element 31', a positive lens element 32' and a negative lens element 33', in that order from the object side. The negative lens element 31' and the positive lens element 32' are cemented to each other.

The fourth lens group G4' is configured of a positive lens element 41', a positive lens element 42', and a negative lens element 43', in that order from the object side. The positive lens element 42' and the negative lens element 43' are cemented to each other.

The fifth lens group G5' is configured of a positive lens element 51', a positive lens element 52', a negative lens element 53', a positive lens element 54', a negative lens element 55', a positive lens element (intermediate positive lens element) 56', a negative lens element 57' and a positive lens element 58', in that order from the object side. The negative lens element 53' and the positive lens element 54' are cemented to each other.

As shown in the zoom path diagram in FIG. 67, the zoom lens system of the tenth and eleventh numerical embodiments is configured of a positive first lens group G1, a negative second lens group G2, a positive third lens group ($m^{th}$ lens group; focusing lens group) G3, a negative fourth lens group G4 and a positive fifth lens group ($n^{th}$ lens group) G5, in that order from the object side. A diaphragm S is positioned within the fifth lens group G5 (for the sake of convenience, the diaphragm S is shown in FIG. 67 as being positioned immediately in front of the fifth lens group G5). "I" designates the image plane.

As shown in the zoom path diagram in FIG. 67, in the zoom lens systems of the tenth and eleventh numerical embodiments, when zooming from the short focal length extremity (Wide) to the long focal length extremity (Tele), the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases.

More specifically, when zooming from the short focal length extremity to the long focal length extremity, the first lens group G1 remains stationary relative to the imaging plane I (does not move in the optical axis direction), the second through fourth lens groups G2 through G4 move monotonically toward the image side, and the fifth lens group G5 remains stationary together with the diaphragm S (the fifth lens group G5 does not move in the optical axis direction).

It is possible, in an alternative embodiment, for the third lens group G3, when zooming from the short focal length extremity to the long focal length extremity, to move in a non-linear path by first moving toward the image side and thereafter returning (U-turning) toward the object side by a slight amount (instead of moving monotonically toward the image side).

As shown in the zoom path diagram in FIG. 67, in the zoom lens system of the tenth and eleventh numerical embodiments, focusing is carried out in a direction from an object point at a long distance to an object point at a short distance by moving the third lens group G3, which serves as a focusing lens group, toward the image side (the third lens group G3 constitutes the focusing lens group).

In the tenth and eleventh numerical embodiments, the first lens group G1 is configured of a negative lens element (a negative lens element having a convex surface on the image side) 110, a positive lens element (a positive lens element having a convex surface on the object side) 120, a positive lens element (a positive lens element having a convex surface on the object side) 130, and a positive lens element (a positive lens element having a convex surface on the object side) 140, in that order from the object side. In the tenth and eleventh numerical embodiments, the negative lens element 110 and the positive lens element 120 are cemented to each other.

In the tenth and eleventh numerical embodiments, the second lens group G2 is configured of a positive lens element 210, a negative lens element 220, a negative lens element 230, a positive lens element 240, and a negative lens element 250, in that order from the object side. The positive lens element 210 and the negative lens element 220 are cemented to each other, and the negative lens element 230 and the positive lens element 240 are cemented to each other.

In the tenth and eleventh numerical embodiments, the third lens group G3 is configured of a positive lens element 310, a negative lens element 320 and a positive lens element 330, in that order from the object side. The negative lens element 320 and the positive lens element 330 are cemented to each other.

In the tenth and eleventh numerical embodiments, the fourth lens group G4 is configured of a negative single lens element (a negative single lens element having a convex surface on the image side) 410.

In the tenth and eleventh numerical embodiments, the fifth lens group G5 is configured of a positive lens element 510, a positive lens element 520, a negative lens element 530, a positive lens element 540, a diaphragm S, a positive lens element 550, a negative lens element 560, a positive lens element 570, a negative lens element 580 and a positive lens element 590, in that order from the object side. The negative lens element 530 and the positive lens element 540 are cemented to each other, and the positive lens element 550 and the negative lens element 560 are cemented to each other.

The zoom lens system in each of the above-described zoom lens systems employs five lens groups having a configuration of a positive lens group, a negative lens group, a positive lens group, a negative lens group and a positive lens group, in that order from the object side, or five lens groups having a configuration of a positive lens group, a negative lens group, a negative lens group, a positive lens group and a positive lens group, in that order from the object side, and by appropriately setting the refractive power ratio of each lens group combination (refractive-power balance), various aberrations such as spherical aberration, coma, distortion and field curvature can be favorably corrected and fluctuations in the optical quality (deterioration in the optical quality) during focusing are successfully suppressed.

Condition (1) specifies the refractive-power ratio (refractive-power balance) of the first lens group (G1 or G1') relative to the positive lens group constituting an $n^{th}$ lens group, provided closest to the image side. By satisfying condition (1), spherical aberration, coma and distortion can be favorably corrected.

If the upper limit of condition (1) is exceeded, the refractive power of the $n^{th}$ lens group becomes too strong, and it becomes difficult to correct spherical aberration and coma over the entire zooming range.

If the lower limit of condition (1) is exceeded, the refractive power of the first lens group becomes too strong, so that a large amount of distortion occurs.

Condition (2) specifies the refractive-power ratio (refractive-power balance) of the positive $n^{th}$ lens group, provided closest to the image side, relative to the $m^{th}$ lens group, constituting a focusing lens group (a positive lens group provided between the second lens group and the $n^{th}$ lens group). By satisfying condition (2), spherical aberration and coma can be favorably corrected, and fluctuations in the optical quality (deterioration in the optical quality) during focusing can be successfully suppressed.

If the upper limit of condition (2) is exceeded, the refractive power of the $m^{th}$ lens group, which constitutes a focusing lens group, becomes too strong, and fluctuations in the optical quality (deterioration in the optical quality) increase during focusing.

If the lower limit of condition (2) is exceeded, the refractive power of the $n^{th}$ lens group becomes too strong, so that it becomes difficult to correct spherical aberration and coma over the entire zooming range.

Condition (3) specifies the relationship between the size of the Abbe numbers, at the d-line, of the three positive lens elements that are provided within the first lens group (G1 or G1'). It is desirable to use a so-called low-dispersion glass having a large Abbe number at the d-line for the positive lens elements provided within the first lens group (G1 or G1') in order to correct chromatic aberration (especially lateral chromatic aberration at the long focal length extremity). However, low-dispersion glass is not suitable for correcting spherical aberration or coma, etc., since low-dispersion glass generally has a low refractive index. In the zoom lens system of the present invention, by setting the relationship between the size of the Abbe numbers, at the d-line, of the three positive lens elements provided within the first lens group (G1 or G1') to satisfy condition (3), chromatic aberration, spherical aberration and coma can be corrected in a balanced manner. If condition (3) is not satisfied, chromatic aberration, spherical aberration and coma cannot be corrected in a balanced manner.

Condition (4) specifies the difference in refractive index at the d-line between the positive lens element positioned closest to the object side, within the $n^{th}$ lens group, and the positive lens element positioned second closest to the object side within the $n^{th}$ lens group. Since the positive lens element that is positioned closest to the object side within the $n^{th}$ lens group is an important lens element that is directly linked to the correction of spherical aberration, it is desirable to form this positive lens element from a material having a high refractive index. Furthermore, by forming the positive lens element that is positioned second closest to the object side within the $n^{th}$ lens group to have a profile that is close to an aplanatic lens, occurrence of spherical aberrations can be suppressed. Namely, by satisfying condition (4), spherical aberrations can be favorably corrected. If condition (4) is not satisfied, correction of spherical aberration becomes insufficient.

Condition (5) and condition (5') specify the average of the Abbe numbers at the d-line of the positive lens element positioned closest to the object side, within the $n^{th}$ lens group, and the positive lens element positioned second closest to the object side within the $n^{th}$ lens group. Since both of these positive lens elements have an important role in correcting chromatic aberration, it is preferable for the Abbe numbers at the d-line thereof to be as large as possible. In other words, by satisfying condition (5), chromatic aberration can be favorably corrected, and by further satisfying condition (5'), the effect of the correction of chromatic aberration can be further improved. If condition (5) is not satisfied, the correction of chromatic aberration becomes insufficient.

In the illustrated embodiments of the zoom lens system, for example, in the first through eighth numerical embodiments, an intermediate positive lens element that satisfies condition (6), condition (7) and condition (8) is provided between the positive lens element positioned closest to the object side, within the fifth lens group G5, and the positive lens element positioned closest to the image side, within the fifth lens group G5. According to such a configuration, coma, chromatic aberration and field curvature can be effectively corrected with a lens arrangement having a small number of lens elements.

In the illustrated embodiments of the zoom lens system, for example, in the ninth numerical embodiment, an intermediate positive lens element that satisfies condition (6), condition (7) and condition (8) is provided between the positive lens element positioned closest to the object side, within the fifth lens group G5', and the positive lens element positioned closest to the image side, within the fifth lens group G5. According to such a configuration, coma, chromatic aberration and field curvature can be effectively corrected with a lens arrangement having a small number of lens elements.

In the illustrated embodiments of the zoom lens system, the negative second lens group (G2 or G2') functions mainly as a lens group for carrying out zooming, and by providing a negative lens group (the fourth lens group G4 or the third lens group G3') in addition to the second lens group (G2 or G2'), fluctuations in aberrations during zooming and during focusing can be more effectively corrected. As described above, for example, in the first through eighth numerical embodiments, the fourth lens group G4 is configured of a negative single lens element (a negative single lens element having a convex surface on the image side).

Condition (9) and condition (9') specify the refractive-power ratio (refractive-power balance) of the negative lens group (the fourth lens group G4 or the third lens group G3') relative to the $m^{th}$ lens group, which serves as a focusing lens group (the third lens group G3 or the fourth lens group G4'). By satisfying condition (9), field curvature change during zooming and during focusing can be favorably corrected, and by satisfying condition (9'), field curvature change during zooming and during focusing can be more favorably corrected. If condition (9) is not satisfied, the correction of field curvature change during zooming and during focusing becomes insufficient.

Condition (10) specifies the refractive index at the d-line of the negative single lens element that constitutes the fourth lens group G4, and condition (11) specifies the Abbe number at the d-line of the negative single lens element that constitutes the fourth lens group G4. By satisfying condition (10) and condition (11), the fourth lens group G4 can be configured from a minimum number of lens elements (i.e., one lens element), and chromatic aberration and coma can be effectively corrected. If condition (10) and condition (11) are not satisfied, the correction of chromatic aberration and coma becomes insufficient.

Condition (12) specifies the refractive-power ratio (refractive-power balance) of the first lens group G1 relative to the fourth lens group G4. By satisfying condition (12), field curvature and distortion can be favorably corrected.

If the upper limit of condition (12) is exceeded, the refractive power of the fourth lens group G4 becomes too strong, and the change in field curvature during zooming increases.

If the lower limit of condition (12) is exceeded, the refractive power of the first lens group G1 becomes too strong, so that a large amount of distortion occurs.

Condition (13) and condition (13') specify the refractive-power ratio (refractive-power balance) of the second lens group G2 relative to the fourth lens group G4. By satisfying condition (13), field curvature and distortion that occur during zooming can be favorably corrected. The favorable correction of field curvature and distortion that occur during zooming improves even more if condition (13') is satisfied.

If the upper limit of condition (13) is exceeded, the refractive power of the second lens group G2 becomes too strong, so that fluctuation in distortion during zooming increases.

If the lower limit of condition (13) and condition (13') is exceeded, the refractive power of the fourth lens group G4 becomes too strong, so that fluctuation in field curvature during zooming increases.

Condition (14) and condition (14') specify the refractive-power ratio (refractive-power balance) of the fourth lens group G4 relative to the fifth lens group G5. By satisfying condition (14), field curvature that occurs during zooming can be favorably corrected. The effect of the favorable correction of field curvature is even more prominent when condition (14') is satisfied.

If the upper limit of condition (14) is exceeded, the refractive power of the fourth lens group G4 becomes too strong, so that field curvature fluctuation during zooming increases.

If the lower limit of condition (14) is exceeded, the refractive power of the fourth lens group G4 becomes too weak, so that the correction of field curvature during zooming becomes insufficient.

Condition (15) and condition (15') specify the refractive-power ratio (refractive-power balance) of the second lens group G2 relative to the fifth lens group G5. By satisfying condition (15), spherical aberration and coma can be favorably corrected during zooming. The effect of favorably correcting spherical aberration and coma is even more prominent when condition (15') is satisfied.

If the upper limit of condition (15) is exceeded, the refractive power of the fifth lens group G5 becomes too strong, so that spherical aberration and coma increase over the entire zooming range.

If the lower limit of condition (15) is exceeded, the refractive power of the second lens group G2 becomes too strong, so that fluctuation of distortion increases during zooming.

Condition (16) specifies the refractive-power ratio (refractive-power balance) of the third lens group G3 relative to the fourth lens group G4. By satisfying condition (16), fluctuation in optical quality (deterioration in optical quality) during focusing can be suppressed while spherical aberration and coma can be favorably corrected over the entire zooming range.

If the upper limit of condition (16) is exceeded, the refractive power of the third lens group G3, serving as the focusing lens group, becomes too strong, so that the fluctuation in optical quality (deterioration in optical quality) during focusing increases.

If the lower limit of condition (16) is exceeded, the refractive power of the fourth lens group G4 becomes too strong, so that correction of spherical aberration and coma over the entire zooming range becomes difficult.

In the illustrated embodiments of the zoom lens system, the negative second lens group G2 functions mainly as a lens group for carrying out zooming, and by providing the negative fourth lens group G4 in addition to the second lens group G2, fluctuations in aberrations during zooming and during focusing can be more effectively corrected. As described above, the fourth lens group G4 is configured of, for example, a negative single lens element (a negative single lens element having a convex surface on the image side) in each of the first through eighth, tenth and eleventh numerical embodiments.

Condition (17) and condition (17') specify the refractive index at the d-line of the negative single lens element that constitutes the fourth lens group G4. Condition (18) and condition (18') specify the Abbe number at the d-line of the negative single lens element that constitutes the fourth lens group G4.

By satisfying condition (17) and condition (18), the fourth lens group G4 can be configured from a minimum number of lens elements (i.e., one lens element), and chromatic aberration and coma can be effectively corrected.

Furthermore, by satisfying condition (17') and condition (18'), chromatic aberration and coma can be more effectively corrected.

If condition (17) and condition (18) are not satisfied, correction of chromatic aberration and coma becomes insufficient.

As described above, the first lens group G1 is configured of, for example, a negative lens element (a negative lens element having a concave surface on the image side), a positive lens element (a positive lens element having a convex surface on the object side), a positive lens element (a positive lens element having a convex surface on the object side) and a positive lens element (a positive lens element having a convex surface on the object side), in that order from the object side, in each of the first through eleventh numerical embodiments.

Condition (19) specifies the relationship between the size of the Abbe numbers, at the d-line, of the three positive lens elements that are provided within the first lens group G1. It is desirable to use a so-called low-dispersion glass having a large Abbe number at the d-line for the positive lens elements provided within the first lens group G1 in order to correct chromatic aberration (especially lateral chromatic aberration at the long focal length extremity). However, low-dispersion glass is not suitable for correcting spherical aberration or coma, etc., since low-dispersion glass generally has a low refractive index. In the zoom lens system of the present invention, by setting the relationship between the size of the Abbe numbers, at the d-line, of the three positive lens elements provided within the first lens group G1 to satisfy condition (19), chromatic aberration, spherical aberration and coma can be corrected in a balanced manner. If condition (19) is not satisfied, chromatic aberration, spherical aberration and coma cannot be corrected in a balanced manner.

Condition (20) and condition (20') specify the difference in refractive index at the d-line between the positive lens element positioned closest to the object side, within the fifth lens group G5, and the positive lens element positioned second closest to the object side within the fifth lens group G5. Since the positive lens element that is positioned closest to the object side within the fifth lens group G5 is an important lens element that is directly linked to the correction of spherical aberration, it is desirable to form this positive lens element from a material having a high refractive index. Namely, by satisfying condition (20) spherical aberration can be favorably corrected, and by satisfying condition (20') spherical aberration can be more effectively corrected. If condition (20) is not satisfied, correction of spherical aberrations become insufficient. Furthermore, by forming the positive lens element that is positioned second closest to the object side within fifth lens group G5 to have a profile that is close to an aplanatic lens, occurrence of coma can be suppressed.

Condition (21) and condition (21') specify the average of the Abbe numbers at the d-line of the positive lens element positioned closest to the object side, within the fifth lens group G5, and the positive lens element positioned second closest to the object side within the fifth lens group G5. Since both of these positive lens elements have an important role in correcting chromatic aberration, it is preferable for the Abbe numbers at the d-line thereof to be as large as possible. In other words, by satisfying condition (21), chromatic aberration can be favorably corrected, and by further satisfying condition (21'), the chromatic aberration can be more effectively corrected. If condition (21) is not satisfied, the correction of chromatic aberration becomes insufficient.

In the illustrated embodiments of the zoom lens system, for example, in each of the first through seventh, ninth and eleventh numerical embodiments, an intermediate positive lens element that satisfies condition (22), condition (23) and condition (24) is provided between the positive lens element positioned closest to the object side, within the fifth lens group G5, and the positive lens element positioned closest to the image side, within the fifth lens group G5. According to such a configuration, coma, chromatic aberration and field curvature can be effectively corrected with a lens arrangement having a small number of lens elements.

Furthermore, in the illustrated embodiments of the zoom lens system, for example, in each of the first through seventh numerical embodiments, an intermediate positive lens element that satisfies condition (22'), condition (23') and condition (24') is provided between the positive lens element positioned closest to the object side, within the fifth lens group G5, and the positive lens element positioned closest to the image side, within the fifth lens group G5. According to such a configuration, coma, chromatic aberration and field curvature can be more effectively corrected.

Specific first through eleventh numerical embodiments will be herein discussed. In the various aberration diagrams, lateral aberration diagrams and the tables, the d-line, g-line and C-line show aberrations at their respective wavelengths; S designates the sagittal image, M designates the meridional image, FNO. designates the f-number, f designates the focal length of the entire optical system, W designates the half angle of view (°), Y designates the image height, fB designates the backfocus, L designates the overall length of the lens system, R designates the radius of curvature, d designates the lens thickness or distance between lenses, N(d) designates the refractive index at the d-line, and ν (d) designates the Abbe number with respect to the d-line. The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity. The unit used for the various lengths is defined in millimeters (mm). An aspherical surface is not utilized in any of the first through eleventh numerical embodiments.

The first through fifth numerical embodiments constitute numerical embodiments that correspond to both the <<First Configuration for Achieving First Objective>> and the <<Second Configuration for Achieving Second Objective>>.

The sixth through ninth numerical embodiments constitute numerical embodiments that correspond to the <<First Configuration for Achieving First Objective>> but serve as comparative embodiments (reference embodiments) with respect to the <<Second Configuration for Achieving Second Objective>>.

The tenth and eleventh numerical embodiments constitute numerical embodiments that correspond to the <<Second Configuration for Achieving Second Objective>> but serve as comparative embodiments (reference embodiments) with respect to the <<First Configuration for Achieving First Objective>>.

Numerical Embodiment 1

Figure 2A:
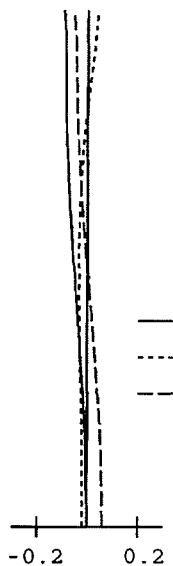
FIGS. 2A, 2B, 2C and 2D show various aberrations that occurred in the lens arrangement shown in FIG. 1.
Figure 2B:
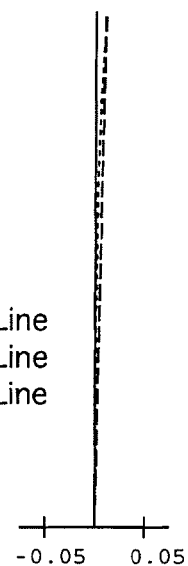
Figure 2C:
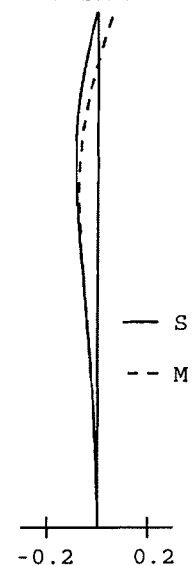
Figure 2D:
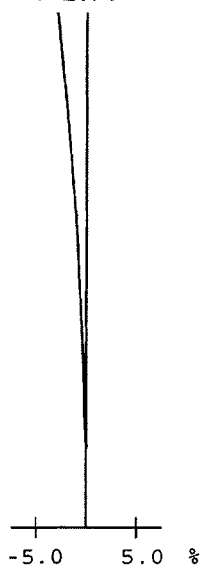
Figure 3A:
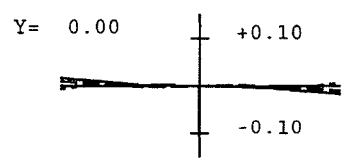
FIGS. 3A, 3B, 3C and 3D show lateral aberrations that occurred in the lens arrangement shown in FIG. 1.
Figure 3B:
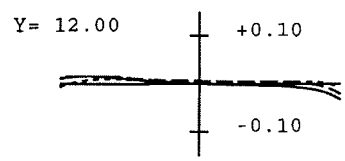
Figure 3C:
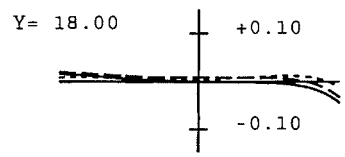
Figure 3D:
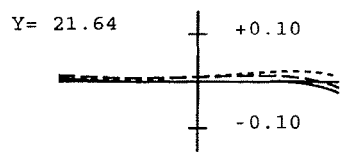
Figure 4:
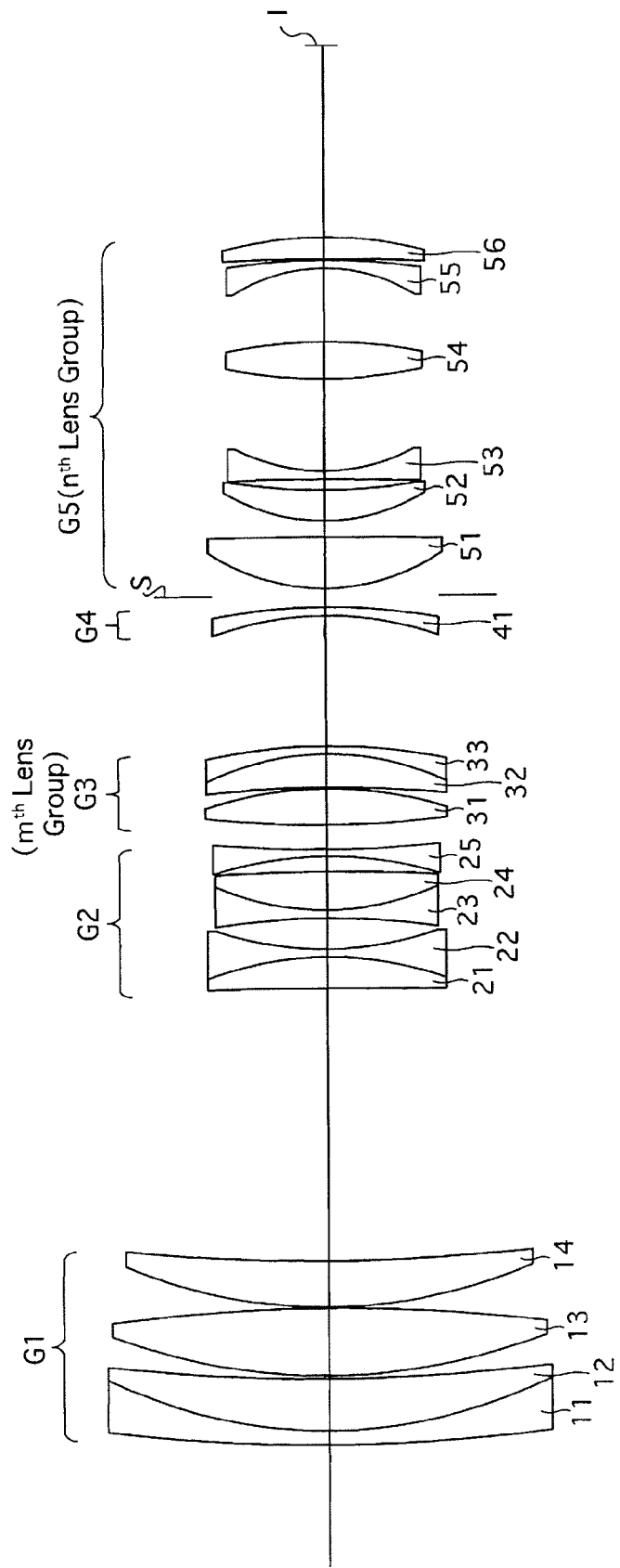
FIG. 4 shows a lens arrangement of the first numerical embodiment of the zoom lens system at the long focal length extremity when focused on an object at infinity.

FIGS. 1 through 6D and Tables 1 through 3 show a first numerical embodiment of the zoom lens system according to the present invention. FIG. 1 shows a lens arrangement of the first numerical embodiment of the zoom lens system, at the short focal length extremity when focused on an object at infinity. FIGS. 2A, 2B, 2C and 2D show various aberrations that occurred in the lens arrangement shown in FIG. 1, at the short focal length extremity when focused on an object at infinity. FIGS. 3A, 3B, 3C and 3D show lateral aberrations that occurred in the lens arrangement shown in FIG. 1, at the short focal length extremity when focused on an object at infinity. FIG. 4 shows a lens arrangement of the first numerical embodiment of the zoom lens system, at the long focal length extremity when focused on an object at infinity. FIGS. 5A, 5B, 5C and 5D show various aberrations that occurred in the lens arrangement shown in FIG. 4, at the long focal length extremity when focused on an object at infinity. FIGS. 6A, 6B, 6C and 6D show lateral aberrations that occurred in the lens arrangement shown in FIG. 4, at the long focal length extremity when focused on an object at infinity. Table 1 shows the lens surface data, Table 2 shows various lens-system data, and Table 3 shows the lens group data of the zoom lens system.

The zoom lens system of the first numerical embodiment is configured of a positive first lens group G1, a negative second lens group G2, a positive third lens group (m$^{th}$ lens group/focusing lens group) G3, a negative fourth lens group G4 and a positive fifth lens group (n$^{th}$ lens group) G5, in that order from the object side. A diaphragm S is provided between the fourth lens group G4 and the fifth lens group G5 (and positioned immediately in front of the fifth lens group G5). The diaphragm S remains stationary relative to the imaging plane I with the fifth lens group G5 (i.e., the diaphragm S and the fifth lens group G5 do not move in the optical axis direction) during zooming from the short focal length extremity to the long focal length extremity.

The first lens group G1 is configured of a negative meniscus lens element (negative lens element having a concave surface on the image side) 11 having a convex surface on the object side, a positive meniscus lens element (positive lens element having a convex surface on the object side) 12 having a convex surface on the object side, a biconvex positive lens element (positive lens element having a convex surface on the object side) 13, and a positive meniscus lens element (a positive lens element having a convex surface on the object side) 14 having a convex surface on the object side, in that order from the object side. The negative meniscus lens element 11 and the positive meniscus lens element 12 are cemented to each other.

The second lens group G2 is configured of a positive meniscus lens element 21 having a convex surface on the image side, a biconcave negative lens element 22, a biconcave negative lens element 23, a biconvex positive lens element 24, and a biconcave negative lens element 25, in that order from the object side. The positive meniscus lens element 21 and the biconcave negative lens element 22 are cemented to each other, and the biconcave negative lens element 23 and the biconvex positive lens element 24 are cemented to each other.

The third lens group G3 is configured of a biconvex positive lens element 31, a positive meniscus lens element 32 having a convex surface on the image side, and a negative meniscus lens element 33 having a convex surface on the image side, in that order from the object side. The positive meniscus lens element 32 and the negative meniscus lens element 33 are cemented to each other.

The fourth lens group G4 is configured of a negative meniscus single lens element (a negative single lens element having a convex surface on the image side) 41 having a convex surface on the image side.

The fifth lens group G5 is configured of a biconvex positive lens element 51, a positive meniscus lens element 52 having a convex surface on the object side, a biconcave negative lens element 53, a biconvex positive lens element (intermediate positive lens element) 54, a negative meniscus lens element 55 having a convex surface on the image side, and a positive meniscus lens element 56 having a convex surface on the image side, in that order from the object side.

TABLE 1

LENS SURFACE DATA

| Surf. No. | R | d | N(d) | ν(d) |
|---|---|---|---|---|
| 1 | 298.927 | 2.30 | 1.83400 | 37.2 |
| 2 | 83.202 | 8.48 | 1.49700 | 81.6 |
| 3 | 314.408 | 0.50 | | |
| 4 | 99.969 | 11.13 | 1.43875 | 95.0 |
| 5 | −278.717 | 0.20 | | |
| 6 | 86.058 | 7.57 | 1.59522 | 67.7 |
| 7 | 338.946 | d7 | | |
| 8 | −820.899 | 4.99 | 1.90366 | 31.3 |
| 9 | −59.351 | 1.20 | 1.81600 | 46.6 |
| 10 | 58.207 | 4.98 | | |
| 11 | −125.863 | 1.33 | 1.59522 | 67.7 |
| 12 | 47.206 | 6.16 | 1.80518 | 25.5 |
| 13 | −316.015 | 2.47 | | |
| 14 | −63.999 | 1.10 | 1.83481 | 42.7 |
| 15 | 217.234 | d15 | | |
| 16 | 182.634 | 5.83 | 1.80400 | 46.6 |
| 17 | −66.021 | 0.20 | | |
| 18 | −195.611 | 5.35 | 1.49700 | 81.6 |
| 19 | −46.988 | 1.30 | 1.84666 | 23.8 |
| 20 | −96.235 | d20 | | |

TABLE 1-continued

LENS SURFACE DATA

| Surf. No. | R | d | N(d) | ν(d) |
|---|---|---|---|---|
| 21 | −56.165 | 1.40 | 1.61340 | 44.3 |
| 22 | −102.414 | d22 | | |
| 23(Diaphragm) | ∞ | 1.20 | | |
| 24 | 35.843 | 8.25 | 1.59522 | 67.7 |
| 25 | −1114.899 | 2.65 | | |
| 26 | 33.094 | 4.97 | 1.43875 | 95.0 |
| 27 | 101.917 | 1.75 | | |
| 28 | −407.374 | 1.30 | 1.78590 | 44.2 |
| 29 | 32.342 | 14.77 | | |
| 30 | 84.103 | 5.95 | 1.59522 | 67.7 |
| 31 | −84.103 | 11.77 | | |
| 32 | −29.143 | 1.30 | 1.81600 | 46.6 |
| 33 | −108.062 | 0.20 | | |
| 34 | −341.779 | 3.47 | 1.90366 | 31.3 |
| 35 | −67.612 | — | | |

TABLE 2

LENS-SYSTEM DATA
Zoom Ratio: 2.69

| | Short Focal Length Extremity | Intermediate Focal Length | Long Focal Length Extremity |
|---|---|---|---|
| FNO. | 2.9 | 2.9 | 2.9 |
| f | 72.06 | 100.00 | 194.00 |
| W | 17.2 | 12.2 | 6.2 |
| Y | 21.64 | 21.64 | 21.64 |
| fB | 37.79 | 37.79 | 37.79 |
| L | 243.06 | 243.05 | 243.06 |
| d7 | 3.30 | 20.97 | 43.94 |
| d15 | 27.09 | 21.74 | 4.00 |
| d20 | 8.58 | 10.89 | 20.96 |
| d22 | 31.73 | 17.09 | 1.80 |

TABLE 3

LENS GROUP DATA

| Lens Group | 1st Surface | Focal Length |
|---|---|---|
| 1 | 1 | 119.85 |
| 2 | 8 | −32.59 |
| 3 | 16 | 66.08 |
| 4 | 21 | −205.12 |
| 5 | 24 | 90.93 |

Numerical Embodiment 2

Figure 7:
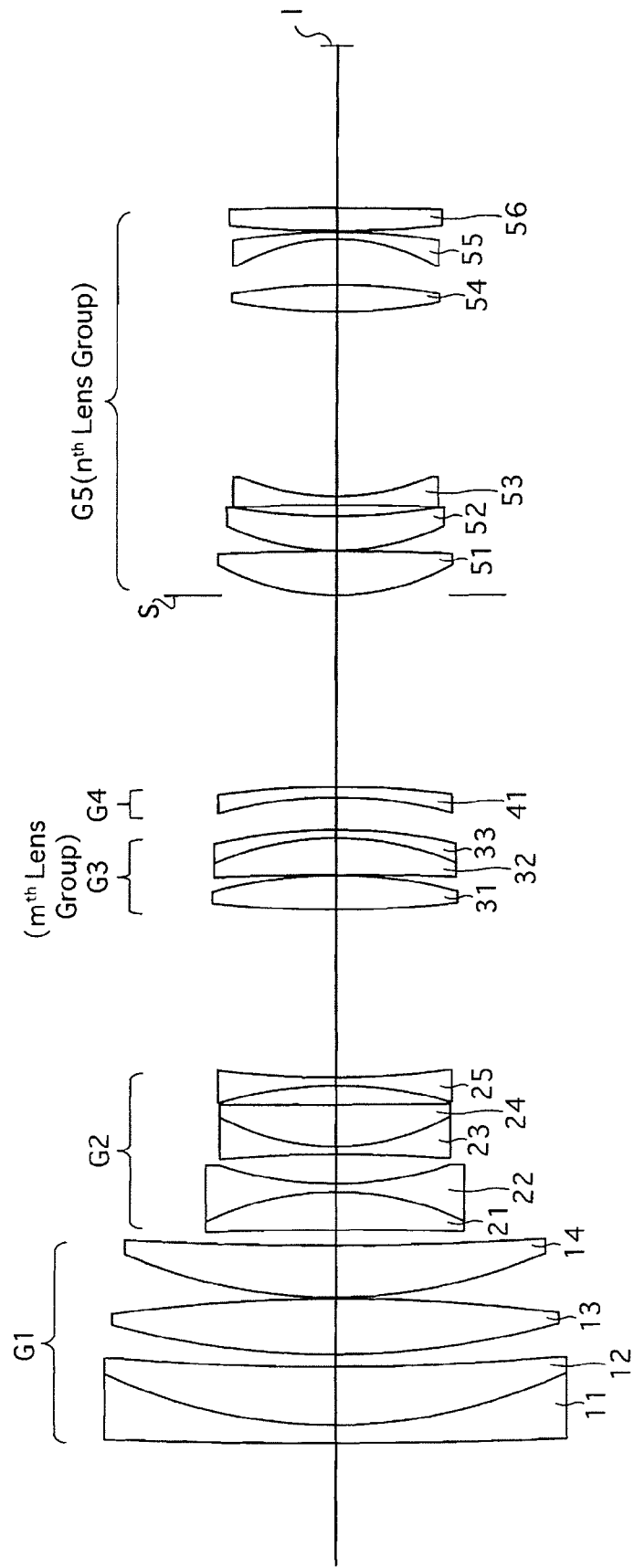
FIG. 7 shows a lens arrangement of a second numerical embodiment of a zoom lens system, according to the present invention, at the short focal length extremity when focused on an object at infinity.
Figure 8A:
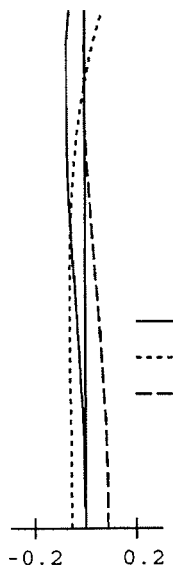
FIGS. 8A, 8B, 8C and 8D show various aberrations that occurred in the lens arrangement shown in FIG. 7.
Figure 8B:
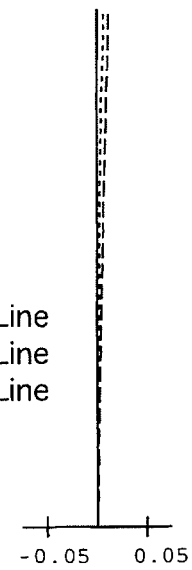
Figure 8C:
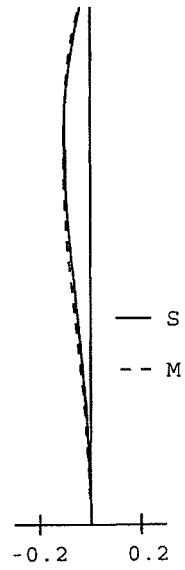
Figure 8D:
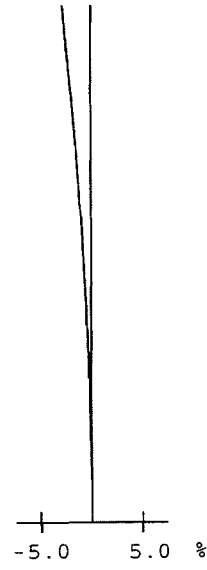
Figure 9A:
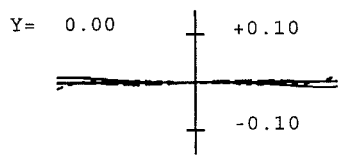
FIGS. 9A, 9B, 9C and 9D show lateral aberrations that occurred in the lens arrangement shown in FIG. 7.
Figure 9B:
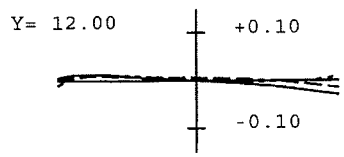
Figure 9C:
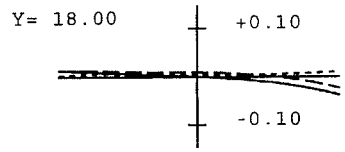
Figure 9D:
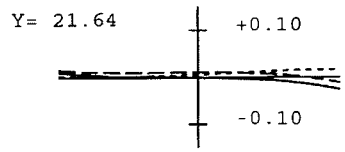
Figure 10:
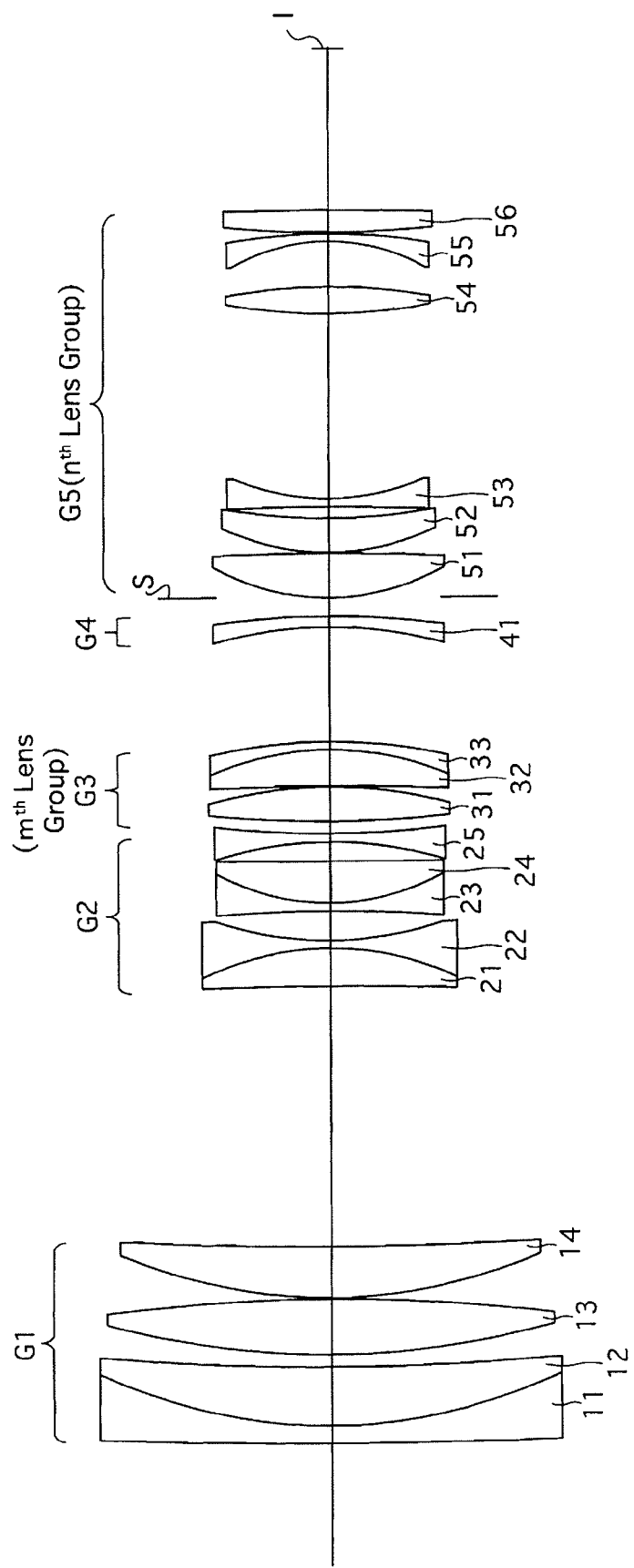
FIG. 10 shows a lens arrangement of the second numerical embodiment of the zoom lens system at the long focal length extremity when focused on an object at infinity.

FIGS. 7 through 12D and Tables 4 through 6 show a second numerical embodiment of the zoom lens system according to the present invention. FIG. 7 shows a lens arrangement of the second numerical embodiment of the zoom lens system, at the short focal length extremity when focused on an object at infinity. FIGS. 8A, 8B, 8C and 8D show various aberrations that occurred in the lens arrangement shown in FIG. 7, at the short focal length extremity when focused on an object at infinity. FIGS. 9A, 9B, 9C and 9D show lateral aberrations that occurred in the lens arrangement shown in FIG. 7, at the short focal length extremity when focused on an object at infinity. FIG. 10 shows a lens arrangement of the second numerical embodiment of the zoom lens system, at the long focal length extremity when focused on an object at infinity. FIGS. 11A, 11B, 11C and 11D show various aberrations that occurred in the lens arrangement shown in FIG. 10, at the long focal length extremity when focused on an object at infinity.

FIGS. 12A, 12B, 12C and 12D show lateral aberrations that occurred in the lens arrangement shown in FIG. 10, at the long focal length extremity when focused on an object at infinity. Table 4 shows the lens surface data, Table 5 shows various lens-system data, and Table 6 shows the lens group data of the zoom lens system.

The lens arrangement of the second numerical embodiment is the same as that of the first numerical embodiment except for the following features:

(1) The positive lens element 24 of the second lens group G2 is a positive meniscus lens element having a convex surface on the object side.

(2) The positive lens element 56 of the fifth lens group G5 is a biconvex positive lens element.

TABLE 4

LENS SURFACE DATA

| Surf. No. | R | d | N(d) | ν(d) |
|---|---|---|---|---|
| 1 | 1052.998 | 2.90 | 1.72047 | 34.7 |
| 2 | 88.327 | 9.51 | 1.49700 | 81.6 |
| 3 | 431.124 | 2.03 | | |
| 4 | 137.001 | 9.16 | 1.49782 | 82.6 |
| 5 | −281.758 | 0.20 | | |
| 6 | 88.569 | 8.22 | 1.61800 | 63.4 |
| 7 | 636.494 | d7 | | |
| 8 | −651.050 | 6.07 | 1.83400 | 37.2 |
| 9 | −49.578 | 1.30 | 1.77250 | 49.6 |
| 10 | 61.763 | 4.69 | | |
| 11 | −241.851 | 1.30 | 1.61800 | 63.4 |
| 12 | 39.859 | 6.66 | 1.80518 | 25.4 |
| 13 | 1735.761 | 3.12 | | |
| 14 | −66.909 | 1.30 | 1.80610 | 40.9 |
| 15 | 161.538 | d15 | | |
| 16 | 203.183 | 5.49 | 1.80400 | 46.6 |
| 17 | −78.090 | 0.11 | | |
| 18 | −489.495 | 5.85 | 1.49700 | 81.6 |
| 19 | −50.693 | 1.30 | 1.84666 | 23.8 |
| 20 | −89.448 | d20 | | |
| 21 | −71.279 | 1.70 | 1.71700 | 47.9 |
| 22 | −143.847 | d22 | | |
| 23(Diaphragm) | ∞ | 0.00 | | |
| 24 | 40.535 | 7.07 | 1.61800 | 63.4 |
| 25 | −385.374 | 0.10 | | |
| 26 | 42.343 | 5.48 | 1.49700 | 81.6 |
| 27 | 103.873 | 1.77 | | |
| 28 | −407.896 | 1.40 | 1.72342 | 38.0 |
| 29 | 41.410 | 29.47 | | |
| 30 | 96.293 | 4.27 | 1.59522 | 67.7 |
| 31 | −99.999 | 7.27 | | |
| 32 | −33.048 | 1.20 | 1.80400 | 46.6 |
| 33 | −100.848 | 0.20 | | |
| 34 | 188.052 | 3.56 | 1.80518 | 25.4 |
| 35 | −645.973 | — | | |

TABLE 5

LENS-SYSTEM DATA
Zoom Ratio: 2.69

| | Short Focal Length Extremity | Intermediate Focal Length | Long Focal Length Extremity |
|---|---|---|---|
| FNO. | 2.9 | 2.9 | 2.9 |
| f | 72.10 | 100.00 | 194.00 |
| W | 17.2 | 12.2 | 6.2 |
| Y | 21.64 | 21.64 | 21.64 |
| fB | 37.45 | 37.45 | 37.45 |
| L | 241.26 | 241.26 | 241.26 |
| d7 | 2.50 | 19.58 | 41.66 |
| d15 | 26.74 | 20.91 | 2.00 |
| d20 | 5.31 | 7.99 | 18.46 |
| d22 | 30.57 | 16.63 | 3.00 |

TABLE 6

LENS GROUP DATA

| Lens Group | 1st Surface | Focal Length |
|---|---|---|
| 1 | 1 | 116.27 |
| 2 | 8 | -32.88 |
| 3 | 16 | 64.58 |
| 4 | 21 | -199.00 |
| 5 | 24 | 93.00 |

Numerical Embodiment 3

Figure 13:
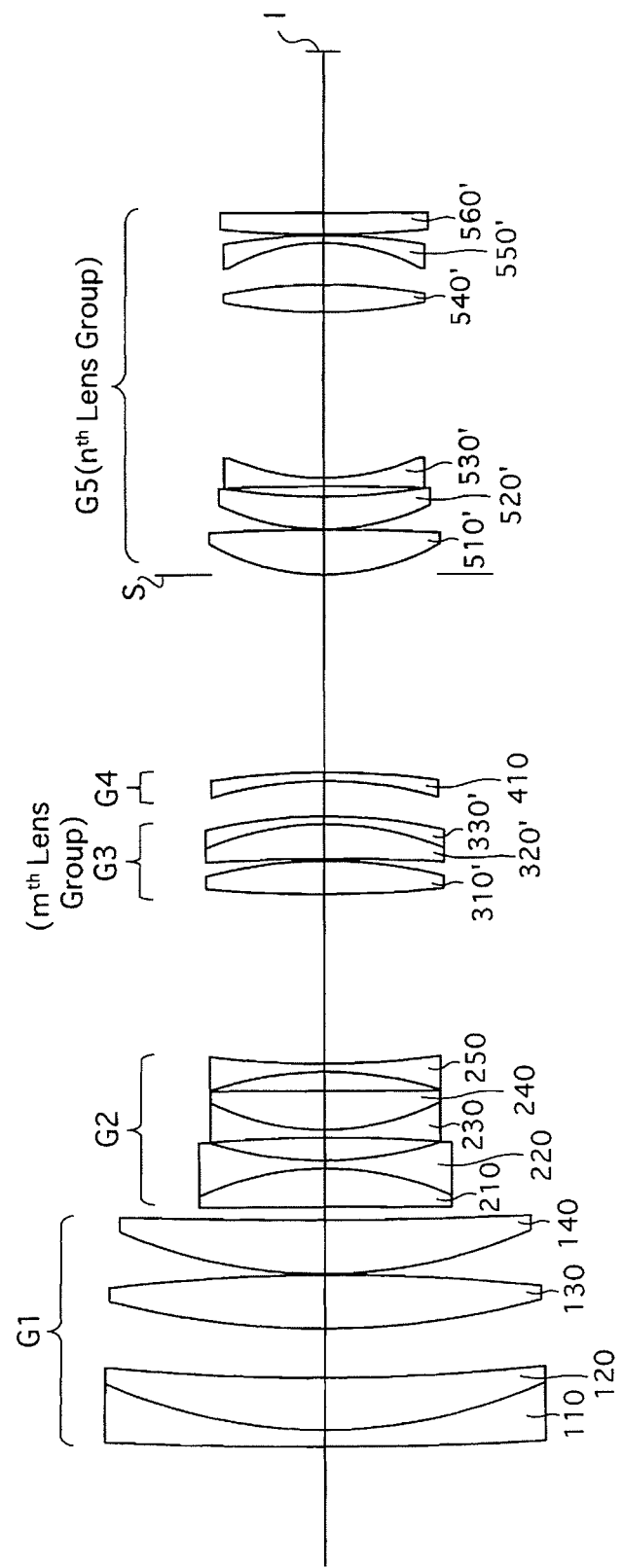
FIG. 13 shows a lens arrangement of a third numerical embodiment of a zoom lens system, according to the present invention, at the short focal length extremity when focused on an object at infinity.
Figure 16:
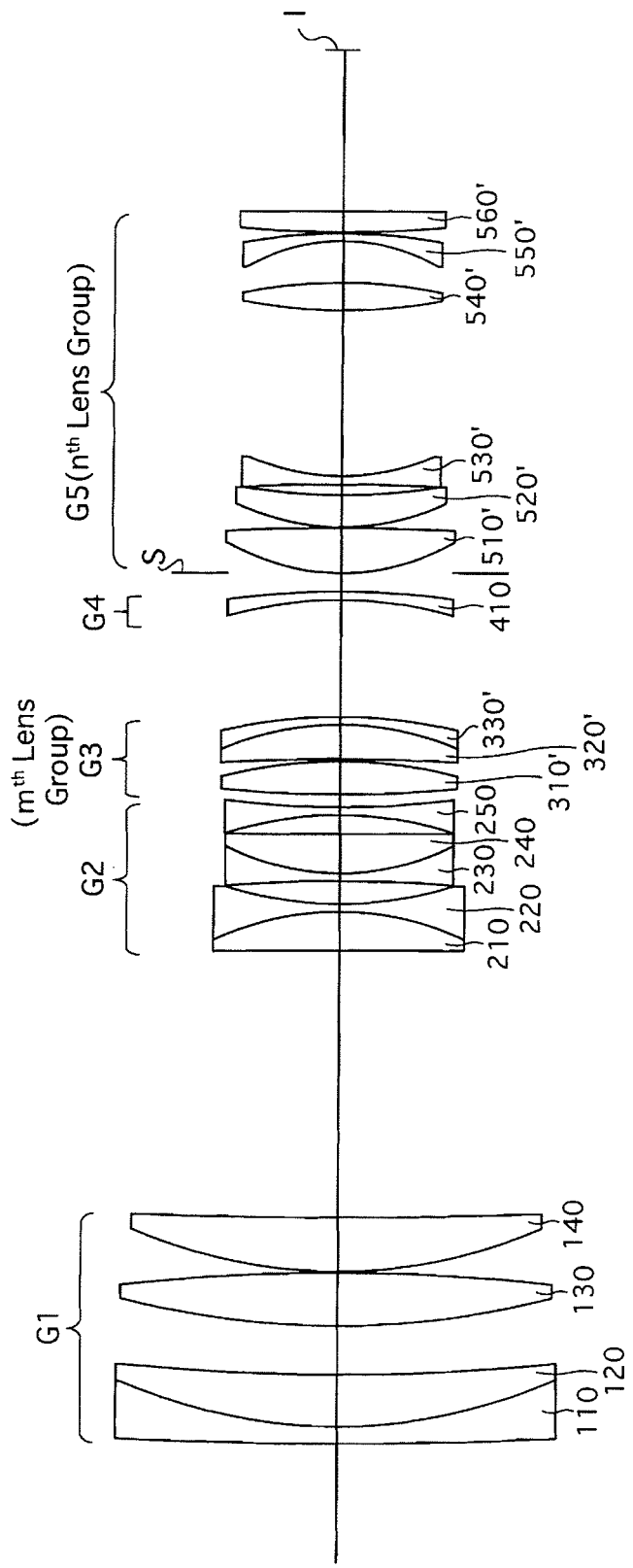
FIG. 16 shows a lens arrangement of the third numerical embodiment of the zoom lens system at the long focal length extremity when focused on an object at infinity.

FIGS. 13 through 18D and Tables 7 through 9 show a third numerical embodiment of the zoom lens system according to the present invention. FIG. 13 shows a lens arrangement of the third numerical embodiment of the zoom lens system, at the short focal length extremity when focused on an object at infinity. FIGS. 14A, 14B, 14C and 14D show various aberrations that occurred in the lens arrangement shown in FIG. 13, at the short focal length extremity when focused on an object at infinity. FIGS. 15A, 15B, 15C and 15D show lateral aberrations that occurred in the lens arrangement shown in FIG. 13, at the short focal length extremity when focused on an object at infinity. FIG. 16 shows a lens arrangement of the third numerical embodiment of the zoom lens system, at the long focal length extremity when focused on an object at infinity. FIGS. 17A, 17B, 17C and 17D show various aberrations that occurred in the lens arrangement shown in FIG. 16, at the long focal length extremity when focused on an object at infinity. FIGS. 18A, 18B, 18C and 18D show lateral aberrations that occurred in the lens arrangement shown in FIG. 16, at the long focal length extremity when focused on an object at infinity. Table 7 shows the lens surface data, Table 8 shows various lens-system data, and Table 9 shows the lens group data of the zoom lens system.

The zoom lens system of the third numerical embodiment is configured of a positive first lens group G1, a negative second lens group G2, a positive third lens group (m$^{th}$ lens group/focusing lens group) G3, a negative fourth lens group G4, and a positive fifth lens group (n$^{th}$ lens group) G5, in that order from the object side. A diaphragm S is included within the fifth lens group G5. The diaphragm S remains stationary with the fifth lens group G5 relative to the imaging plane I (i.e., the diaphragm S and the fifth lens group G5 do not move in the optical axis direction) during zooming from the short focal length extremity to the long focal length extremity.

The first lens group G1 is configured of a negative meniscus lens element (negative lens element having a concave surface on the image side) 110 having a convex surface on the object side, a positive meniscus lens element (positive lens element having a convex surface on the object side) 120 having a convex surface on the object side, a biconvex positive lens element (positive lens element having a convex surface on the object side) 130, and a positive meniscus lens element (a positive lens element having a convex surface on the object side) 140 having a convex surface on the object side, in that order from the object side. The negative meniscus lens element 110 and the positive meniscus lens element 120 are cemented to each other.

The second lens group G2 is configured of a positive meniscus lens element 210 having a convex surface on the image side, a biconcave negative lens element 220, a biconcave negative lens element 230, a positive meniscus lens element 240 having a convex surface on the object side, and a biconcave negative lens element 250, in that order from the object side. The biconvex positive lens element 210 and the biconcave negative lens element 220 are cemented to each other, and the biconcave negative lens element 230 and the positive meniscus lens element 240 are cemented to each other.

The third lens group G3 is configured of a biconvex positive lens element 310', a positive meniscus lens element 320' having a convex surface on the image side, and a negative meniscus lens element 330' having a convex surface on the image side, in that order from the object side. The positive meniscus lens element 320' and the negative meniscus lens element 330' are cemented to each other.

The fourth lens group G4 is configured of a negative meniscus single lens element (a negative single lens element having a convex surface on the image side) 410 having a convex surface on the image side.

The fifth lens group G5 is configured of a diaphragm S, a biconvex positive lens element 510', a positive meniscus lens element 520' having a convex surface on the object side, a biconcave negative lens element 530', a biconvex positive lens element 540', a negative meniscus lens element 550' having a convex surface on the image side, and a biconvex positive lens element 560', in that order from the object side.

TABLE 7

LENS SURFACE DATA

| Surf. No. | R | d | N(d) | ν(d) |
|---|---|---|---|---|
| 1 | 771.165 | 2.85 | 1.75249 | 34.6 |
| 2 | 90.132 | 8.76 | 1.49700 | 81.6 |
| 3 | 372.727 | 8.01 | | |
| 4 | 145.705 | 8.80 | 1.49700 | 81.6 |
| 5 | -331.430 | 0.20 | | |
| 6 | 87.823 | 8.88 | 1.59522 | 67.7 |
| 7 | 969.953 | d7 | | |
| 8 | -1778.851 | 6.36 | 1.85912 | 34.3 |
| 9 | -50.872 | 1.30 | 1.77290 | 45.4 |
| 10 | 65.908 | 3.75 | | |
| 11 | -256.417 | 1.30 | 1.61800 | 62.2 |
| 12 | 43.956 | 6.35 | 1.80518 | 25.4 |
| 13 | 5674.976 | 3.12 | | |
| 14 | -63.970 | 1.30 | 1.81184 | 45.5 |
| 15 | 157.551 | d15 | | |
| 16 | 219.107 | 5.45 | 1.80400 | 46.6 |
| 17 | -79.715 | 0.36 | | |
| 18 | -341.413 | 5.67 | 1.49700 | 81.6 |
| 19 | -52.088 | 1.30 | 1.84666 | 23.8 |
| 20 | -88.436 | d20 | | |
| 21 | -70.019 | 1.40 | 1.71907 | 41.4 |
| 22 | -138.183 | d22 | | |
| 23(Diaphragm) | ∞ | 0.00 | | |
| 24 | 39.669 | 7.38 | 1.60300 | 65.5 |
| 25 | -360.930 | 0.10 | | |
| 26 | 42.610 | 5.28 | 1.49700 | 81.6 |
| 27 | 106.076 | 1.73 | | |
| 28 | -370.391 | 1.40 | 1.69809 | 40.1 |
| 29 | 40.540 | 27.23 | | |
| 30 | 92.085 | 4.52 | 1.59522 | 67.7 |
| 31 | -92.085 | 6.85 | | |
| 32 | -33.284 | 1.20 | 1.80400 | 46.6 |
| 33 | -99.401 | 0.20 | | |
| 34 | 199.401 | 3.41 | 1.80518 | 25.4 |
| 35 | -5381.650 | — | | |

TABLE 8

LENS-SYSTEM DATA
Zoom Ratio: 2.69

|  | Short Focal Length Extremity | Intermediate Focal Length | Long Focal Length Extremity |
|---|---|---|---|
| FNO. | 2.9 | 2.9 | 2.9 |
| f | 72.10 | 100.00 | 194.00 |
| W | 17.2 | 12.2 | 6.2 |
| Y | 21.64 | 21.64 | 21.64 |
| fB | 40.01 | 40.01 | 40.01 |
| L | 249.32 | 249.32 | 249.32 |
| d7 | 2.18 | 20.14 | 43.92 |
| d15 | 27.91 | 21.91 | 2.10 |
| d20 | 5.74 | 9.07 | 19.34 |
| d22 | 32.53 | 17.25 | 3.00 |

TABLE 9

LENS GROUP DATA

| Lens Group | 1st Surface | Focal Length |
|---|---|---|
| 1 | 1 | 120.86 |
| 2 | 8 | −35.01 |
| 3 | 16 | 67.32 |
| 4 | 21 | −199.11 |
| 5 | 24 | 92.13 |

Numerical Embodiment 4

Figure 19:
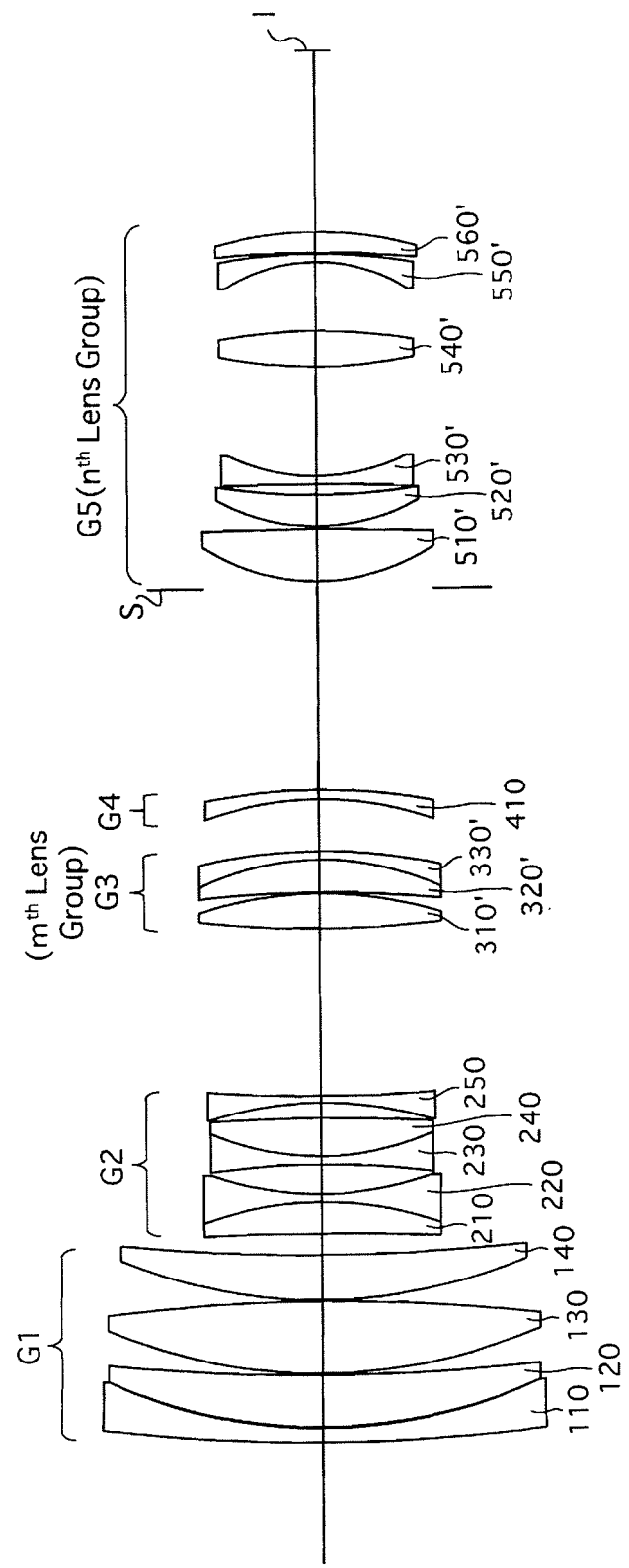
FIG. 19 shows a lens arrangement of a fourth numerical embodiment of a zoom lens system, according to the present invention, at the short focal length extremity when focused on an object at infinity.
Figure 22:
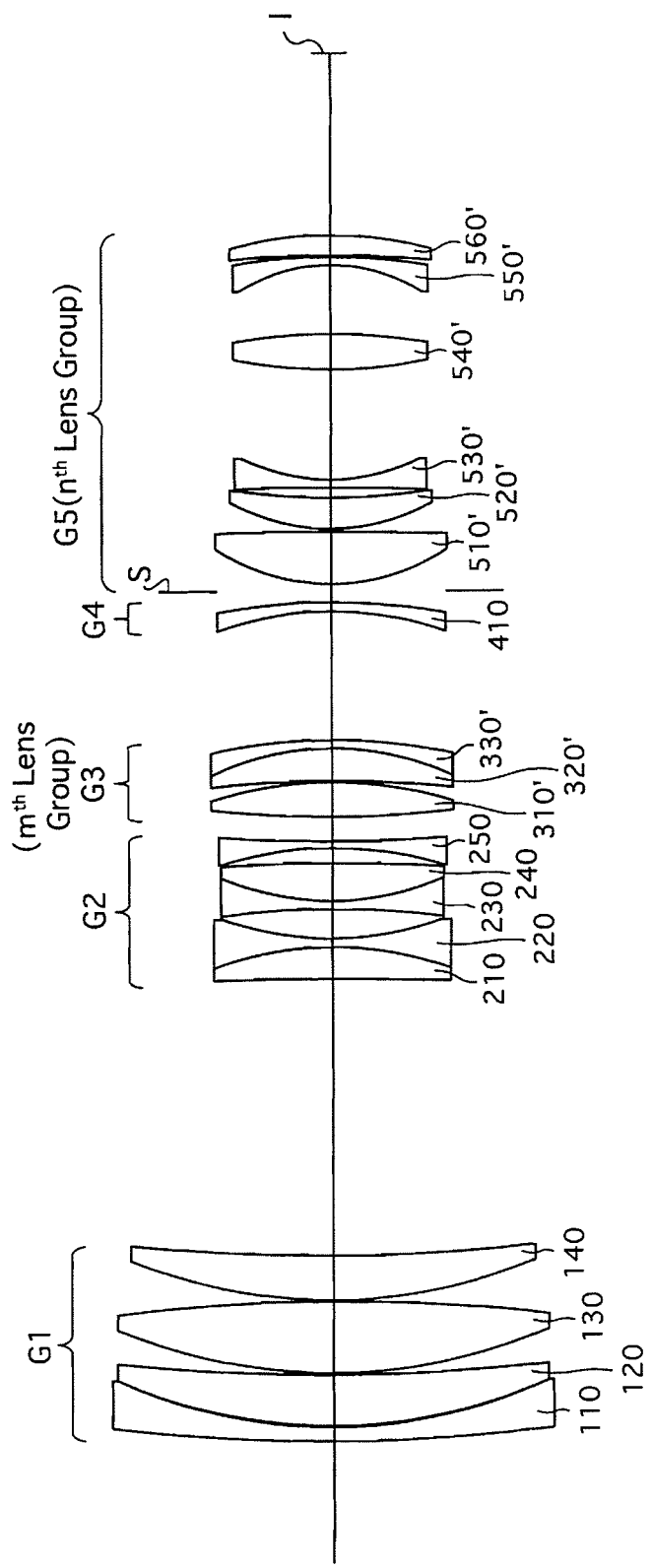
FIG. 22 shows a lens arrangement of the fourth numerical embodiment of the zoom lens system at the long focal length extremity when focused on an object at infinity.

FIGS. 19 through 24D and Tables 10 through 12 show a fourth numerical embodiment of the zoom lens system according to the present invention. FIG. 19 shows a lens arrangement of the fourth numerical embodiment of the zoom lens system, at the short focal length extremity when focused on an object at infinity. FIGS. 20A, 20B, 20C and 20D show various aberrations that occurred in the lens arrangement shown in FIG. 19, at the short focal length extremity when focused on an object at infinity. FIGS. 21A, 21B, 21C and 21D show lateral aberrations that occurred in the lens arrangement shown in FIG. 19, at the short focal length extremity when focused on an object at infinity. FIG. 22 shows a lens arrangement of the fourth numerical embodiment of the zoom lens system, at the long focal length extremity when focused on an object at infinity. FIGS. 23A, 23B, 23C and 23D show various aberrations that occurred in the lens arrangement shown in FIG. 22, at the long focal length extremity when focused on an object at infinity. FIGS. 24A, 24B, 24C and 24D show lateral aberrations that occurred in the lens arrangement shown in FIG. 22, at the long focal length extremity when focused on an object at infinity. Table 10 shows the lens surface data, Table 11 shows various lens-system data, and Table 12 shows the lens group data of the zoom lens system.

The lens arrangement of the fourth numerical embodiment is the same as that of the third numerical embodiment except for the following features:

(1) The negative meniscus lens element 110 and the positive meniscus lens element 120 of the first lens group G1 are not cemented to each other.

(2) The positive lens element 240 of the second lens group G2 is a biconvex positive lens element.

(3) The positive lens element 560' of the fifth lens group G5 is a positive meniscus lens element having a convex surface on the image side.

TABLE 10

LENS SURFACE DATA

| Surf. No. | R | d | N(d) | ν(d) |
|---|---|---|---|---|
| 1 | 302.414 | 2.30 | 1.83400 | 37.2 |
| 2 | 84.846 | 0.24 | | |
| 3 | 87.270 | 8.48 | 1.49700 | 81.6 |
| 4 | 348.810 | 0.30 | | |
| 5 | 93.927 | 11.61 | 1.43875 | 95.0 |
| 6 | −304.078 | 0.20 | | |
| 7 | 89.362 | 7.29 | 1.59522 | 67.7 |
| 8 | 335.379 | d8 | | |
| 9 | −523.303 | 5.09 | 1.90366 | 31.3 |
| 10 | −58.773 | 1.40 | 1.81600 | 46.6 |
| 11 | 55.864 | 4.76 | | |
| 12 | −142.387 | 1.33 | 1.59522 | 67.7 |
| 13 | 47.858 | 6.14 | 1.80518 | 25.5 |
| 14 | −297.446 | 2.48 | | |
| 15 | −62.923 | 1.10 | 1.83481 | 42.7 |
| 16 | 288.954 | d16 | | |
| 17 | 192.402 | 5.65 | 1.80400 | 46.6 |
| 18 | −67.359 | 0.20 | | |
| 19 | −188.034 | 5.29 | 1.49700 | 81.6 |
| 20 | −47.686 | 1.35 | 1.84666 | 23.8 |
| 21 | −93.255 | d21 | | |
| 22 | −57.152 | 1.50 | 1.61340 | 44.3 |
| 23 | −103.110 | d23 | | |
| 24(Diaphragm) | ∞ | 1.20 | | |
| 25 | 35.792 | 8.56 | 1.59522 | 67.7 |
| 26 | −471.926 | 0.46 | | |
| 27 | 35.774 | 5.02 | 1.43875 | 95.0 |
| 28 | 114.080 | 1.68 | | |
| 29 | −365.946 | 1.30 | 1.78590 | 44.2 |
| 30 | 34.807 | 17.71 | | |
| 31 | 85.718 | 5.77 | 1.59522 | 67.7 |
| 32 | −94.917 | 11.15 | | |
| 33 | −29.005 | 1.30 | 1.81600 | 46.6 |
| 34 | −98.542 | 0.22 | | |
| 35 | −190.567 | 3.35 | 1.90366 | 31.3 |
| 36 | −63.651 | — | | |

TABLE 11

LENS-SYSTEM DATA
Zoom Ratio: 2.70

|  | Short Focal Length Extremity | Intermediate Focal Length | Long Focal Length Extremity |
|---|---|---|---|
| FNO. | 2.9 | 2.9 | 2.9 |
| f | 71.97 | 100.00 | 194.00 |
| W | 17.2 | 12.2 | 6.2 |
| Y | 21.64 | 21.64 | 21.64 |
| fB | 40.02 | 40.02 | 40.02 |
| L | 245.22 | 245.22 | 245.22 |
| d8 | 3.43 | 21.42 | 44.85 |
| d16 | 27.11 | 21.76 | 4.00 |
| d21 | 8.41 | 11.02 | 20.82 |
| d23 | 32.52 | 17.27 | 1.80 |

TABLE 12

LENS GROUP DATA

| Lens Group | 1st Surface | Focal Length |
|---|---|---|
| 1 | 1 | 120.95 |
| 2 | 9 | −32.81 |
| 3 | 17 | 66.89 |
| 4 | 22 | −211.67 |
| 5 | 25 | 92.11 |

Numerical Embodiment 5

Figure 25:
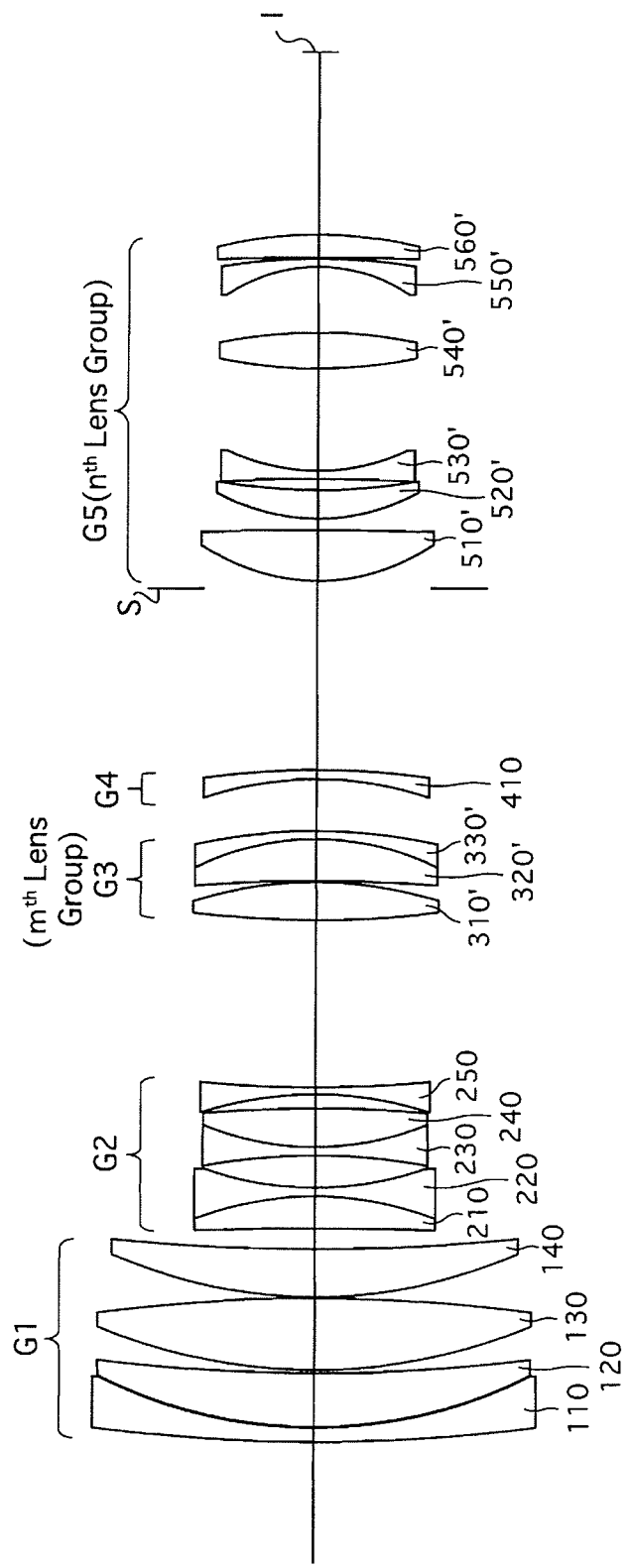
FIG. 25 shows a lens arrangement of a fifth numerical embodiment of a zoom lens system, according to the present invention, at the short focal length extremity when focused on an object at infinity.
Figure 28:
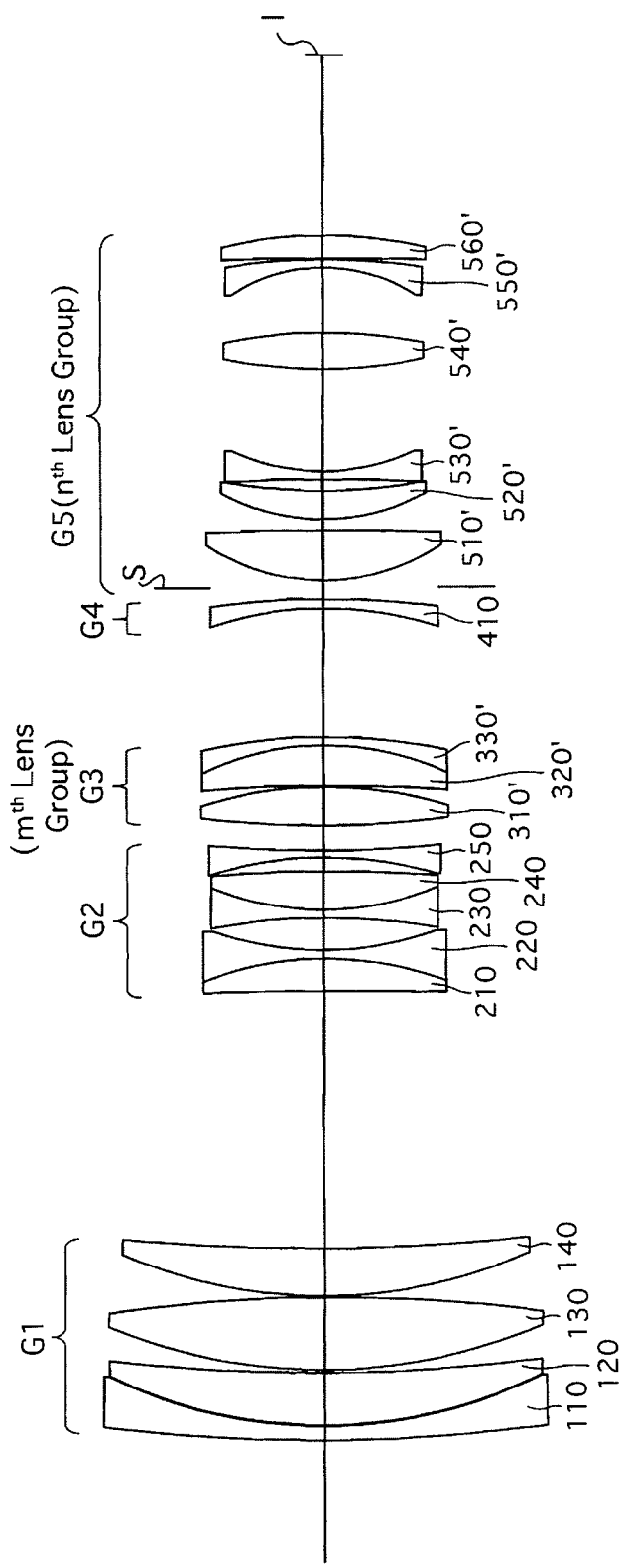
FIG. 28 shows a lens arrangement of the fifth numerical embodiment of the zoom lens system at the long focal length extremity when focused on an object at infinity.

FIGS. 25 through 30D and Tables 13 through 15 show a fifth numerical embodiment of the zoom lens system according to the present invention. FIG. 25 shows a lens arrangement of the fifth numerical embodiment of the zoom lens system, at the short focal length extremity when focused on an object at infinity. FIGS. 26A, 26B, 26C and 26D show various aberrations that occurred in the lens arrangement shown in FIG. 25, at the short focal length extremity when focused on an object at infinity. FIGS. 27A, 27B, 27C and 27D show lateral aberrations that occurred in the lens arrangement shown in FIG. 25, at the short focal length extremity when focused on an object at infinity. FIG. 28 shows a lens arrangement of the fifth numerical embodiment of the zoom lens system, at the long focal length extremity when focused on an object at infinity. FIGS. 29A, 29B, 29C and 29D show various aberrations that occurred in the lens arrangement shown in FIG. 28, at the long focal length extremity when focused on an object at infinity. FIGS. 30A, 30B, 30C and 30D show lateral aberrations that occurred in the lens arrangement shown in FIG. 28, at the long focal length extremity when focused on an object at infinity. Table 13 shows the lens surface data, Table 14 shows various lens-system data, and Table 15 shows the lens group data of the zoom lens system.

The lens arrangement of the fifth numerical embodiment is the same as that of the fourth numerical embodiment.

TABLE 13

LENS SURFACE DATA

| Surf. No. | R | d | N(d) | ν(d) |
|---|---|---|---|---|
| 1 | 284.981 | 2.30 | 1.83400 | 37.2 |
| 2 | 80.213 | 0.20 | | |
| 3 | 81.057 | 8.62 | 1.49700 | 81.6 |
| 4 | 300.000 | 0.50 | | |
| 5 | 94.614 | 11.57 | 1.43875 | 95.0 |
| 6 | −274.209 | 0.20 | | |
| 7 | 84.888 | 7.74 | 1.59522 | 67.7 |
| 8 | 354.044 | d8 | | |
| 9 | −685.283 | 5.19 | 1.90366 | 31.3 |
| 10 | −56.726 | 1.40 | 1.81600 | 46.6 |
| 11 | 56.726 | 5.17 | | |
| 12 | −106.259 | 1.33 | 1.59282 | 68.6 |
| 13 | 50.357 | 6.21 | 1.80518 | 25.4 |
| 14 | −223.458 | 2.25 | | |
| 15 | −63.763 | 1.10 | 1.83481 | 42.7 |
| 16 | 213.349 | d16 | | |
| 17 | 165.322 | 6.21 | 1.80400 | 46.6 |
| 18 | −68.979 | 0.20 | | |
| 19 | −270.455 | 6.64 | 1.49700 | 81.6 |
| 20 | −46.780 | 1.35 | 1.84666 | 23.8 |
| 21 | −93.561 | d21 | | |
| 22 | −59.854 | 1.50 | 1.61340 | 44.3 |
| 23 | −138.244 | d23 | | |
| 24(Diaphragm) | ∞ | 1.20 | | |
| 25 | 35.217 | 8.18 | 1.59522 | 67.7 |
| 26 | −576.720 | 1.82 | | |
| 27 | 35.653 | 4.58 | 1.43875 | 95.0 |
| 28 | 95.396 | 1.82 | | |
| 29 | −304.825 | 1.30 | 1.78590 | 44.2 |
| 30 | 35.879 | 16.47 | | |
| 31 | 83.169 | 5.83 | 1.59522 | 67.7 |
| 32 | −83.169 | 10.52 | | |
| 33 | −28.225 | 1.30 | 1.81600 | 46.6 |
| 34 | −102.912 | 0.20 | | |
| 35 | −463.847 | 3.66 | 1.90366 | 31.3 |
| 36 | −73.218 | — | | |

TABLE 14

LENS-SYSTEM DATA
Zoom Ratio: 2.69

| | Short Focal Length Extremity | Intermediate Focal Length | Long Focal Length Extremity |
|---|---|---|---|
| FNO. | 2.9 | 2.9 | 2.9 |
| f | 72.09 | 100.00 | 194.00 |
| W | 17.2 | 12.3 | 6.2 |
| Y | 21.64 | 21.64 | 21.64 |
| fB | 40.05 | 40.05 | 40.05 |
| L | 243.70 | 243.70 | 243.71 |
| d8 | 3.34 | 19.94 | 41.62 |
| d16 | 27.03 | 21.66 | 4.00 |
| d21 | 8.32 | 10.85 | 20.67 |
| d23 | 29.40 | 15.64 | 1.80 |

TABLE 15

LENS GROUP DATA

| Lens Group | 1st Surface | Focal Length |
|---|---|---|
| 1 | 1 | 115.56 |
| 2 | 9 | −31.77 |
| 3 | 17 | 62.84 |
| 4 | 22 | −173.35 |
| 5 | 25 | 89.75 |

Numerical Embodiment 6

Figure 31:
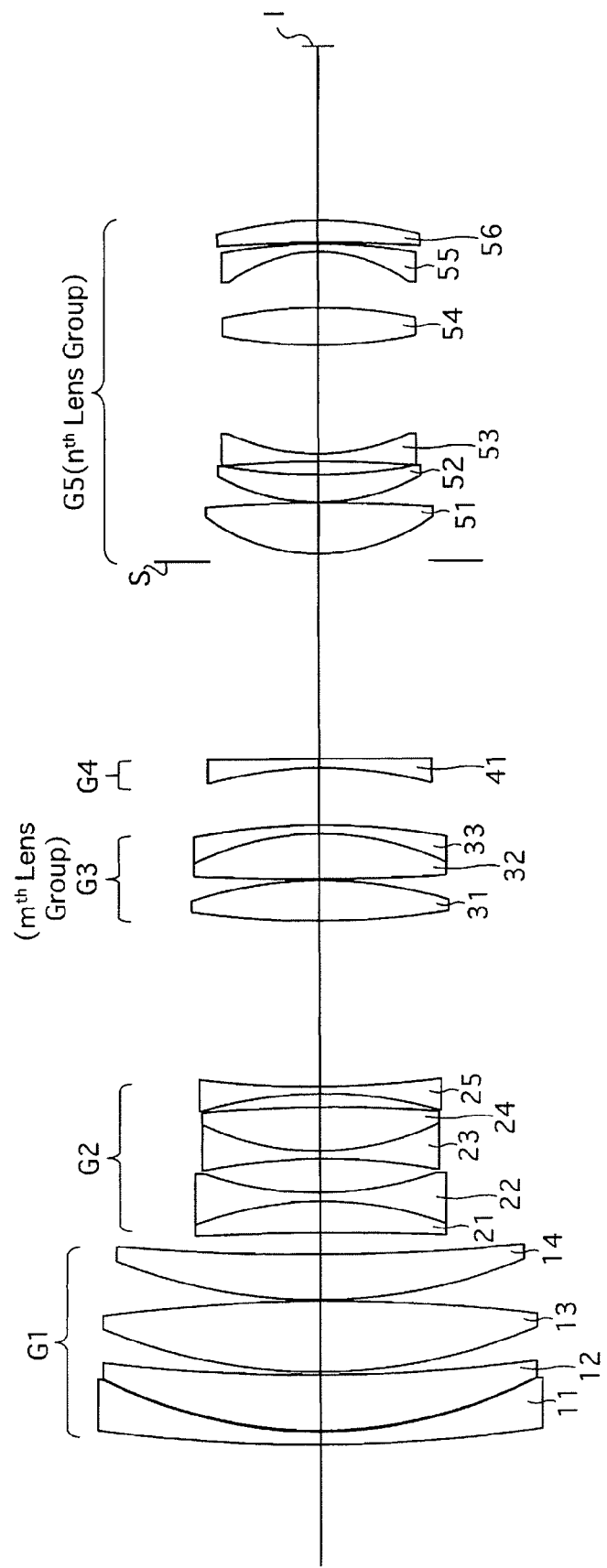
FIG. 31 shows a lens arrangement of a sixth numerical embodiment of a zoom lens system, according to the present invention, at the short focal length extremity when focused on an object at infinity.
Figures 32A, 32B, 32C, 32D:
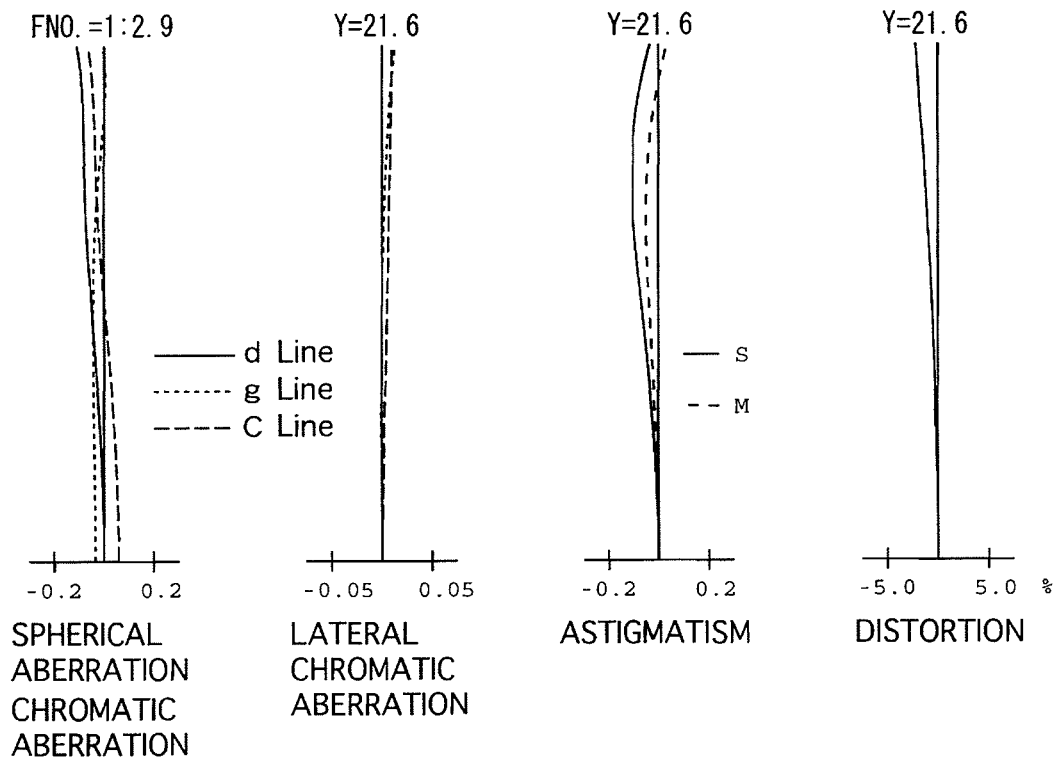
FIGS. 32A, 32B, 32C and 32D show various aberrations that occurred in the lens arrangement shown in FIG. 31.
Figure 33A:
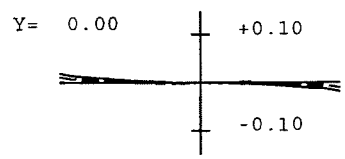
FIGS. 33A, 33B, 33C and 33D show lateral aberrations that occurred in the lens arrangement shown in FIG. 31.
Figure 33B:
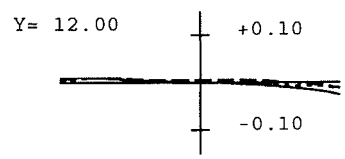
Figure 33C:
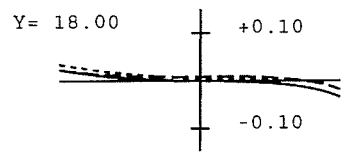
Figure 33D:
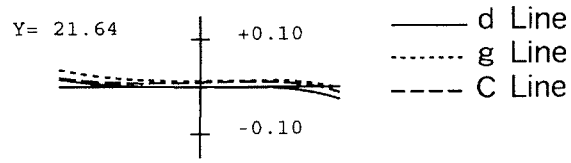
Figure 34:
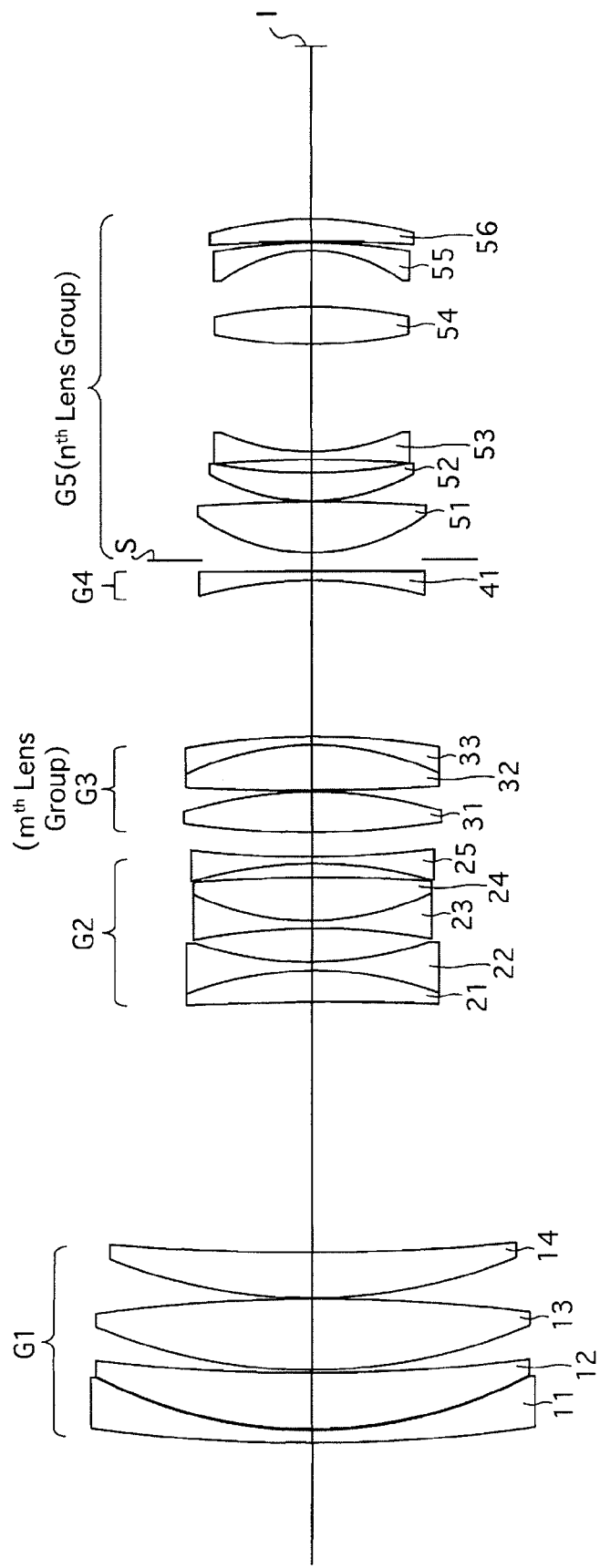
FIG. 34 shows a lens arrangement of the sixth numerical embodiment of the zoom lens system at the long focal length extremity when focused on an object at infinity.

FIGS. 31 through 36D and Tables 16 through 18 show a sixth numerical embodiment of the zoom lens system according to the present invention. FIG. 31 shows a lens arrangement of the sixth numerical embodiment of the zoom lens system, at the short focal length extremity when focused on an object at infinity. FIGS. 32A, 32B, 32C and 32D show various aberrations that occurred in the lens arrangement shown in FIG. 31, at the short focal length extremity when focused on an object at infinity. FIGS. 33A, 33B, 33C and 33D show lateral aberrations that occurred in the lens arrangement shown in FIG. 31, at the short focal length extremity when focused on an object at infinity. FIG. 34 shows a lens arrangement of the sixth numerical embodiment of the zoom lens system, at the long focal length extremity when focused on an object at infinity. FIGS. 35A, 35B, 35C and 35D show various aberrations that occurred in the lens arrangement shown in FIG. 34, at the long focal length extremity when focused on an object at infinity. FIGS. 36A, 36B, 36C and 36D show lateral aberrations that occurred in the lens arrangement shown in FIG. 34, at the long focal length extremity when focused on an object at infinity. Table 16 shows the lens surface data, Table 17 shows various lens-system data, and Table 18 shows the lens group data of the zoom lens system.

The lens arrangement of the sixth numerical embodiment is the same as that of the first numerical embodiment except for the following features:

(1) The negative meniscus lens element 11 and the positive meniscus lens element 12 of the first lens group G1 are not cemented to each other.

(2) The positive lens element 32 of the third lens group G3 is a biconvex positive lens element.

TABLE 16

LENS SURFACE DATA

| Surf. No. | R | d | N(d) | v(d) |
|---|---|---|---|---|
| 1 | 268.211 | 2.10 | 1.83400 | 37.2 |
| 2 | 77.688 | 0.20 | | |
| 3 | 78.470 | 9.10 | 1.49700 | 81.6 |
| 4 | 300.000 | 0.50 | | |
| 5 | 92.628 | 11.70 | 1.43875 | 95.0 |
| 6 | −276.712 | 0.20 | | |
| 7 | 91.695 | 7.30 | 1.59522 | 67.7 |
| 8 | 398.949 | d8 | | |
| 9 | −533.916 | 5.10 | 1.91650 | 31.6 |
| 10 | −61.110 | 1.40 | 1.81600 | 46.6 |
| 11 | 61.110 | 5.40 | | |
| 12 | −109.774 | 1.30 | 1.59522 | 67.7 |
| 13 | 46.933 | 7.00 | 1.80518 | 25.4 |
| 14 | −254.300 | 2.20 | | |
| 15 | −72.191 | 1.10 | 1.83481 | 42.7 |
| 16 | 170.851 | d16 | | |
| 17 | 153.851 | 6.50 | 1.80400 | 46.6 |
| 18 | −72.797 | 0.20 | | |
| 19 | 428.584 | 7.30 | 1.49700 | 81.6 |
| 20 | −49.133 | 1.40 | 1.84666 | 23.8 |
| 21 | −119.634 | d21 | | |
| 22 | −72.589 | 1.50 | 1.61272 | 58.7 |
| 23 | −4319.637 | d23 | | |
| 24(Diaphragm) | ∞ | 1.20 | | |
| 25 | 32.920 | 8.20 | 1.59522 | 67.7 |
| 26 | −264.639 | 0.10 | | |
| 27 | 35.157 | 4.50 | 1.43875 | 95.0 |
| 28 | 90.333 | 2.10 | | |
| 29 | −193.592 | 1.30 | 1.78590 | 44.2 |
| 30 | 37.027 | 17.40 | | |
| 31 | 83.055 | 6.00 | 1.59522 | 67.7 |
| 32 | −83.055 | 9.00 | | |
| 33 | −25.707 | 1.30 | 1.81600 | 46.6 |
| 34 | −91.405 | 0.20 | | |
| 35 | −274.911 | 3.60 | 1.91650 | 31.6 |
| 36 | −62.715 | — | | |

TABLE 17

LENS-SYSTEM DATA
Zoom Ratio: 2.69

| | Short Focal Length Extremity | Intermediate Focal Length | Long Focal Length Extremity |
|---|---|---|---|
| FNO. | 2.9 | 2.9 | 2.9 |
| f | 72.10 | 100.00 | 194.00 |
| W | 17.1 | 12.2 | 6.2 |
| Y | 21.64 | 21.64 | 21.64 |
| fB | 40.00 | 40.00 | 40.00 |
| L | 245.45 | 245.45 | 245.45 |
| d8 | 3.48 | 19.67 | 40.33 |
| d16 | 26.77 | 21.33 | 4.00 |
| d21 | 9.22 | 11.87 | 25.20 |
| d23 | 31.86 | 18.45 | 1.80 |

TABLE 18

LENS GROUP DATA

| Lens Group | 1st Surface | Focal Length |
|---|---|---|
| 1 | 1 | 118.56 |
| 2 | 9 | −33.16 |
| 3 | 17 | 58.47 |
| 4 | 22 | −120.51 |
| 5 | 25 | 81.79 |

Numerical Embodiment 7

Figure 37:
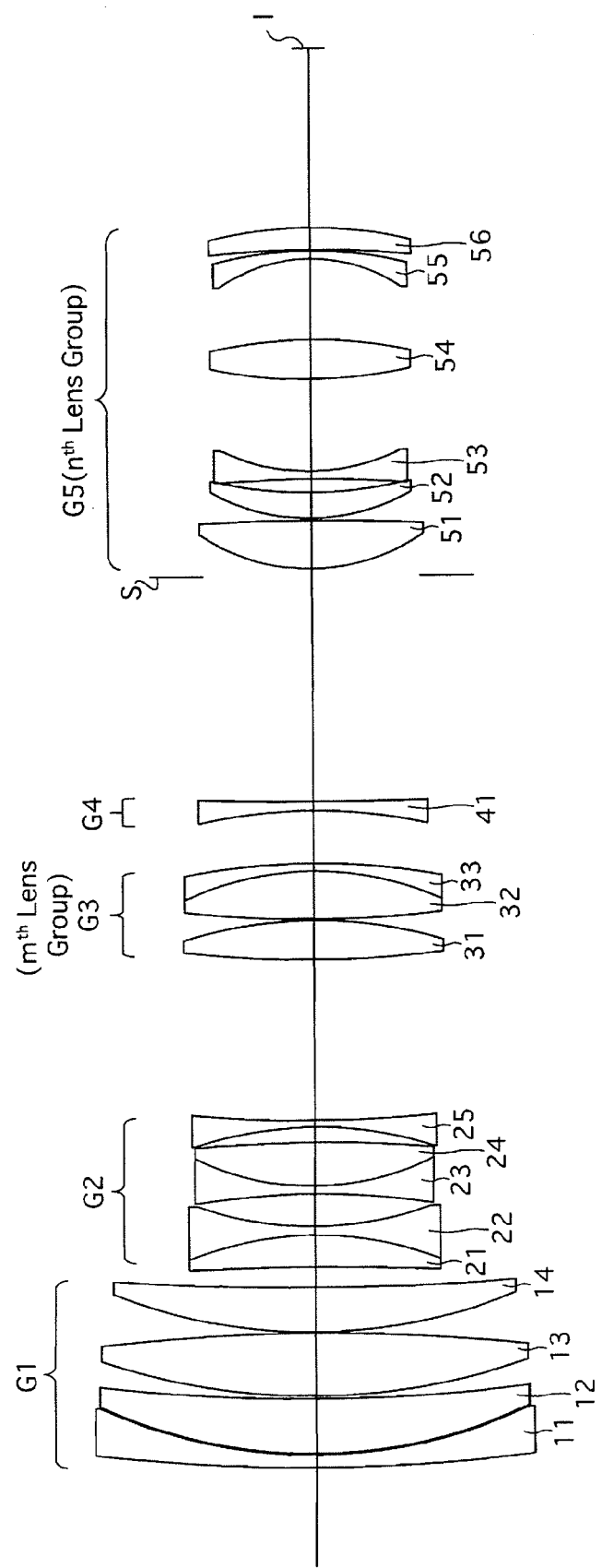
FIG. 37 shows a lens arrangement of a seventh numerical embodiment of a zoom lens system, according to the present invention, at the short focal length extremity when focused on an object at infinity.
Figure 40:
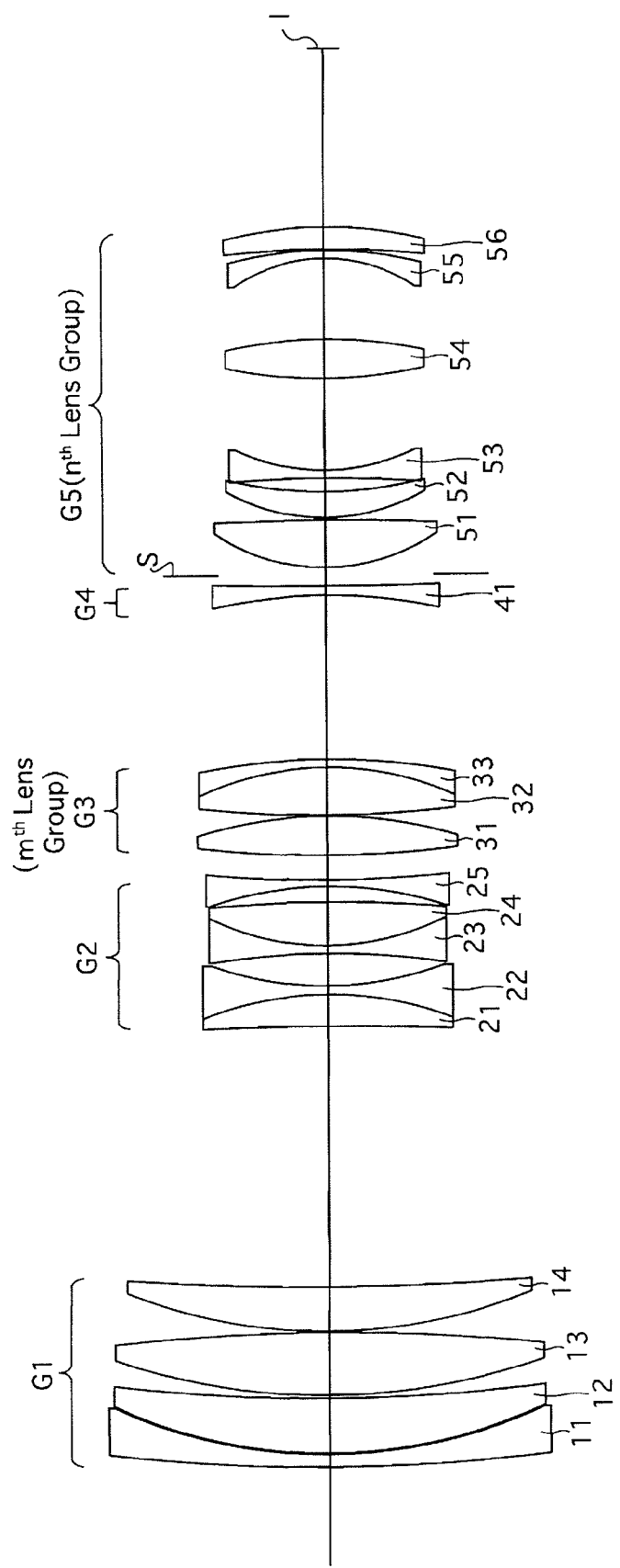
FIG. 40 shows a lens arrangement of the seventh numerical embodiment of a zoom lens system at the long focal length extremity when focused on an object at infinity.

FIGS. 37 through 42D and Tables 19 through 21 show a seventh numerical embodiment of the zoom lens system according to the present invention. FIG. 37 shows a lens arrangement of the seventh numerical embodiment of the zoom lens system, at the short focal length extremity when focused on an object at infinity. FIGS. 38A, 38B, 38C and 38D show various aberrations that occurred in the lens arrangement shown in FIG. 37, at the short focal length extremity when focused on an object at infinity. FIGS. 39A, 39B, 39C and 39D show lateral aberrations that occurred in the lens arrangement shown in FIG. 37, at the short focal length extremity when focused on an object at infinity. FIG. 40 shows a lens arrangement of the seventh numerical embodiment of the zoom lens system, at the long focal length extremity when focused on an object at infinity. FIGS. 41A, 41B, 41C and 41D show various aberrations that occurred in the lens arrangement shown in FIG. 40, at the long focal length extremity when focused on an object at infinity. FIGS. 42A, 42B, 42C and 42D show lateral aberrations that occurred in the lens arrangement shown in FIG. 40, at the long focal length extremity when focused on an object at infinity. Table 19 shows the lens surface data, Table 20 shows various lens-system data, and Table 21 shows the lens group data of the zoom lens system.

The lens arrangement of the seventh numerical embodiment is the same as that of the sixth numerical embodiment except for the following feature:

(1) The negative single lens element 41 of the fourth lens group G4 is a biconcave negative single lens element.

TABLE 19

LENS SURFACE DATA

| Surf. No. | R | d | N(d) | v(d) |
|---|---|---|---|---|
| 1 | 309.600 | 2.10 | 1.80610 | 33.3 |
| 2 | 85.789 | 0.20 | | |
| 3 | 85.437 | 9.00 | 1.49700 | 81.6 |
| 4 | 300.000 | 0.50 | | |
| 5 | 109.735 | 10.40 | 1.43500 | 95.0 |
| 6 | −324.713 | 0.20 | | |
| 7 | 89.923 | 7.40 | 1.59282 | 68.6 |
| 8 | 488.290 | d8 | | |
| 9 | −515.875 | 5.20 | 1.90366 | 31.3 |
| 10 | −57.732 | 1.40 | 1.81600 | 46.6 |
| 11 | 57.732 | 5.30 | | |
| 12 | −129.592 | 1.30 | 1.59282 | 68.6 |
| 13 | 45.337 | 7.10 | 1.80518 | 25.5 |
| 14 | −233.290 | 2.50 | | |
| 15 | −64.471 | 1.10 | 1.83481 | 42.7 |
| 16 | 221.827 | d16 | | |
| 17 | 188.650 | 6.40 | 1.80420 | 46.5 |
| 18 | −74.390 | 0.20 | | |
| 19 | 200.572 | 7.80 | 1.49700 | 81.6 |
| 20 | −51.664 | 1.30 | 1.84666 | 23.8 |
| 21 | −113.738 | d21 | | |
| 22 | −88.301 | 1.50 | 1.65412 | 39.6 |
| 23 | 735.519 | d23 | | |
| 24(Diaphragm) | ∞ | 1.20 | | |
| 25 | 33.382 | 7.80 | 1.59282 | 68.6 |
| 26 | −442.682 | 0.40 | | |
| 27 | 34.135 | 4.20 | 1.43500 | 95.0 |
| 28 | 68.371 | 2.20 | | |
| 29 | −227.525 | 1.30 | 1.77250 | 49.6 |
| 30 | 34.854 | 14.90 | | |
| 31 | 78.662 | 6.40 | 1.59282 | 68.6 |
| 32 | −78.662 | 13.20 | | |
| 33 | −27.032 | 1.30 | 1.80420 | 46.5 |
| 34 | −65.193 | 0.20 | | |
| 35 | −157.501 | 3.60 | 1.90366 | 31.3 |
| 36 | −69.337 | — | | |

TABLE 20

LENS-SYSTEM DATA
Zoom Ratio: 2.69

|  | Short Focal Length Extremity | Intermediate Focal Length | Long Focal Length Extremity |
|---|---|---|---|
| FNO. | 2.9 | 2.9 | 2.9 |
| f | 72.01 | 100.00 | 194.00 |
| W | 17.1 | 12.2 | 6.2 |
| Y | 21.64 | 21.64 | 21.64 |
| fB | 37.80 | 37.80 | 37.80 |
| L | 249.30 | 249.30 | 249.30 |
| d8 | 3.33 | 20.39 | 42.38 |
| d16 | 26.13 | 20.55 | 4.00 |
| d21 | 8.60 | 12.46 | 26.71 |
| d23 | 36.84 | 21.50 | 1.80 |

TABLE 21

LENS GROUP DATA

| Lens Group | 1st Surface | Focal Length |
|---|---|---|
| 1 | 1 | 123.42 |
| 2 | 9 | −33.31 |
| 3 | 17 | 55.91 |
| 4 | 22 | −120.44 |
| 5 | 25 | 87.16 |

Numerical Embodiment 8

Figure 43:
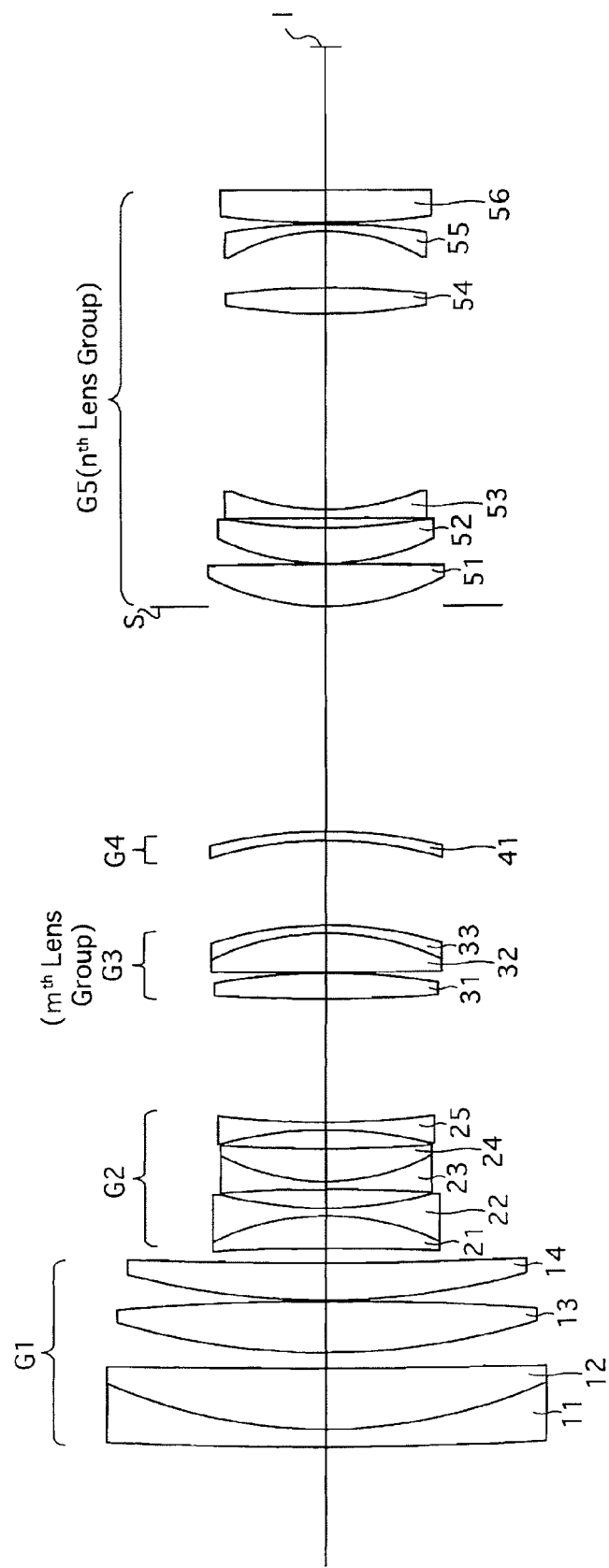
FIG. 43 shows a lens arrangement of an eighth numerical embodiment of a zoom lens system, according to the present invention, at the short focal length extremity when focused on an object at infinity.
Figure 46:
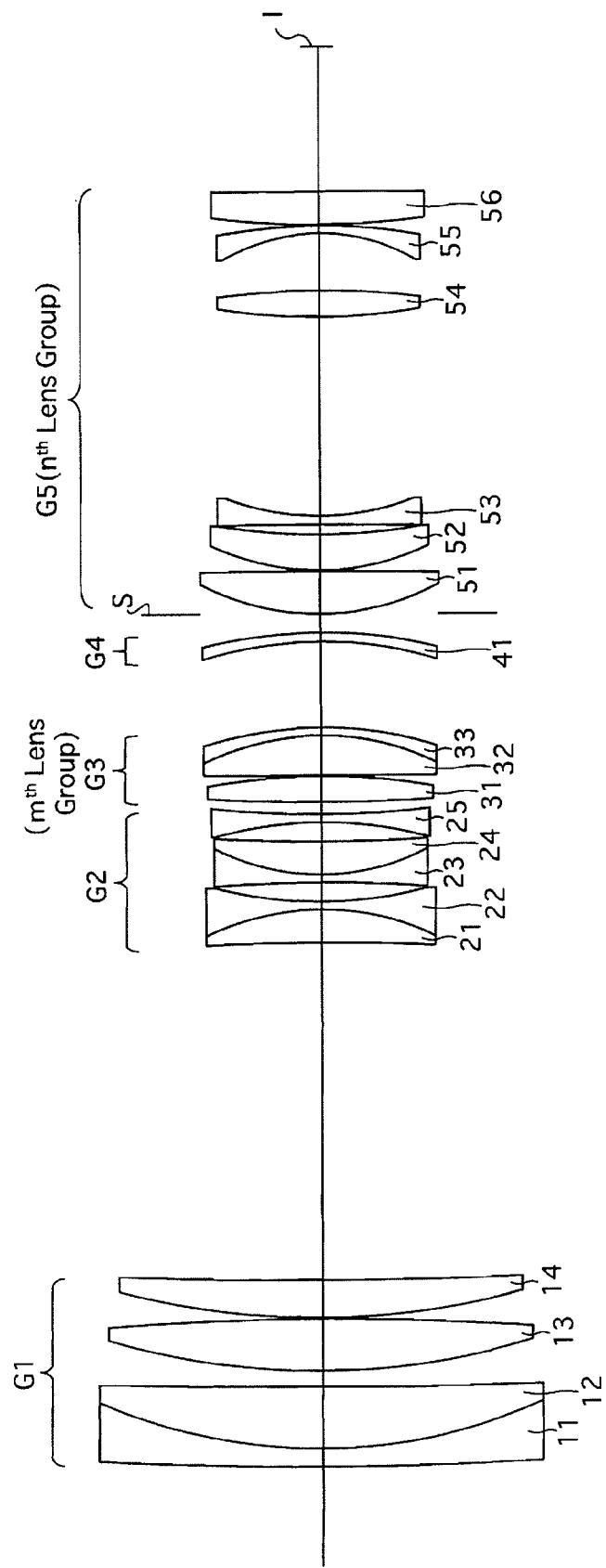
FIG. 46 shows a lens arrangement of the eighth numerical embodiment of the zoom lens system at the long focal length extremity when focused on an object at infinity.
Figures 47A, 47B, 47C, 47D:
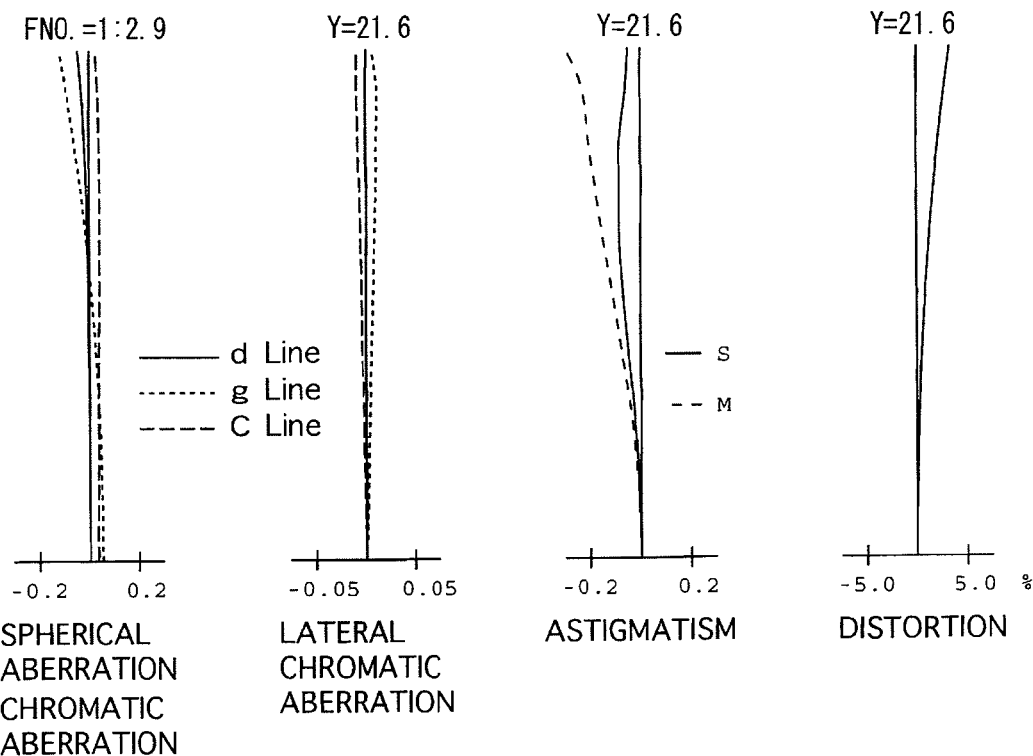
FIGS. 47A, 47B, 47C and 47D show various aberrations that occurred in the lens arrangement shown in FIG. 46.
Figure 48A:
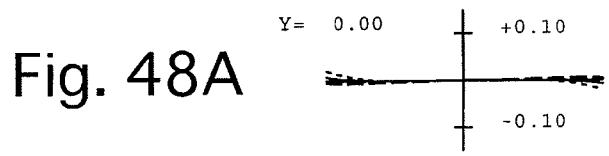
FIGS. 48A, 48B, 48C and 48D show lateral aberrations that occurred in the lens arrangement shown in FIG. 46.
Figure 48B:
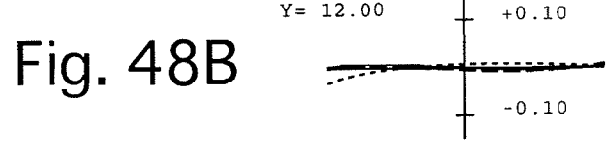
Figure 48C:
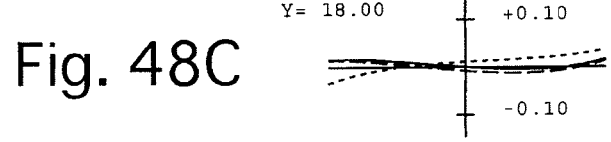
Figure 48D:
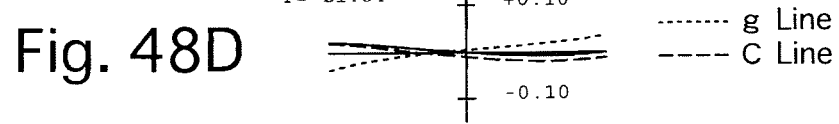

FIGS. 43 through 48D and Tables 22 through 24 show an eighth numerical embodiment of the zoom lens system according to the present invention. FIG. 43 shows a lens arrangement of the eighth numerical embodiment of the zoom lens system, at the short focal length extremity when focused on an object at infinity. FIGS. 44A, 44B, 44C and 44D show various aberrations that occurred in the lens arrangement shown in FIG. 43, at the short focal length extremity when focused on an object at infinity. FIGS. 45A, 45B, 45C and 45D show lateral aberrations that occurred in the lens arrangement shown in FIG. 43, at the short focal length extremity when focused on an object at infinity. FIG. 46 shows a lens arrangement of the eighth numerical embodiment of the zoom lens system, at the long focal length extremity when focused on an object at infinity. FIGS. 47A, 47B, 47C and 47D show various aberrations that occurred in the lens arrangement shown in FIG. 46, at the long focal length extremity when focused on an object at infinity. FIGS. 48A, 48B, 48C and 48D show lateral aberrations that occurred in the lens arrangement shown in FIG. 46, at the long focal length extremity when focused on an object at infinity. Table 22 shows the lens surface data, Table 23 shows various lens-system data, and Table 24 shows the lens group data of the zoom lens system.

The lens arrangement of the eighth numerical embodiment is the same as that of the second numerical embodiment except for the following feature:

(1) The positive lens element 32 of the third lens group G3 is a biconvex positive lens element.

TABLE 22

LENS SURFACE DATA

| Surf. No. | R | d | N(d) | ν(d) |
|---|---|---|---|---|
| 1 | 702.779 | 3.00 | 1.72342 | 38.0 |
| 2 | 91.358 | 10.16 | 1.49700 | 81.6 |
| 3 | 1501.767 | 2.66 | | |
| 4 | 122.662 | 8.62 | 1.49782 | 82.6 |
| 5 | −465.130 | 0.20 | | |
| 6 | 129.226 | 6.22 | 1.61800 | 63.4 |
| 7 | 826.842 | d7 | | |
| 8 | −391.287 | 5.38 | 1.83400 | 37.2 |
| 9 | −43.814 | 1.30 | 1.77410 | 47.3 |
| 10 | 70.787 | 3.11 | | |
| 11 | −253.410 | 1.30 | 1.61800 | 63.4 |
| 12 | 38.650 | 5.37 | 1.80518 | 25.4 |
| 13 | 286.481 | 3.12 | | |
| 14 | −68.554 | 1.30 | 1.80400 | 46.6 |
| 15 | 160.382 | d15 | | |
| 16 | 309.125 | 4.25 | 1.72900 | 54.6 |
| 17 | −109.742 | 0.10 | | |
| 18 | 1760.334 | 6.46 | 1.49700 | 81.6 |
| 19 | −44.675 | 1.30 | 1.90400 | 27.2 |
| 20 | −65.041 | d20 | | |
| 21 | −66.044 | 1.49 | 1.70000 | 44.2 |
| 22 | −80.490 | d22 | | |
| 23 (Diaphragm) | ∞ | 0.00 | | |
| 24 | 42.674 | 6.97 | 1.61800 | 63.4 |
| 25 | −776.064 | 0.10 | | |
| 26 | 41.881 | 5.88 | 1.49700 | 81.6 |
| 27 | 104.211 | 1.62 | | |
| 28 | −723.179 | 1.40 | 1.69000 | 35.1 |
| 29 | 43.912 | 32.21 | | |
| 30 | 102.186 | 4.27 | 1.61800 | 63.4 |
| 31 | −134.020 | 9.29 | | |
| 32 | −31.937 | 1.20 | 1.80400 | 46.6 |
| 33 | −96.796 | 0.20 | | |
| 34 | 144.464 | 5.40 | 1.77742 | 26.8 |
| 35 | −1415.259 | — | | |

TABLE 23

LENS-SYSTEM DATA
Zoom Ratio: 2.69

|  | Short Focal Length Extremity | Intermediate Focal Length | Long Focal Length Extremity |
|---|---|---|---|
| FNO. | 2.9 | 2.9 | 2.9 |
| f | 72.11 | 119.99 | 194.00 |
| W | 17.1 | 10.1 | 6.2 |
| Y | 21.64 | 21.64 | 21.64 |
| fB | 38.05 | 38.05 | 38.06 |
| L | 249.32 | 249.32 | 249.32 |
| d7 | 2.40 | 34.74 | 54.80 |
| d15 | 20.25 | 13.38 | 2.00 |
| d20 | 14.04 | 14.04 | 14.04 |
| d22 | 37.20 | 11.74 | 3.04 |

TABLE 24

LENS GROUP DATA

| Lens Group | 1st Surface | Focal Length |
|---|---|---|
| 1 | 1 | 134.15 |
| 2 | 8 | −32.16 |
| 3 | 16 | 72.45 |
| 4 | 21 | −549.02 |
| 5 | 24 | 92.52 |

Numerical Embodiment 9

Figure 49:
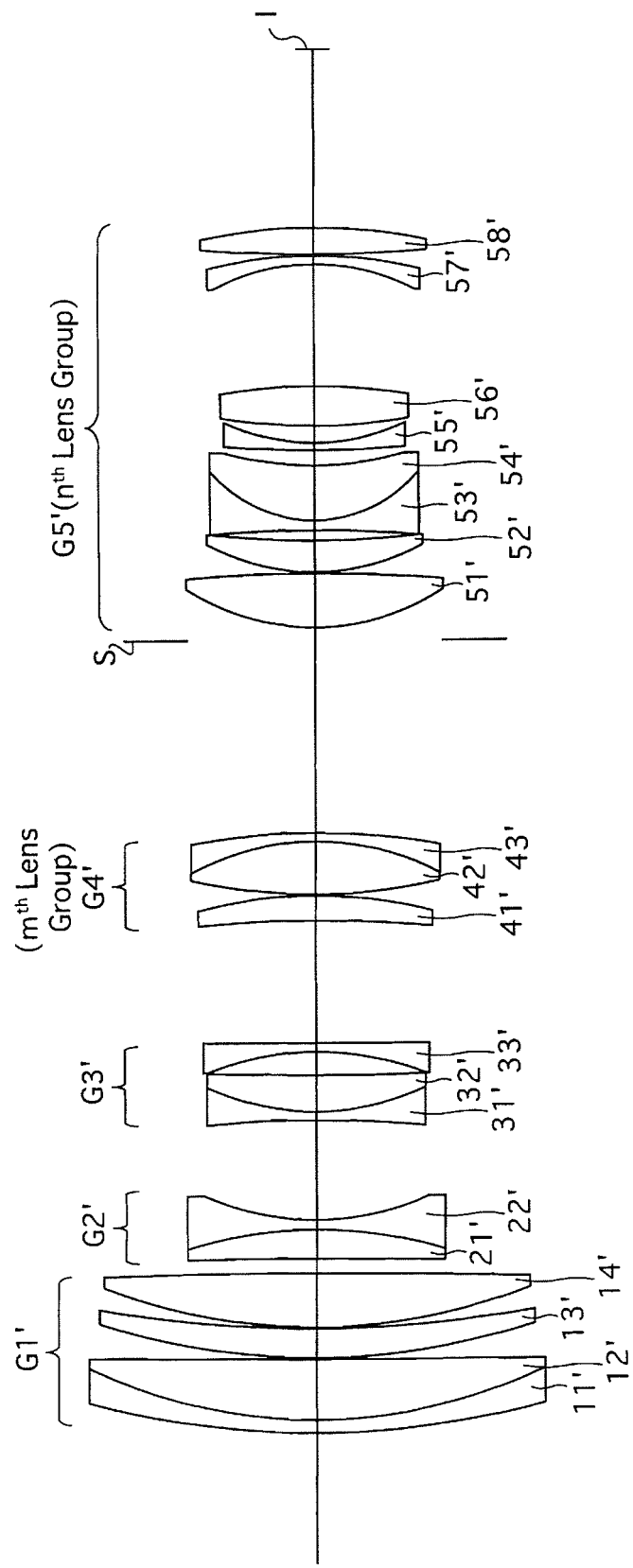
FIG. 49 shows a lens arrangement of a ninth numerical embodiment of a zoom lens system, according to the present invention, at the short focal length extremity when focused on an object at infinity.
Figure 52:
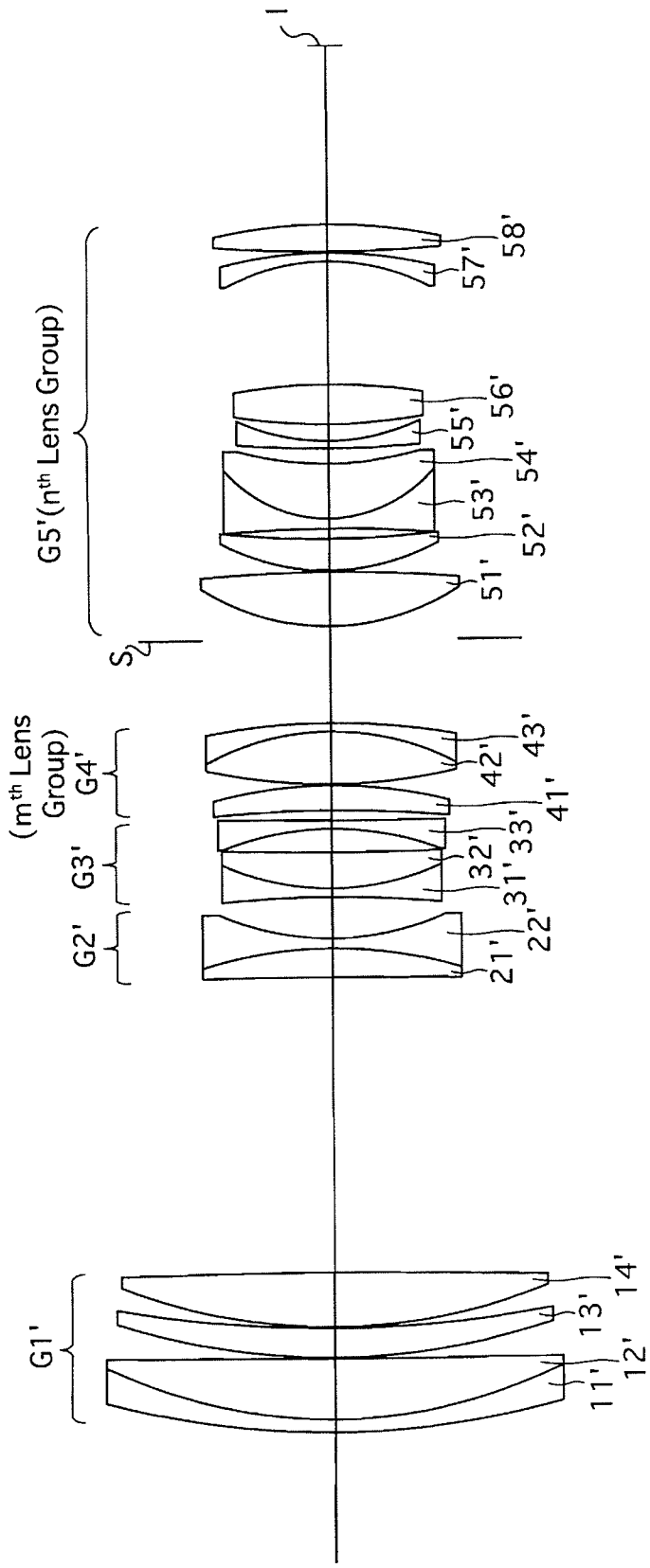
FIG. 52 shows a lens arrangement of the ninth numerical embodiment of a zoom lens system at the long focal length extremity when focused on an object at infinity.

FIGS. 49 through 54D and Tables 25 through 27 show a ninth numerical embodiment of the zoom lens system according to the present invention. FIG. 49 shows a lens arrangement of the ninth numerical embodiment of the zoom lens system, at the short focal length extremity when focused on an object at infinity. FIGS. 50A, 50B, 50C and 50D show various aberrations that occurred in the lens arrangement shown in FIG. 49, at the short focal length extremity when focused on an object at infinity. FIGS. 51A, 51B, 51C and 51D show lateral aberrations that occurred in the lens arrangement shown in FIG. 49, at the short focal length extremity when focused on an object at infinity. FIG. 52 shows a lens arrangement of the ninth numerical embodiment of the zoom lens system, at the long focal length extremity when focused on an object at infinity. FIGS. 53A, 53B, 53C and 53D show various aberrations that occurred in the lens arrangement shown in FIG. 52, at the long focal length extremity when focused on an object at infinity. FIGS. 54A, 54B, 54C and 54D show lateral aberrations that occurred in the lens arrangement shown in FIG. 52, at the long focal length extremity when focused on an object at infinity. Table 25 shows the lens surface data, Table 26 shows various lens-system data, and Table 27 shows the lens group data of the zoom lens system.

The zoom lens system of the ninth numerical embodiment is configured of a positive first lens group G1', a negative second lens group G2', a negative third lens group G3', a positive fourth lens group ($m^{th}$ lens group/focusing group) G4', and a positive fifth lens group ($n^{th}$ lens group) G5', in that order from the object side. A diaphragm S is provided between the fourth lens group G4' and the fifth lens group G5' (immediately in front of the fifth lens group G5'). The diaphragm S remains stationary with the fifth lens group G5' relative to the imaging plane I (i.e., the diaphragm S and the fifth lens group G5 do not move in the optical axis direction) during zooming from the short focal length extremity to the long focal length extremity.

The first lens group G1' is configured of a negative meniscus lens element (negative lens element having a concave surface on the image side) 11' having a convex surface on the object side, a positive meniscus lens element (positive lens element having a convex surface on the object side) 12' having a convex surface on the object side, a positive meniscus lens element (positive lens element having a convex surface on the object side) 13' having a convex surface on the object side, and a biconvex positive lens element (a positive lens element having a convex surface on the object side) 14', in that order from the object side. The negative meniscus lens element 11' and the positive meniscus lens element 12' are cemented to each other.

The second lens group G2' is configured of a positive meniscus lens element 21' having a convex surface on the image side, and a biconcave negative lens element 22', in that order from the object side. The positive meniscus lens element 21' and the biconcave negative lens element 22' are cemented to each other.

The third lens group G3' is configured of a biconcave negative lens element 31', a positive meniscus lens element 32' having a convex surface on the object side, and a biconcave negative lens element 33', in that order from the object side. The biconcave negative lens element 31' and the positive meniscus lens element 32' are cemented to each other.

The fourth lens group G4' is configured of a positive meniscus lens element 41' having a convex surface on the image side, a biconvex positive lens element 42', and a negative meniscus lens element 43' having a convex surface on the image side, in that order from the object side. The biconvex positive lens element 42' and the negative meniscus lens element 43' are cemented to each other.

The fifth lens group G5' is configured of a biconvex positive lens element 51', a positive meniscus lens element 52' having a convex surface on the object side, a biconcave negative lens element 53', a positive meniscus lens element 54' having a convex surface on the object side, a negative meniscus lens element 55' having a convex surface on the object side, a biconvex positive lens element (intermediate positive lens element) 56', a negative meniscus lens element 57' having a convex surface on the image side, and a biconvex positive lens element 58', in that order from the object side. The biconcave negative lens element 53' and the positive meniscus lens element 54' are cemented to each other.

TABLE 25

LENS SURFACE DATA

| Surf. No. | R | d | N(d) | ν(d) |
|---|---|---|---|---|
| 1 | 133.848 | 2.00 | 1.90366 | 31.3 |
| 2 | 79.909 | 9.41 | 1.45860 | 90.2 |
| 3 | 3114.867 | 0.20 | | |
| 4 | 109.975 | 4.43 | 1.43500 | 95.0 |
| 5 | 191.579 | 0.20 | | |
| 6 | 92.154 | 8.20 | 1.49700 | 81.6 |
| 7 | −1154.616 | d7 | | |
| 8 | −829.746 | 4.37 | 1.90366 | 31.3 |
| 9 | −68.784 | 1.50 | 1.69680 | 55.5 |
| 10 | 44.320 | d10 | | |
| 11 | −182.000 | 1.30 | 1.61800 | 63.4 |
| 12 | 41.115 | 5.50 | 1.80518 | 25.5 |
| 13 | 589.240 | 3.55 | | |
| 14 | −46.524 | 1.30 | 1.83481 | 42.7 |
| 15 | 3900.032 | d15 | | |
| 16 | −196.945 | 3.80 | 1.77250 | 49.6 |
| 17 | −72.511 | 0.20 | | |
| 18 | 88.995 | 8.01 | 1.49700 | 81.6 |
| 19 | −41.287 | 1.30 | 1.74950 | 35.0 |
| 20 | −107.447 | d20 | | |
| 21 (Diaphragm) | ∞ | 2.00 | | |
| 22 | 37.347 | 8.23 | 1.72916 | 54.7 |
| 23 | −234.037 | 0.20 | | |
| 24 | 35.757 | 4.82 | 1.49700 | 81.6 |
| 25 | 150.186 | 1.57 | | |
| 26 | −192.330 | 1.50 | 1.83481 | 42.7 |
| 27 | 21.453 | 8.35 | 1.49700 | 81.6 |
| 28 | 52.800 | 2.35 | | |
| 29 | 192.600 | 1.10 | 1.62374 | 47.0 |
| 30 | 34.702 | 2.54 | | |
| 31 | 93.311 | 6.00 | 1.59349 | 67.0 |
| 32 | −88.797 | 18.51 | | |
| 33 | −34.234 | 1.30 | 1.90366 | 31.3 |
| 34 | −68.531 | 0.20 | | |
| 35 | 240.131 | 4.05 | 1.84666 | 23.8 |
| 36 | −84.437 | — | | |

TABLE 26

LENS-SYSTEM DATA
Zoom Ratio: 2.69

| | Short Focal Length Extremity | Intermediate Focal Length | Long Focal Length Extremity |
|---|---|---|---|
| FNO. | 2.9 | 2.9 | 2.9 |
| f | 72.10 | 117.92 | 194.00 |
| W | 16.8 | 10.2 | 6.2 |
| Y | 21.64 | 21.64 | 21.64 |
| fB | 38.53 | 38.53 | 38.53 |
| L | 228.56 | 228.56 | 228.54 |
| d7 | 2.20 | 27.42 | 44.69 |
| d10 | 15.12 | 8.39 | 6.19 |
| d15 | 18.62 | 12.63 | 1.50 |
| d20 | 29.10 | 16.60 | 12.65 |

TABLE 27

LENS GROUP DATA

| Lens Group | 1st Surface | Focal Length |
|---|---|---|
| 1 | 1 | 119.13 |
| 2 | 8 | −72.42 |
| 3 | 11 | −54.49 |
| 4 | 16 | 75.65 |
| 5 | 22 | 93.80 |

Numerical Embodiment 10

Figure 55:
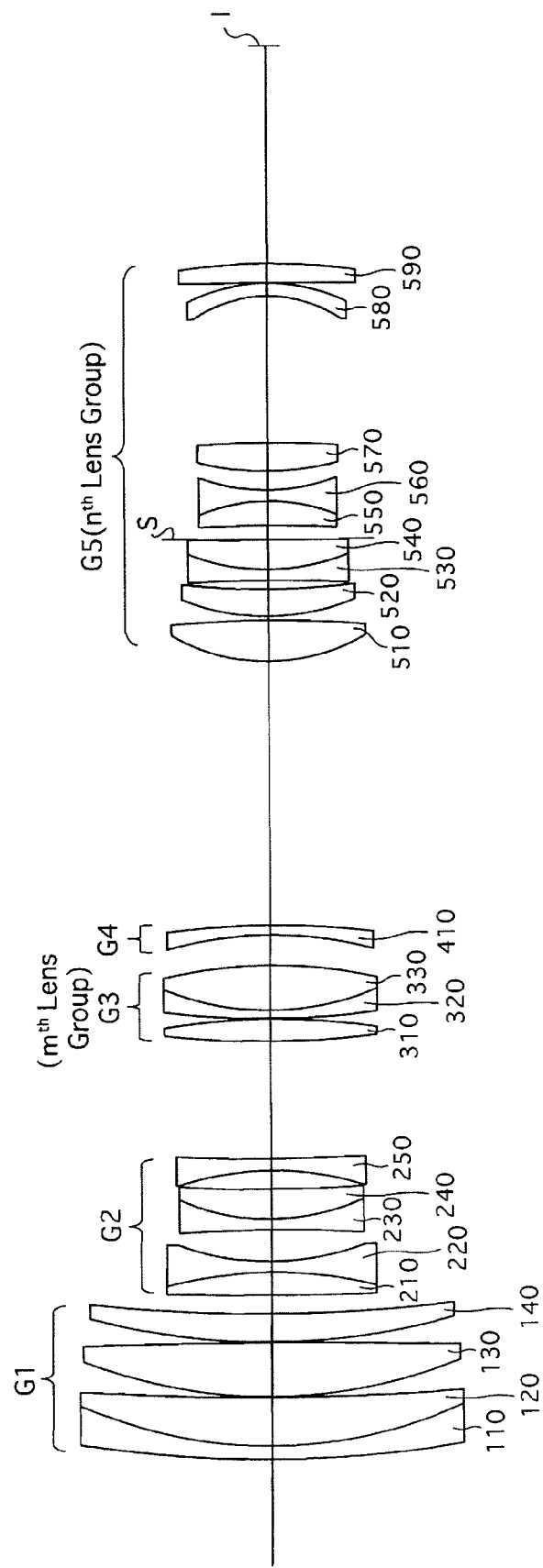
FIG. 55 shows a lens arrangement of a tenth numerical embodiment of a zoom lens system, according to the present invention, at the short focal length extremity when focused on an object at infinity.
Figure 58:
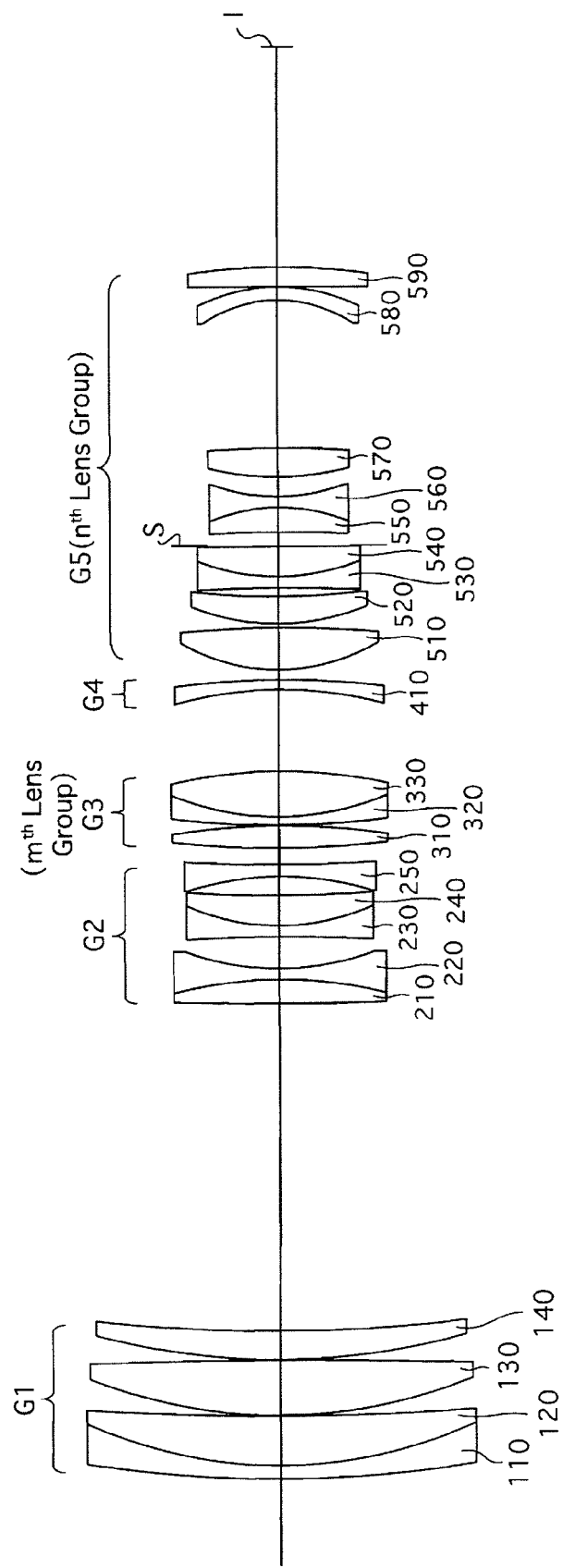
FIG. 58 shows a lens arrangement of the tenth numerical embodiment of a zoom lens system at the long focal length extremity when focused on an object at infinity.

FIGS. 55 through 60D and Tables 28 through 30 show a tenth numerical embodiment of the zoom lens system according to the present invention. FIG. 55 shows a lens arrangement of the tenth numerical embodiment of the zoom lens system, at the short focal length extremity when focused on an object at infinity. FIGS. 56A, 56B, 56C and 56D show various aberrations that occurred in the lens arrangement shown in FIG. 55, at the short focal length extremity when focused on an object at infinity. FIGS. 57A, 57B, 57C and 57D show lateral aberrations that occurred in the lens arrangement shown in FIG. 55, at the short focal length extremity when focused on an object at infinity. FIG. 58 shows a lens arrangement of the tenth numerical embodiment of the zoom lens system, at the long focal length extremity when focused on an object at infinity. FIGS. 59A, 59B, 59C and 59D show various aberrations that occurred in the lens arrangement shown in FIG. 58, at the long focal length extremity when focused on an object at infinity. FIGS. 60A, 60B, 60C and 60D show lateral aberrations that occurred in the lens arrangement shown in FIG. 58, at the long focal length extremity when focused on an object at infinity. Table 28 shows the lens surface data, Table 29 shows various lens-system data, and Table 30 shows the lens group data of the zoom lens system.

The lens arrangement of the tenth numerical embodiment is the same as that of the third numerical embodiment except for the following features:

(1) The positive lens element 210 of the second lens group G2 is a biconvex positive lens element.

(2) The third lens group G3 is configured of a biconvex positive lens element 310, a negative meniscus lens element 320 having a convex surface on the object side, and a biconvex positive lens element 330, in that order from the object side. The negative meniscus lens element 320 and the biconvex positive lens element 330 are cemented to each other.

(3) The fifth lens group G5 is configured of a biconvex positive lens element 510, a positive meniscus lens element 520 having a convex surface on the object side, a biconcave negative lens element 530, a positive meniscus lens element 540 having a convex surface on the object side, a diaphragm S, a positive meniscus lens element 550 having a convex surface on the image side, a biconcave negative lens element 560, a biconvex positive lens element 570, a negative meniscus lens element 580 having a convex surface on the image side, and a positive meniscus lens element 590 having a convex surface on the image side, in that order from the object side. The biconcave negative lens element 530 and the positive meniscus lens element 540 are cemented to each other, and the positive meniscus lens element 550 and the biconcave negative lens element 560 are cemented to each other.

TABLE 28

LENS SURFACE DATA

| Surf. No. | R | d | N(d) | ν(d) |
|---|---|---|---|---|
| 1 | 224.544 | 2.50 | 1.75213 | 38.0 |
| 2 | 87.390 | 9.11 | 1.49700 | 81.6 |
| 3 | 529.927 | 0.10 | | |
| 4 | 95.970 | 10.16 | 1.43875 | 95.0 |
| 5 | −1238.975 | 0.10 | | |
| 6 | 129.694 | 5.28 | 1.59522 | 67.7 |
| 7 | 299.998 | d7 | | |
| 8 | 662.168 | 4.34 | 1.80610 | 33.3 |
| 9 | −81.769 | 2.00 | 1.80400 | 46.6 |
| 10 | 51.675 | 5.80 | | |
| 11 | −302.346 | 2.00 | 1.59522 | 67.7 |
| 12 | 43.471 | 5.50 | 1.84666 | 23.8 |
| 13 | 264.757 | 3.47 | | |
| 14 | −58.403 | 2.20 | 1.78800 | 47.4 |
| 15 | 327.343 | d15 | | |
| 16 | 182.535 | 4.08 | 1.76548 | 37.4 |
| 17 | −130.951 | 0.10 | | |
| 18 | 168.605 | 1.50 | 1.84666 | 23.8 |
| 19 | 54.119 | 8.32 | 1.61800 | 63.4 |
| 20 | −90.589 | d20 | | |
| 21 | −74.078 | 1.80 | 1.58145 | 62.0 |
| 22 | −156.244 | d22 | | |
| 23 | 37.107 | 7.64 | 1.53775 | 74.7 |
| 24 | −223.693 | 0.74 | | |
| 25 | 43.961 | 5.00 | 1.49700 | 81.6 |
| 26 | 139.771 | 1.64 | | |
| 27 | −284.346 | 2.00 | 1.83400 | 37.2 |
| 28 | 41.973 | 5.44 | 1.56385 | 41.0 |
| 29 | 6582.336 | 0.21 | | |
| 30 (Diaphragm) | ∞ | 2.44 | | |
| 31 | −288.620 | 4.50 | 1.80518 | 25.4 |
| 32 | −35.191 | 2.00 | 1.83400 | 37.2 |
| 33 | 36.632 | 3.56 | | |
| 34 | 54.155 | 5.26 | 1.51600 | 59.3 |
| 35 | −190.072 | 26.95 | | |
| 36 | −25.727 | 2.40 | 1.83481 | 42.7 |
| 37 | −34.824 | 0.10 | | |
| 38 | −1000.006 | 3.50 | 1.80022 | 25.6 |
| 39 | −120.432 | — | | |

TABLE 29

LENS-SYSTEM DATA
Zoom Ratio: 2.87

| | Short Focal Length Extremity | Intermediate Focal Length | Long Focal Length Extremity |
|---|---|---|---|
| FNO. | 4.1 | 4.1 | 4.1 |
| f | 102.00 | 200.01 | 293.01 |
| W | 12.0 | 6.1 | 4.1 |
| Y | 21.64 | 21.64 | 21.64 |
| fB | 38.16 | 38.16 | 38.16 |
| L | 279.45 | 279.44 | 279.44 |
| d7 | 3.49 | 44.72 | 59.87 |
| d15 | 21.73 | 12.08 | 3.00 |
| d20 | 5.61 | 14.44 | 14.86 |
| d22 | 48.70 | 8.30 | 1.80 |

TABLE 30

LENS GROUP DATA

| Lens Group | 1st Surface | Focal Length |
|---|---|---|
| 1 | 1 | 143.67 |
| 2 | 8 | −30.85 |
| 3 | 16 | 58.45 |
| 4 | 21 | −244.23 |
| 5 | 23 | 139.01 |

Numerical Embodiment 11

Figure 61:
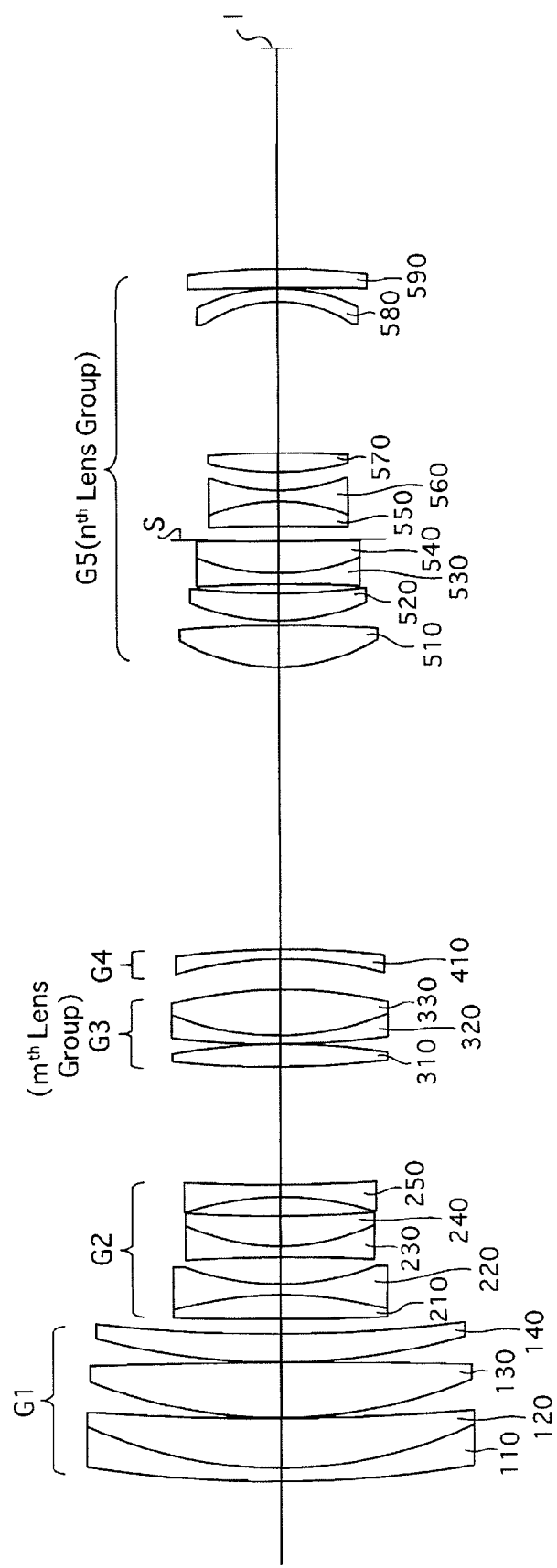
FIG. 61 shows a lens arrangement of an eleventh numerical embodiment of a zoom lens system, according to the present invention, at the short focal length extremity when focused on an object at infinity.
Figure 64:
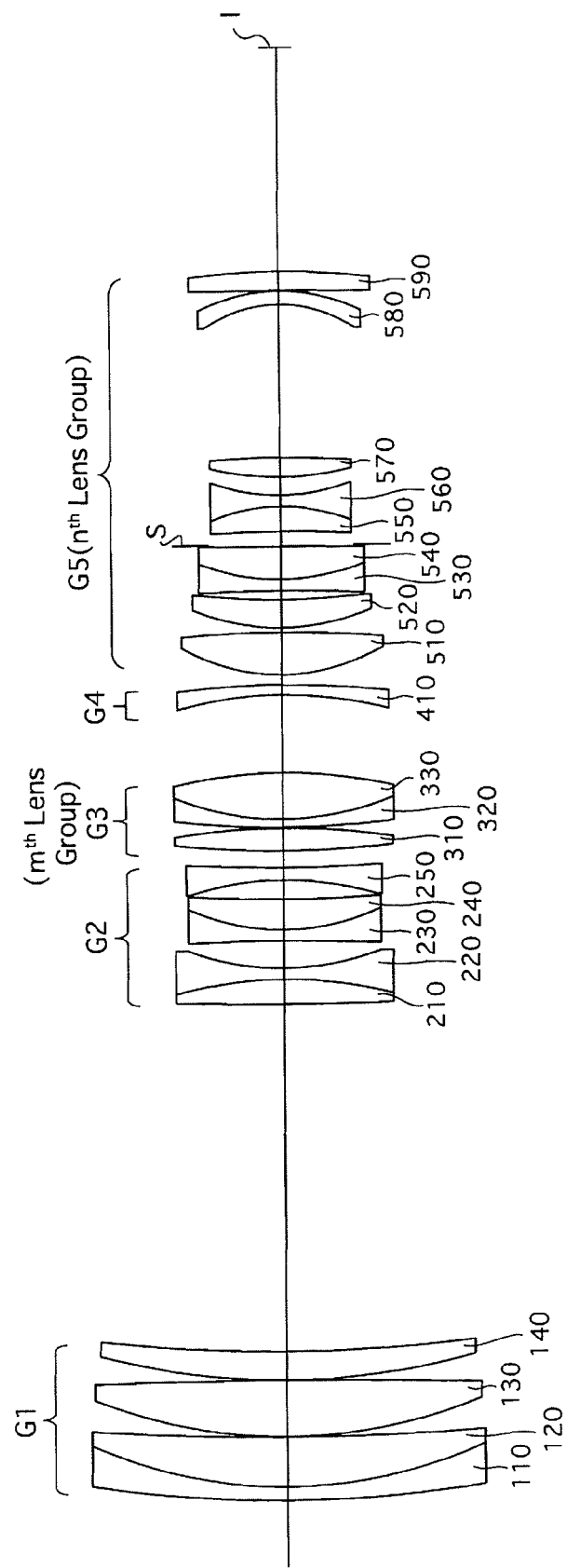
FIG. 64 shows a lens arrangement of the eleventh numerical embodiment of the zoom lens system at the long focal length extremity when focused on an object at infinity.

FIGS. 61 through 66D and Tables 31 through 33 show an eleventh numerical embodiment of the zoom lens system according to the present invention. FIG. 61 shows a lens arrangement of the eleventh numerical embodiment of the zoom lens system, at the short focal length extremity when focused on an object at infinity. FIGS. 62A, 62B, 62C and 62D show various aberrations that occurred in the lens arrangement shown in FIG. 61, at the short focal length extremity when focused on an object at infinity. FIGS. 63A, 63B, 63C and 63D show lateral aberrations that occurred in the lens arrangement shown in FIG. 61, at the short focal length extremity when focused on an object at infinity. FIG. 64 shows a lens arrangement of the eleventh numerical embodiment of the zoom lens system, at the long focal length extremity when focused on an object at infinity. FIGS. 65A, 65B, 65C and 65D show various aberrations that occurred in the lens arrangement shown in FIG. 64, at the long focal length extremity when focused on an object at infinity. FIGS. 66A, 66B, 66C and 66D show lateral aberrations that occurred in the lens arrangement shown in FIG. 64, at the long focal length extremity when focused on an object at infinity. Table 31 shows the lens surface data, Table 32 shows various lens-system data, and Table 33 shows the lens group data of the zoom lens system.

The lens arrangement of the eleventh numerical embodiment is the same as that of the tenth numerical embodiment.

TABLE 31

LENS SURFACE DATA

| Surf. No. | R | d | N(d) | ν(d) |
|---|---|---|---|---|
| 1 | 228.810 | 2.50 | 1.75644 | 38.5 |
| 2 | 87.087 | 9.11 | 1.49700 | 81.6 |
| 3 | 497.653 | 0.10 | | |
| 4 | 95.881 | 10.16 | 1.43875 | 95.0 |
| 5 | −1266.274 | 0.10 | | |
| 6 | 132.012 | 5.21 | 1.59522 | 67.7 |
| 7 | 300.000 | d7 | | |
| 8 | 671.932 | 4.47 | 1.80610 | 33.3 |
| 9 | −77.138 | 2.00 | 1.80400 | 46.6 |
| 10 | 52.126 | 4.92 | | |
| 11 | −346.646 | 2.00 | 1.59522 | 67.7 |
| 12 | 43.470 | 5.50 | 1.84666 | 23.8 |
| 13 | 277.518 | 3.46 | | |
| 14 | −58.495 | 2.20 | 1.78800 | 47.4 |
| 15 | 324.771 | d15 | | |
| 16 | 181.359 | 4.11 | 1.76891 | 39.4 |
| 17 | −129.882 | 0.10 | | |
| 18 | 172.120 | 1.50 | 1.84666 | 23.8 |
| 19 | 54.037 | 8.32 | 1.61800 | 63.4 |
| 20 | −89.399 | d20 | | |
| 21 | −74.134 | 1.80 | 1.59284 | 61.2 |
| 22 | −163.435 | d22 | | |
| 23 | 37.363 | 7.66 | 1.53775 | 74.7 |
| 24 | −227.038 | 0.83 | | |
| 25 | 43.907 | 5.00 | 1.49700 | 81.6 |
| 26 | 142.408 | 1.65 | | |
| 27 | −285.328 | 2.00 | 1.83400 | 37.2 |
| 28 | 42.548 | 5.87 | 1.56779 | 39.4 |
| 29 | 10280.331 | 0.27 | | |
| 30 (Diaphragm) | ∞ | 2.47 | | |
| 31 | −291.361 | 4.50 | 1.80518 | 25.4 |
| 32 | −35.057 | 2.00 | 1.83400 | 37.2 |
| 33 | 36.455 | 3.31 | | |
| 34 | 54.317 | 3.52 | 1.51718 | 55.9 |
| 35 | −184.209 | 27.43 | | |
| 36 | −25.646 | 2.40 | 1.83481 | 42.7 |
| 37 | −34.527 | 0.10 | | |
| 38 | −1000.003 | 3.50 | 1.80079 | 27.2 |
| 39 | −126.422 | — | | |

TABLE 32

LENS-SYSTEM DATA
Zoom Ratio: 2.87

| | Short Focal Length Extremity | Intermediate Focal Length | Long Focal Length Extremity |
|---|---|---|---|
| FNO. | 4.1 | 4.1 | 4.1 |
| f | 102.00 | 200.00 | 293.01 |
| W | 12.0 | 6.1 | 4.1 |
| Y | 21.64 | 21.64 | 21.64 |
| fB | 38.06 | 38.06 | 38.06 |
| L | 279.36 | 279.36 | 279.36 |
| d7 | 2.82 | 46.19 | 62.39 |
| d15 | 21.40 | 11.95 | 3.00 |
| d20 | 5.59 | 14.15 | 14.06 |
| d22 | 51.44 | 8.97 | 1.80 |

TABLE 33

LENS GROUP DATA

| Lens Group | 1st Surface | Focal Length |
|---|---|---|
| 1 | 1 | 148.77 |
| 2 | 8 | −31.65 |
| 3 | 16 | 58.14 |
| 4 | 21 | −230.59 |
| 5 | 23 | 136.21 |

The numerical values of each condition for each numerical embodiment are shown in Table 34. Since the eighth numerical embodiment has a lens arrangement that differs from the other embodiments, the numerical values corresponding to conditions (14), (15) and (23) cannot be calculated therefor. Furthermore, since the ninth numerical embodiment has a lens arrangement that differs from the other embodiments, the numerical values corresponding to conditions (9) through (11), (17) and (18) cannot be calculated therefor.

TABLE 34

| | Embod. 1 | Embod. 2 | Embod. 3 | Embod. 4 |
|---|---|---|---|---|
| Cond. (1) | 1.318 | 1.250 | 1.312 | 1.313 |
| Cond. (2) | 1.376 | 1.440 | 1.368 | 1.377 |
| Cond. (3) | | | | |
| νdp1 | 81.55 | 81.55 | 81.55 | 81.55 |
| νdp2 | 94.94 | 82.57 | 81.55 | 94.94 |
| νdp3 | 67.73 | 63.33 | 67.73 | 67.73 |
| Cond. (4) | 0.156 | 0.121 | 0.106 | 0.156 |
| Cond. (5) | 81.34 | 72.44 | 73.50 | 81.34 |
| Cond. (6) | 0.597 | 0.733 | 0.727 | 0.614 |
| Cond. (7) | 1.270 | 1.119 | 1.180 | 1.203 |
| Cond. (8) | 67.73 | 67.73 | 67.73 | 67.73 |
| Cond. (9) | −3.104 | −3.081 | −2.958 | −3.165 |
| Cond. (10) | 1.613 | 1.717 | 1.719 | 1.613 |
| Cond. (11) | 44.27 | 47.93 | 41.37 | 44.27 |
| Cond. (12) | −1.71 | −1.71 | −1.65 | −1.75 |
| Cond. (13) | 6.29 | 6.05 | 5.69 | 6.45 |
| Cond. (14) | −2.26 | −2.14 | −2.16 | −2.30 |
| Cond. (15) | −2.79 | −2.83 | −2.63 | −2.81 |
| Cond. (16) | −0.32 | −0.32 | −0.34 | −0.32 |
| Cond. (17) | 1.613 | 1.717 | 1.719 | 1.613 |
| Cond. (18) | 44.27 | 47.93 | 41.37 | 44.27 |
| Cond. (19) | | | | |
| νdp1 | 81.55 | 81.55 | 81.55 | 81.55 |
| νdp2 | 94.94 | 82.57 | 81.55 | 94.94 |
| νdp3 | 67.73 | 63.33 | 67.73 | 67.73 |
| Cond. (20) | 0.16 | 0.12 | 0.11 | 0.16 |
| Cond. (21) | 81.34 | 72.44 | 73.50 | 81.34 |
| Cond. (22) | 0.60 | 0.73 | 0.73 | 0.61 |
| Cond. (23) | 1.27 | 1.12 | 1.18 | 1.20 |
| Cond. (24) | 67.73 | 67.73 | 67.73 | 67.73 |

TABLE 34-continued

|  | Embod. 5 | Embod. 6 | Embod. 7 | Embod. 8 |
|---|---|---|---|---|
| Cond. (1) | 1.288 | 1.450 | 1.416 | 1.450 |
| Cond. (2) | 1.428 | 1.399 | 1.559 | 1.277 |
| Cond. (3) |  |  |  |  |
| vdp1 | 81.55 | 81.55 | 81.61 | 81.55 |
| vdp2 | 94.94 | 94.94 | 95.00 | 82.57 |
| vdp3 | 67.73 | 67.73 | 68.62 | 63.33 |
| Cond. (4) | 0.156 | 0.157 | 0.158 | 0.121 |
| Cond. (5) | 81.34 | 81.34 | 81.81 | 72.44 |
| Cond. (6) | 0.614 | 0.626 | 0.555 | 0.703 |
| Cond. (7) | 1.268 | 1.156 | 1.294 | 0.979 |
| Cond. (8) | 67.73 | 67.73 | 68.62 | 63.33 |
| Cond. (9) | −2.759 | −2.061 | −2.154 | −7.578 |
| Cond. (10) | 1.613 | 1.613 | 1.654 | 1.700 |
| Cond. (11) | 44.27 | 58.72 | 39.62 | 44.25 |
| Cond. (12) | −1.50 | −1.02 | −0.98 | 0.69 |
| Cond. (13) | 5.46 | 3.63 | 3.62 | −2.88 |
| Cond. (14) | −1.93 | −1.47 | −1.38 | ** |
| Cond. (15) | −2.82 | −2.47 | −2.62 | ** |
| Cond. (16) | −0.36 | −0.49 | −0.46 | 0.88 |
| Cond. (17) | 1.613 | 1.613 | 1.654 | 1.700 |
| Cond. (18) | 44.27 | 58.72 | 39.62 | 44.25 |
| Cond. (19) |  |  |  |  |
| vdp1 | 81.55 | 81.55 | 81.61 | 81.55 |
| vdp2 | 94.94 | 94.94 | 95.00 | 82.57 |
| vdp3 | 67.73 | 67.73 | 68.62 | 63.33 |
| Cond. (20) | 0.16 | 0.16 | 0.16 | 0.12 |
| Cond. (21) | 81.34 | 81.34 | 81.81 | 72.44 |
| Cond. (22) | 0.61 | 0.63 | 0.55 | 0.70 |
| Cond. (23) | 1.27 | 1.16 | 1.29 | ** |
| Cond. (24) | 67.73 | 67.73 | 68.62 | 63.33 |

|  | Embod. 9 | Embod. 10 | Embod. 11 |
|---|---|---|---|
| Cond. (1) | 1.270 | 1.034 | 1.092 |
| Cond. (2) | 1.240 | 2.378 | 2.343 |
| Cond. (3) |  |  |  |
| vdp1 | 90.19 | 81.55 | 81.55 |
| vdp2 | 95.00 | 94.94 | 94.94 |
| vdp3 | 81.61 | 67.73 | 67.73 |
| Cond. (4) | 0.232 | 0.041 | 0.041 |
| Cond. (5) | 68.14 | 78.13 | 78.13 |
| Cond. (6) | 0.505 | 0.479 | 0.490 |
| Cond. (7) | 1.209 | 1.689 | 1.671 |
| Cond. (8) | 67.00 | 59.31 | 55.91 |
| Cond. (9) | ** | −4.178 | −3.966 |
| Cond. (10) | ** | 1.581 | 1.593 |
| Cond. (11) | ** | 62.00 | 61.24 |
| Cond. (12) | 0.64 | −1.70 | −1.55 |
| Cond. (13) | −1.04 | 7.92 | 7.29 |
| Cond. (14) | 0.81 | −1.76 | −1.69 |
| Cond. (15) | −1.30 | −4.51 | −4.30 |
| Cond. (16) | −0.72 | −0.24 | −0.25 |
| Cond. (17) | ** | 1.581 | 1.593 |
| Cond. (18) | ** | 62.00 | 61.24 |
| Cond. (19) |  |  |  |
| vdp1 | 90.19 | 81.55 | 81.55 |
| vdp2 | 95.00 | 94.94 | 94.94 |
| vdp3 | 81.61 | 67.73 | 67.73 |
| Cond. (20) | 0.23 | 0.04 | 0.04 |
| Cond. (21) | 68.14 | 78.13 | 78.13 |
| Cond. (22) | 0.50 | 0.48 | 0.49 |
| Cond. (23) | 1.21 | 1.69 | 1.67 |
| Cond. (24) | 67.00 | 59.31 | 55.91 |

As can be understood from Table 34, the first through fifth numerical embodiments satisfy conditions (1), (2) and (12), the sixth through ninth numerical embodiments satisfy conditions (1) and (2), and the tenth and eleventh numerical embodiments satisfy condition (12). Furthermore, as can be understood from the various aberration diagrams and lateral aberration diagrams, the various aberrations and lateral aberrations are favorably corrected.

Supplemental Explanation of <<First Configuration for Achieving First Objective>>

In the above described first through ninth numerical embodiments, a zoom lens system having a positive first lens group, a negative second lens group, a positive third lens group, a negative fourth lens group and a positive fifth lens group, in that order from the object side (five lens groups) is disclosed in which the third lens group G3 and the fifth lens group G5 are defined as an $m^{th}$ lens group and an $n^{th}$ lens group, respectively; and a zoom lens system having a first positive lens group, a second negative lens group, a third negative lens group, a fourth positive lens group and a fifth positive lens group, in that order from the object side (five lens groups) is disclosed in which the fourth lens group G4' and the fifth lens group G5' are defined as an $m^{th}$ lens group and an $n^{th}$ lens group, respectively.

However, the zoom lens system according to the present invention can also be applied to the following lens arrangement having the following features while remaining within the scope of the claimed present invention, for example:

(1) Providing a positive first lens group and a negative second lens group closest to the object side in that order, and providing a positive $n^{th}$ lens group closest to the image side.

(2) The first lens group and the $n^{th}$ lens group remain stationary relative to the imaging plane I during zooming from the short focal length extremity to the long focal length extremity, and the second lens group moves in the optical axis direction.

(3) A positive $m^{th}$ lens group is provided in between the second lens group and the $n^{th}$ lens group.

As described above, in the present disclosure the "$m^{th}$ lens group" refers to a lens group that serves as a focusing lens group that moves in the optical axis direction during focusing. Therefore, the behavior of the "$m^{th}$ lens group" during zooming from the short focal length extremity to the long focal length extremity (e.g., whether the mth lens group moves along the optical axis direction solely or with another lens group, or whether the $m^{th}$ lens group remains stationary relative to the imaging plane I) irrelevant to how the "$m^{th}$ lens group" is defined (i.e., how the $m^{th}$ lens group is divided from the other lens groups).

As described above, the zoom lens system of the present invention can be configured of, for example, a positive first lens group, a negative second lens group, a positive third lens group, a negative fourth lens group and a positive fifth lens group, in that order from the object side, or be configured of a first positive lens group, a second negative lens group, a third negative lens group, a fourth positive lens group and a fifth positive lens group, in that order from the object side.

The description of the lens arrangement of zoom lens system, of the present invention, that is configured of a positive first lens group, a negative second lens group, a positive third lens group, a negative fourth lens group and a positive fifth lens group, in that order from the object side, can be rewritten without using the terms "$m^{th}$ lens group" and "$n^{th}$ lens group". Namely, the zoom lens system having such a lens arrangement can be described as including a positive first lens group, a negative second lens group, a positive third lens group, a negative fourth lens group, and a positive fifth lens group, in that order from the object side; wherein during zooming from the short focal length extremity to the long focal length extremity, the first lens group and the fifth lens group remain stationary relative to the imaging plane, and the second through fourth lens groups move in the optical axis direction; and wherein the following conditions (1-1) and (2-1) are satisfied:

$$1.23 < f1/f5 < 1.50 \quad (1\text{-}1), \text{ and}$$

$$1.20 < f5/f3 < 1.60 \quad (2\text{-}1),$$

wherein f1 designates the focal length of the first lens group, f3 designates the focal length of the third lens group, and f5 designates the focal length of the fifth lens group.

Similarly, the description of the lens arrangement of zoom lens system, of the present invention, that is configured of a positive first lens group, a negative second lens group, a negative third lens group, a positive fourth lens group and a positive fifth lens group, in that order from the object side, can be rewritten without using the terms "$m^{th}$ lens group" and "$n^{th}$ lens group". Namely, the zoom lens system having such a lens arrangement can be described as including a positive first lens group, a negative second lens group, a negative third lens group, a positive fourth lens group, and a positive fifth lens group, in that order from the object side; wherein during zooming from the short focal length extremity to the long focal length extremity, the first lens group and the fifth lens group remain stationary relative to the imaging plane, and the second through fourth lens groups move in the optical axis direction; and wherein the following conditions (1-2) and (2-2) are satisfied:

$$1.23 < f1/f5 < 1.50 \quad (1\text{-}2), \text{ and}$$

$$1.20 < f5/f4 < 1.60 \quad (2\text{-}2),$$

wherein f1 designates the focal length of the first lens group, f4 designates the focal length of the fourth lens group, and f5 designates the focal length of the fifth lens group.

Even if a lens element or lens group having effectively no refractive power were to be added to the zoom lens system included in the scope of the claims of the present invention, such a zoom lens system would still remain within the technical scope of the present invention (and would not be excluded from the technical scope of the present invention).

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a positive first lens group and a negative second lens group, in that order from the object side, and a positive $n^{th}$ lens group provided closest to the image side, wherein, during zooming from the short focal length extremity to the long focal length extremity, said first lens group and said $n^{th}$ lens group remain stationary relative to the imaging plane, and said second lens group moves in a direction of an optical axis of said zoom lens system, wherein a positive $m^{th}$ lens group is provided between said second lens group and said $n^{th}$ lens group, and wherein the following conditions (1) and (2) are satisfied:

$$1.23 < f1/fn < 1.50 \quad (1), \text{ and}$$

$$1.20 < fn/fm < 1.60 \quad (2), \text{ wherein}$$

f1 designates the focal length of the first lens group,
fn designates the focal length of the $n^{th}$ lens group, wherein n is a positive integer of 4 or greater, and fm designates the focal length of the $m^{th}$ lens group, wherein m is a positive integer of 3 or greater.

2. The zoom lens system according to claim 1, wherein at least two lens groups, including said $m^{th}$ lens group, are provided between said second lens group and said $n^{th}$ lens group.

3. The zoom lens system according to claim 1, wherein a negative lens group other than said $m^{th}$ lens group is provided between said second lens group and said $n^{th}$ lens group.

4. The zoom lens system according to claim 1, wherein said first lens group comprises a negative lens element having a concave surface on the image side, a positive lens element having a convex surface on the object side, a positive lens element having a convex surface on the object side, and a positive lens element having a convex surface on the object side, in that order from the object side, and wherein the following condition (3) is satisfied:

$$vdp2 \geq vdp1 > vdp3 \quad (3), \text{ wherein}$$

vdp1 designates the Abbe number at the d-line of the positive lens element that is positioned closest to the object side of the positive lens elements that are provided within the first lens group, vdp2 designates the Abbe number at the d-line of the positive lens element that is positioned second closest to the object side of the positive lens elements that are provided within the first lens group, and vdp3 designates the Abbe number at the d-line of the positive lens element that is positioned third closest to the object side of the positive lens elements that are provided within the first lens group.

5. The zoom lens system according to claim 1, wherein said $n^{th}$ lens group comprises at least two positive lens elements, and wherein the following conditions (4) and (5) are satisfied:

$$Np1 - Np2 > 0 \quad (4), \text{ and}$$

$$vave > 68 \quad (5), \text{ wherein}$$

Np1 designates the refractive index at the d-line of the positive lens element that is provided closest to the object side out of the positive lens elements within said $n^{th}$ lens group, Np2 designates the refractive index at the d-line of the positive lens element that is provided second closest to the object side out of the positive lens elements within said $n^{th}$ lens group, and vave designates the average of the Abbe numbers at the d-line of the positive lens element positioned closest to the object side, within said $n^{th}$ lens group, and the positive lens element positioned second closest to the object side within said $n^{th}$ lens group.

6. The zoom lens system according to claim 1, wherein an intermediate positive lens element which satisfies the following conditions (6), (7) and (8) is provided between the lens element that is provided closest to the object side within said $n^{th}$ lens group and the lens element that is provided closest to the image side within said $n^{th}$ lens group:

$$0.5 < DnP/LDn < 0.75 \quad (6),$$

$$0.9 < fn/fnP < 1.4 \quad (7), \text{ and}$$

$$60 < vnP < 75 \quad (8), \text{ wherein}$$

DnP designates the distance from the surface on the object side of the lens element provided closest to the object side, within said $n^{th}$ lens group, to the surface on the object side of said intermediate lens element, LDn designates the thickness of said $n^{th}$ lens group, fn designates the focal length of said $n^{th}$ lens group, fnP designates the focal length of said intermediate lens element which is provided within said $n^{th}$ lens group, and vnP designates the Abbe number at the d-line of said intermediate lens element which is provided within said $n^{th}$ lens group.

7. The zoom lens system according to claim 3, wherein the following condition (9) is satisfied:

$$-8.0 < fN/fm < -1.5 \qquad (9),\text{ wherein}$$

fN designates the focal length of the negative lens group that is provided between said second lens group and said $n^{th}$ lens group, and fm designates the focal length of said $m^{th}$ lens group.

8. The zoom lens system according to claim 3, wherein said negative lens group that is provided between second lens group and said $n^{th}$ lens group comprises a negative single lens element having a convex surface on the image side, and wherein the following conditions (10) and (11) are satisfied:

$$1.55 < NdN < 1.73 \qquad (10),\text{ and}$$

$$30 < vdN < 60 \qquad (11),\text{ wherein}$$

NdN designates the refractive index at the d-line of a negative single lens element which constitutes said negative lens group which is provided between said second lens group and said $n^{th}$ lens group, and vdN designates the Abbe number at the d-line of a negative single lens element which constitutes said negative lens group which is provided between said second lens group and said $n^{th}$ lens group.

9. A zoom lens system comprising a positive first lens group, a negative second lens group, a positive third lens group, a negative fourth lens group, and a positive fifth lens group, in that order from the object side, wherein, during zooming from the short focal length extremity to the long focal length extremity, said first lens group and said fifth lens group remain stationary relative to the imaging plane, and the second through fourth lens groups move in a direction of an optical axis of said zoom lens system, and wherein the following condition (12) is satisfied:

$$-1.76 < f4/f1 < -1.49 \qquad (12),\text{ wherein}$$

f1 designates the focal length of said first lens group, and f4 designates the focal length of said fourth lens group.

10. The zoom lens system according to claim 9, wherein the following condition (13) is satisfied:

$$5.0 < f4/f2 < 8.5 \qquad (13),\text{ wherein}$$

f2 designates the focal length of said second lens group, and f4 designates the focal length of said fourth lens group.

11. The zoom lens system according to claim 9, wherein the following condition (14) is satisfied:

$$-4.0 < f4/f5 < -1.5 \qquad (14),\text{ wherein}$$

f4 designates the focal length of said fourth lens group, and f5 designates the focal length of said fifth lens group.

12. The zoom lens system according to claim 9, wherein the following condition (15) is satisfied:

$$-5.0 < f5/f2 < -1.0 \qquad (15),\text{ wherein}$$

f2 designates the focal length of said second lens group, and f5 designates the focal length of said fifth lens group.

13. The zoom lens system according to claim 9, wherein the following condition (16) is satisfied:

$$-0.4 < f3/f4 < -0.2 \qquad (16),\text{ wherein}$$

f3 designates the focal length of said third lens group, and f4 designates the focal length of said fourth lens group.

14. The zoom lens system according to claim 9, wherein said fourth lens group comprises a negative single lens element having a convex surface on the image side.

15. The zoom lens system according to claim 14, wherein the following conditions (17) and (18) are satisfied:

$$1.55 < Nd4 < 1.75 \qquad (17),\text{ and}$$

$$30 < vd4 < 70 \qquad (18),\text{ wherein}$$

Nd4 designates the refractive index at the d-line of said negative single lens element that constitutes said fourth lens group, and vd4 designates the Abbe number at the d-line of said negative single lens element that constitutes said fourth lens group.

16. The zoom lens system according to claim 9, wherein said first lens group comprises a negative lens element having a concave surface on the image side, a positive lens element having a convex surface on the object side, a positive lens element having a convex surface on the object side, and a positive lens element having a convex surface on the object side, in that order from the object side, wherein the following condition (19) is satisfied:

$$vdp2 \geq vdp1 > vdp3 \qquad (19),\text{ wherein}$$

vdp1 designates the Abbe number at the d-line of the positive lens element that is positioned closest to the object side of the positive lens elements that are provided within the first lens group, vdp2 designates the Abbe number at the d-line of the positive lens element that is positioned second closest to the object side of the positive lens elements that are provided within the first lens group, and vdp3 designates the Abbe number at the d-line of the positive lens element that is positioned third closest to the object side of the positive lens elements that are provided within the first lens group.

17. The zoom lens system according to claim 9, wherein said fifth lens group comprises at least two positive lens elements, and wherein the following conditions (20) and (21) are satisfied:

$$N5p1 - N5p2 > 0.03 \qquad (20),\text{ and}$$

$$v5ave > 68 \qquad (21),\text{ wherein}$$

N5p1 designates the refractive index at the d-line of the positive lens element that is provided closest to the object side out of the positive lens elements within said fifth lens group, N5p2 designates the refractive index at the d-line of the positive lens element that is provided second closest to the object side out of the positive lens elements within said fifth lens group, and v5ave designates the average of the Abbe numbers at the d-line of the positive lens element positioned closest to the object side, within said fifth lens group, and the positive lens element positioned second closest to the object side within said fifth lens group.

18. The zoom lens system according to claim 9, wherein an intermediate positive lens element which satisfies the following conditions (22), (23) and (24) is provided between the lens element provided closest to the object side within said fifth lens group and the lens element provided closest to the image side within said fifth lens group:

$$0.45 < D5P/LD5 < 0.8 \qquad (22),$$

$$0.9 < f5/f5P < 1.7 \qquad (23), \text{ and}$$

$$55 < v5P < 75 \qquad (24), \text{ wherein}$$

D5P designates the distance from the surface on the object side of the lens element provided closest to the object side, within said fifth lens group, to the surface on the object side of said intermediate lens element, LD5 designates the thickness of said fifth lens group, f5 designates the focal length of said fifth lens group, f5P designates the focal length of said intermediate lens element which is provided within said fifth lens group, and v5P designates the Abbe number at the d-line of said intermediate lens element which is provided within said fifth lens group.

\* \* \* \* \*